(12) United States Patent
Hamada

(10) Patent No.: US 7,653,278 B2
(45) Date of Patent: Jan. 26, 2010

(54) REFRACTIVE INDEX DISTRIBUTION TYPE OPTICAL MEMBER, AND PRODUCTION METHOD FOR REFRACTIVE INDEX DISTRIBUTION TYPE OPTICAL MEMBER

(75) Inventor: Hidenobu Hamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 11/569,291

(22) PCT Filed: May 17, 2005

(86) PCT No.: PCT/JP2005/008964

§ 371 (c)(1),
(2), (4) Date: Nov. 17, 2006

(87) PCT Pub. No.: WO2005/114278

PCT Pub. Date: Dec. 1, 2005

(65) Prior Publication Data

US 2008/0193082 A1    Aug. 14, 2008

(30) Foreign Application Priority Data

| May 21, 2004 | (JP) | ............................. 2004-151538 |
| Nov. 29, 2004 | (JP) | ............................. 2004-344785 |
| Dec. 3, 2004 | (JP) | ............................. 2004-351703 |

(51) Int. Cl.
*G02B 6/10* (2006.01)
(52) U.S. Cl. .................................................. 385/129
(58) Field of Classification Search .................... None
See application file for complete search history.

(56) References Cited

U.S. PATENT DOCUMENTS 4,637,681 A    1/1987    Yamamoto et al.

| 2002/0085825 A1* | 7/2002 | Kishimoto et al. ........... 385/130 |
| 2003/0031438 A1* | 2/2003 | Kambe et al. ............... 385/122 |
| 2004/0001684 A1* | 1/2004 | Korenaga et al. ........... 385/132 |
| 2005/0141815 A1* | 6/2005 | Pan et al. ....................... 385/47 |
| 2005/0259935 A1* | 11/2005 | Hamada ...................... 385/129 |

FOREIGN PATENT DOCUMENTS

| JP | 51-17058 | 5/1976 |
| JP | 54-20747 | 2/1979 |
| JP | 57-198410 | 12/1982 |
| JP | 60-19107 | 1/1985 |
| JP | 60-064310 | 4/1985 |

(Continued)

OTHER PUBLICATIONS

International Search Report for corresponding International PCT Application No. PCT/JP2005/008964 dated Aug. 23, 2005.

*Primary Examiner*—Sung H Pak
(74) *Attorney, Agent, or Firm*—RatnerPrestia

(57) ABSTRACT

A graded-index optical member includes a core section which has a maximum portion of a refractive index at a substantial center of a cross-section, and has a refractive index distribution that a refractive index decreases according to distance from the maximum portion. A clad section which contacts at least partially with a periphery of the core section. Refractive index is substantially uniform, by making a concentration distribution of siloxane structure, where concentration increases according to distance from the maximum portion of the refractive index of the core section, formed in a sheet-like polysilane.

15 Claims, 37 Drawing Sheets

FOREIGN PATENT DOCUMENTS

| | | |
|---|---|---|
| JP | 60-175010 | 9/1985 |
| JP | 60-188906 | 9/1985 |
| JP | 62-280827 | 12/1987 |
| JP | 1-134309 | 5/1989 |
| JP | 01-134310 | 5/1989 |
| JP | 4-043305 | 2/1992 |
| JP | 6-222234 | 8/1994 |
| JP | 9-288204 | 11/1997 |
| JP | 11-271575 | 10/1999 |
| JP | 2004-86175 | 3/2004 |
| JP | 2004-109498 | 4/2004 |

* cited by examiner

Oxygen (O) concentration distribution

Refractive index distribution

Fig.2(a)
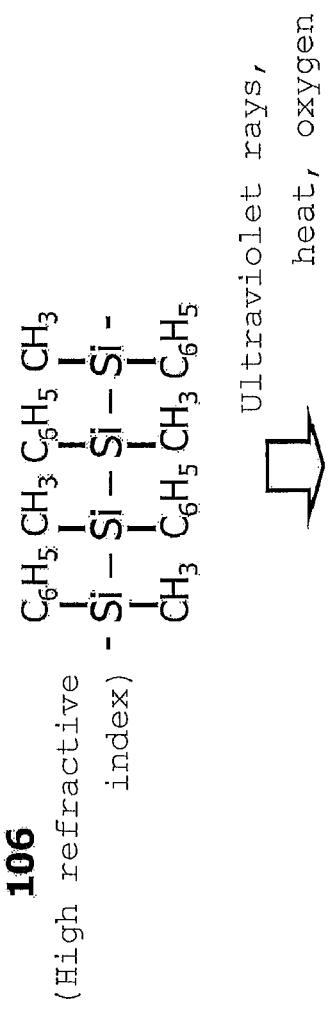
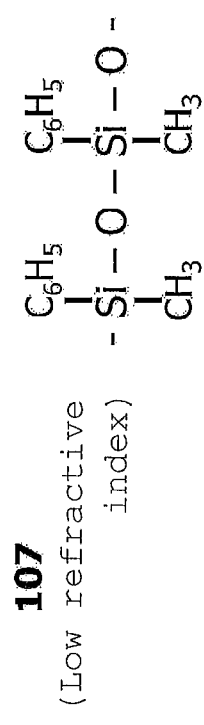
Fig.2(b)
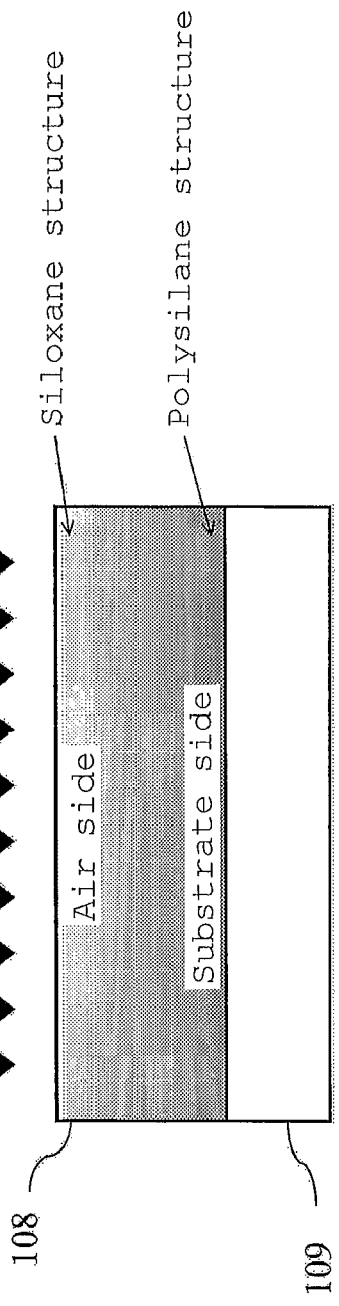

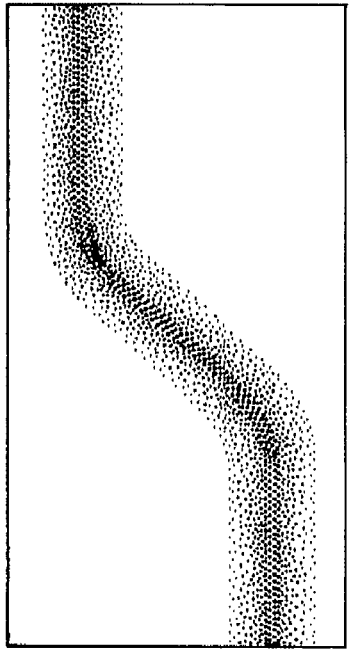
Fig. 4(a) GI type linear waveguide
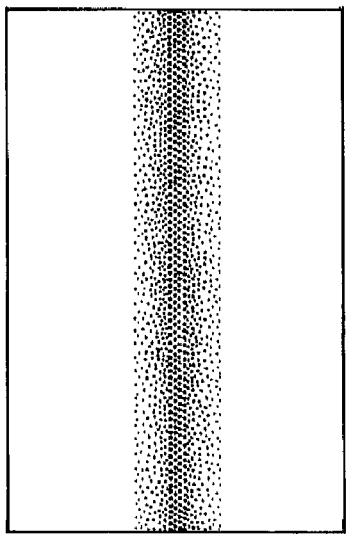
Fig. 4(b) GI type S-character waveguide
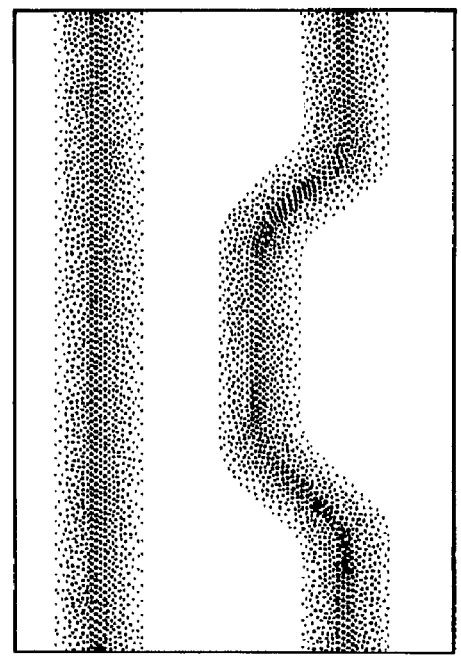
Fig. 4(c) GI type Y branching
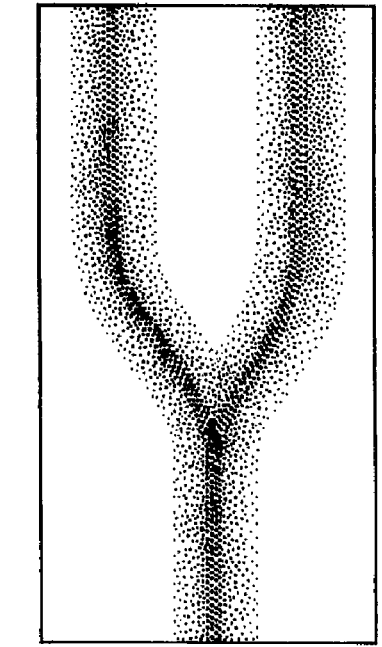
Fig. 4(d) GI type directional coupler Transmittance distribution

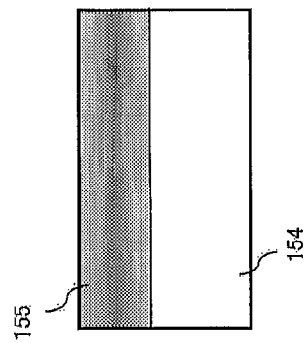
Fig. 8(c)
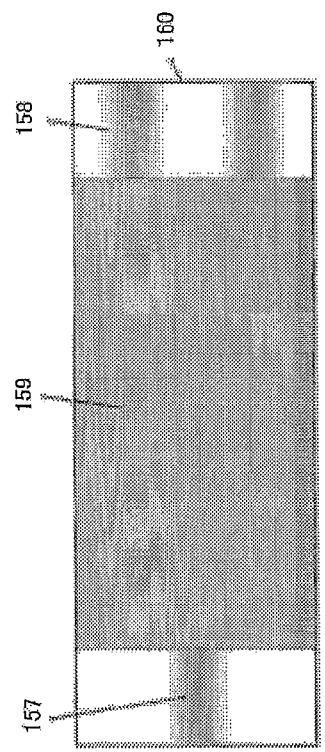
Fig. 8(a) Mask for GI type MMI coupler (with input-output waveguides)
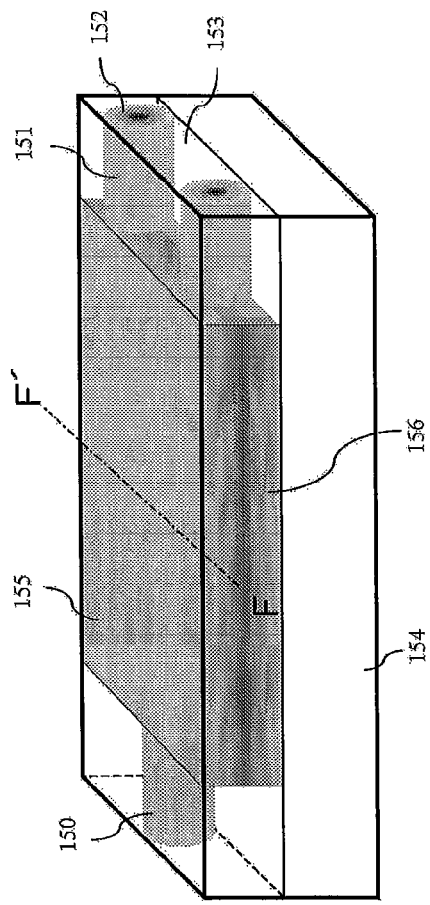
Fig. 8(b) GI type MMI coupler (with input-output waveguides)

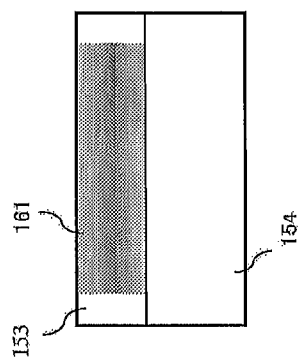
Fig.9(c)
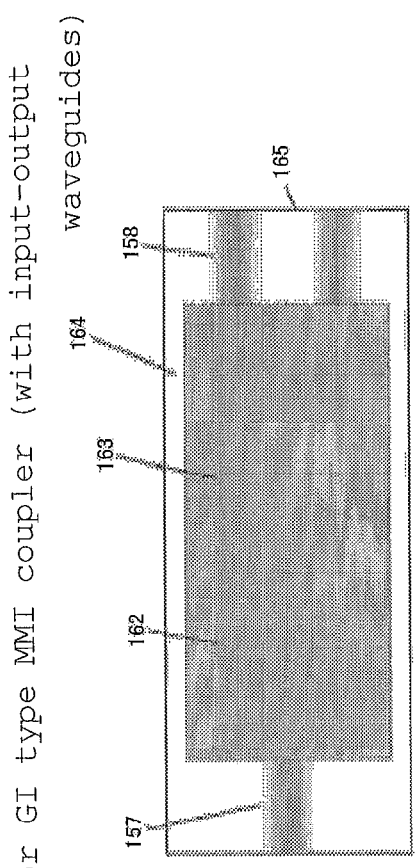
Fig.9(a) Mask for GI type MMI coupler (with input-output waveguides)
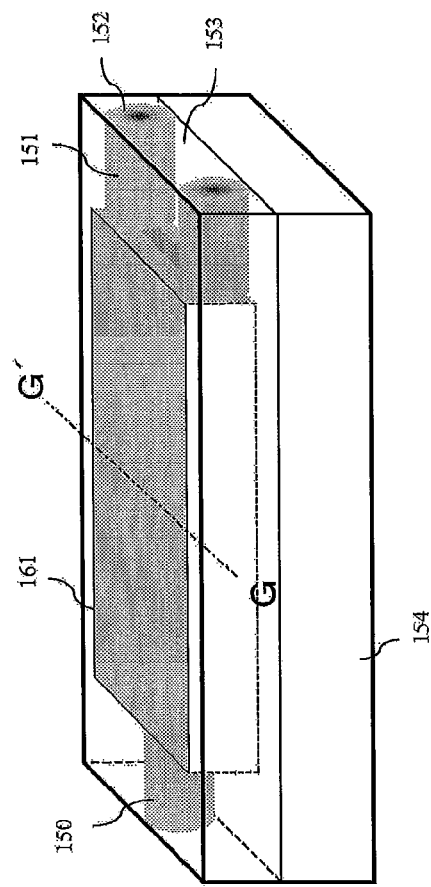
Fig.9(b) GI type MMI coupler (with input-output waveguides)

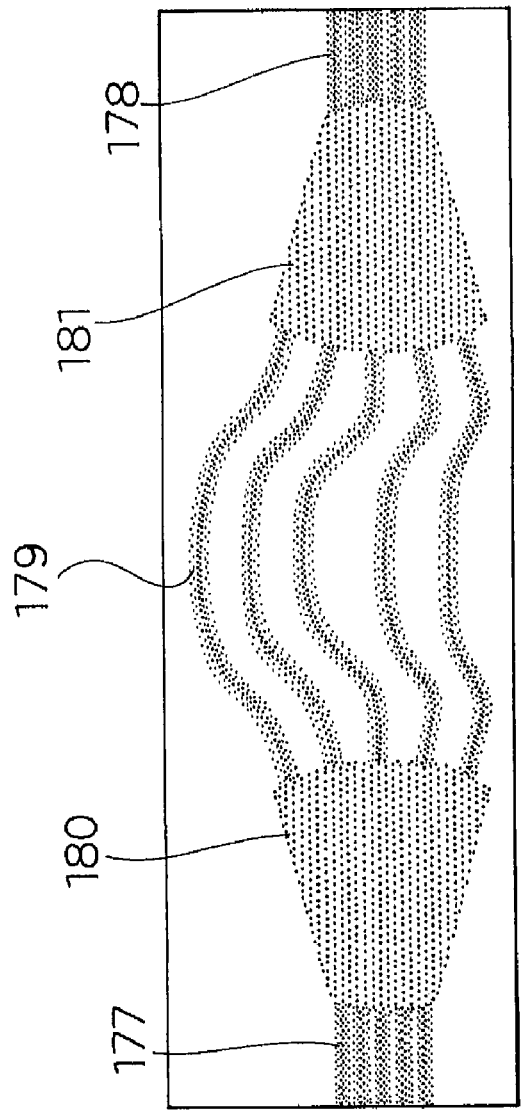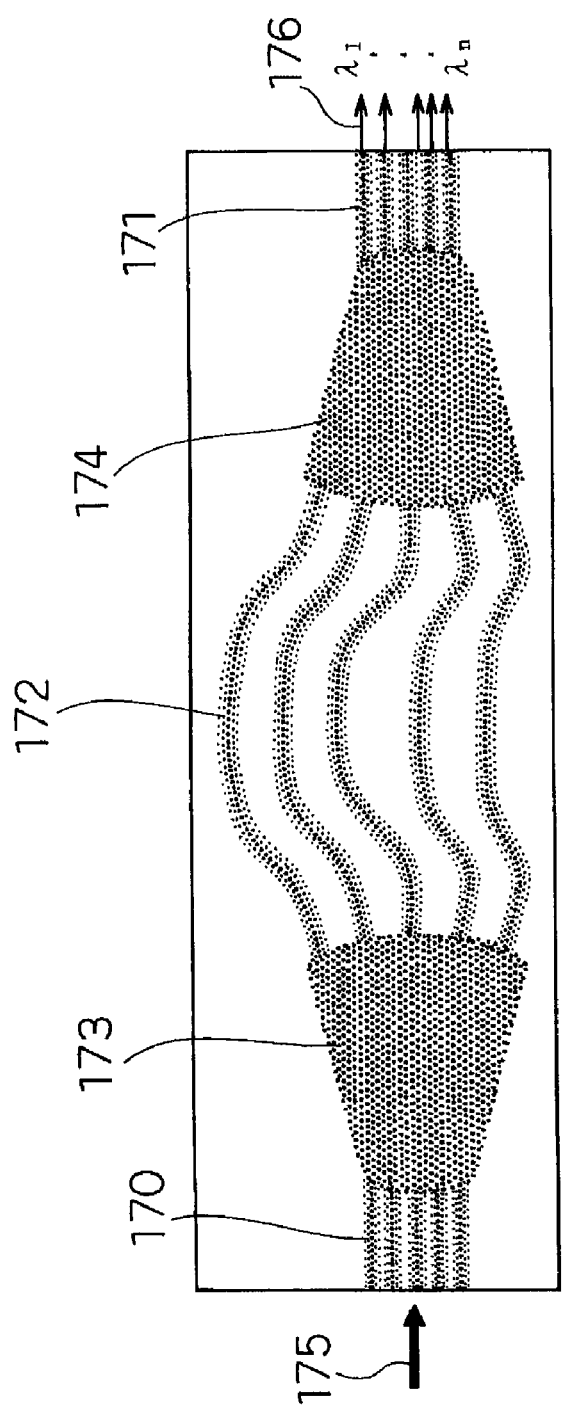
Fig.10(a)
Fig.10(b)

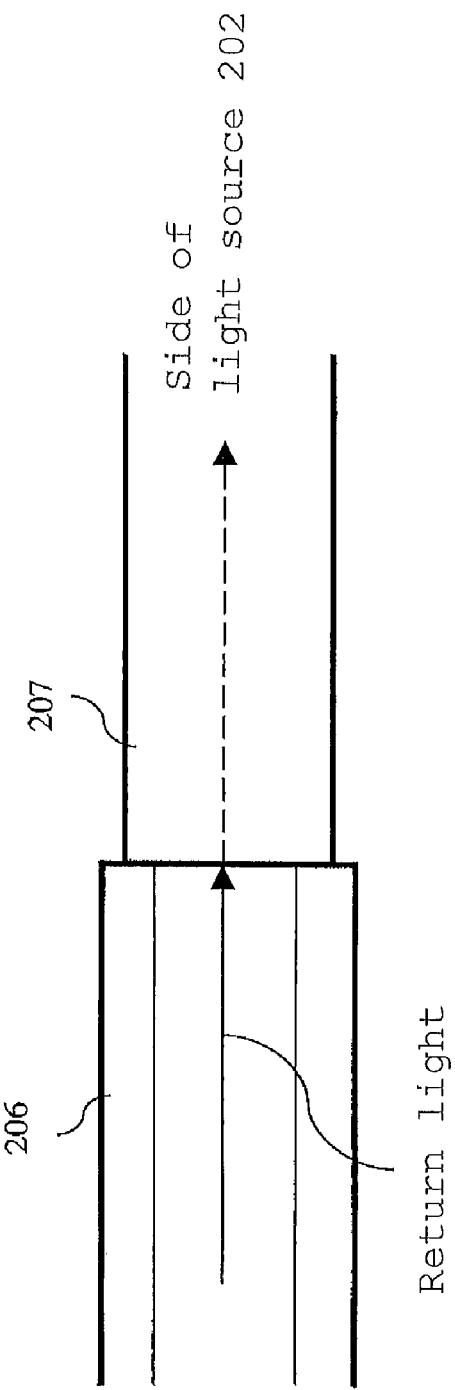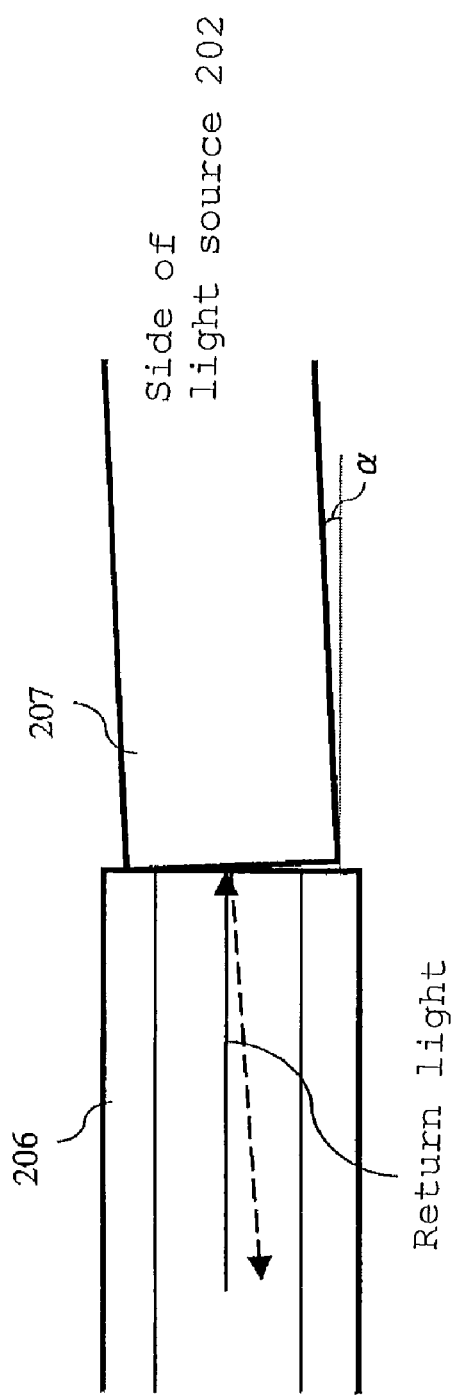
Fig.13(a)
Fig.13(b)

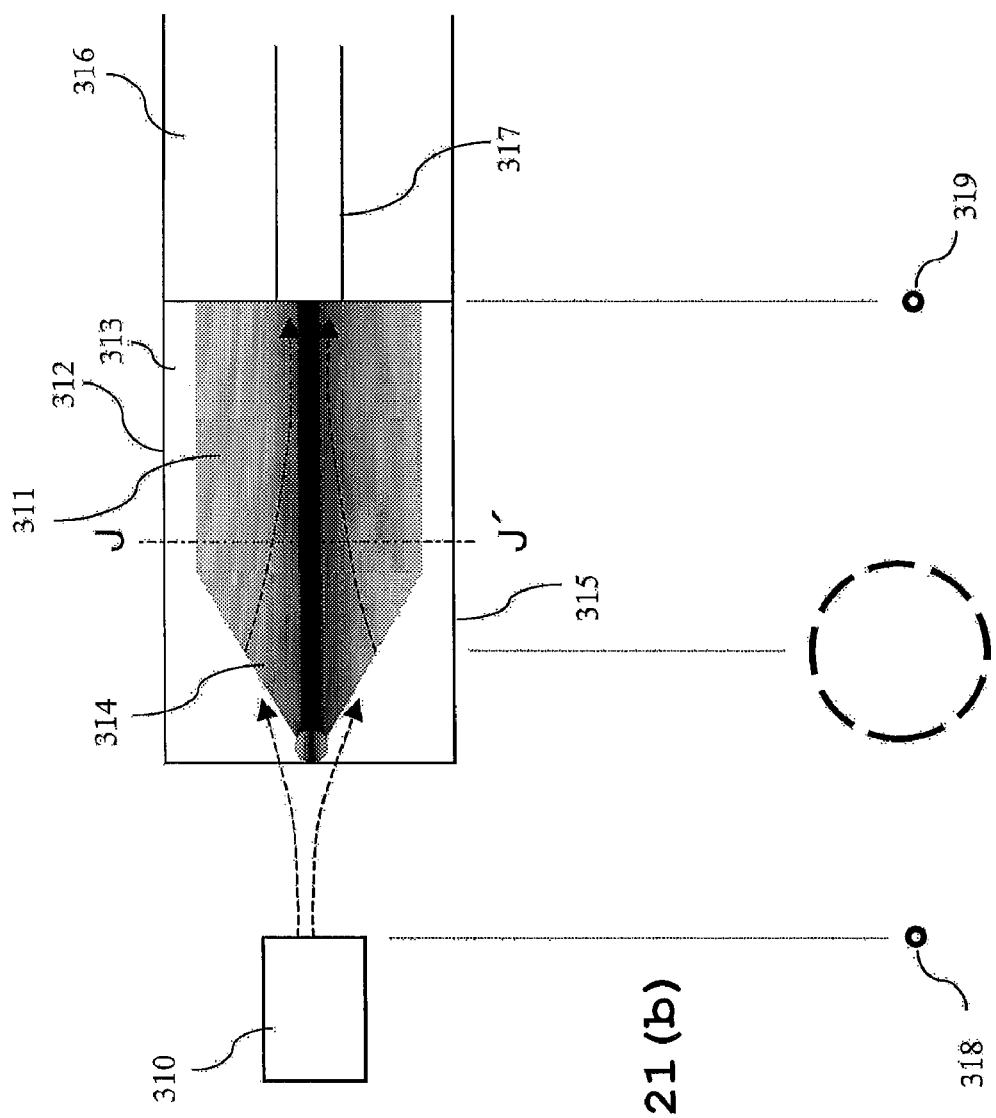
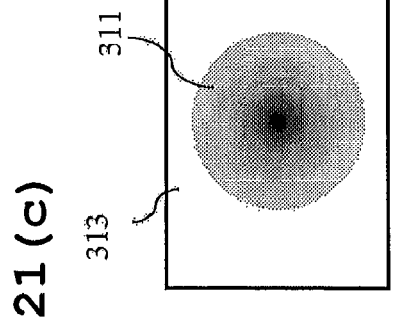
Fig.21(a)
Fig.21(b)
Fig.21(c)

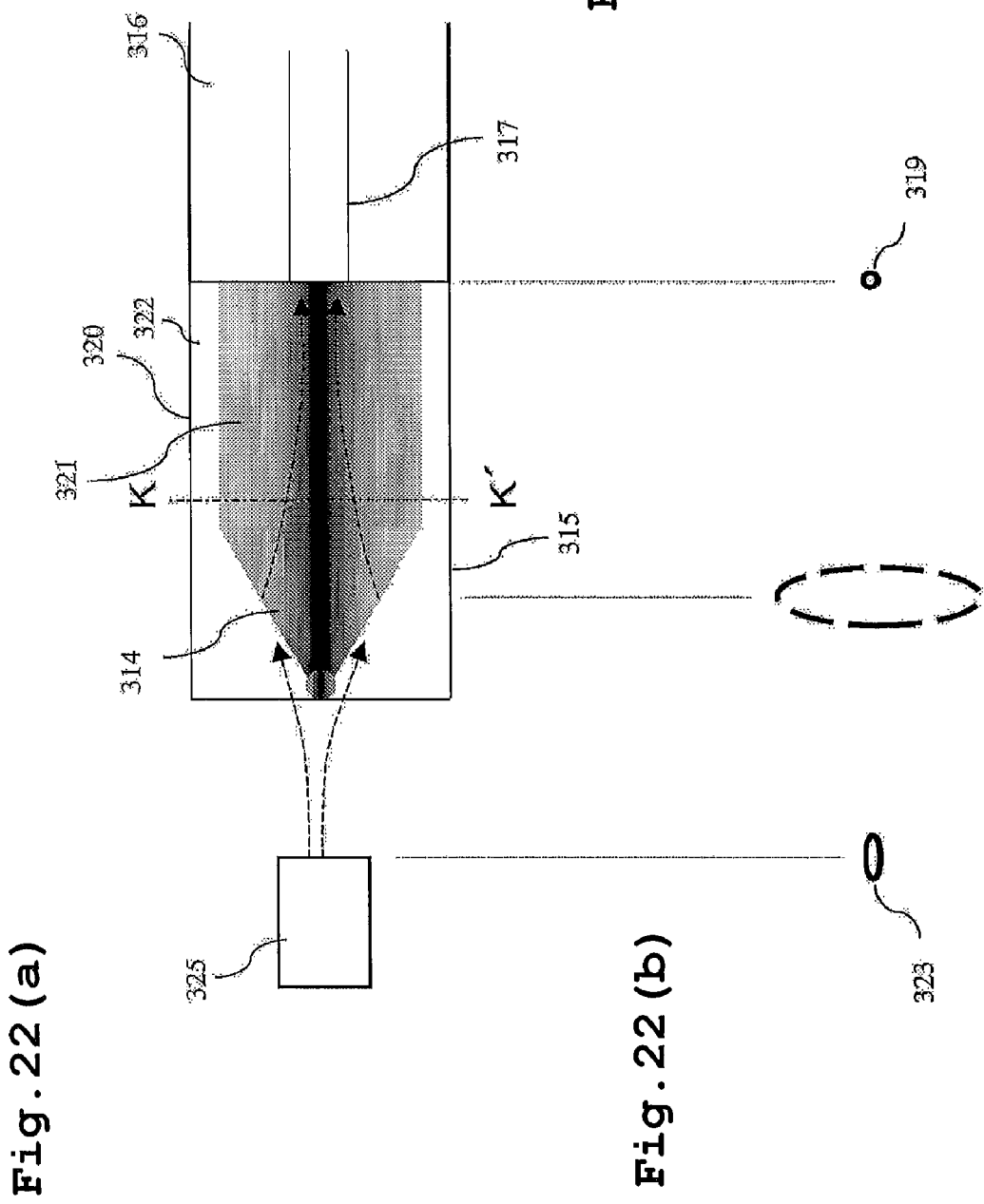

REFRACTIVE INDEX DISTRIBUTION TYPE OPTICAL MEMBER, AND PRODUCTION METHOD FOR REFRACTIVE INDEX DISTRIBUTION TYPE OPTICAL MEMBER

This application is a U.S. national phase application of PCT International Application PCT/JP2005/008964, filed May 17, 2005.

TECHNICAL FIELD

The present invention relates to a graded-index optical member and a manufacturing method of the graded-index optical member, etc. which are applied to optical communication or an optical network. More specifically, it relates to a polysilane optical member, etc. whose refractive index distribution can be controlled by increasing the concentration of siloxane structure in a core according to distance from a center centrosymmetrically.

BACKGROUND ART

A multi-mode optical waveguide can reduce a mode variance by having a refractive index distribution of decreasing in a core centrosymmetrically. The physical structure of the refractive index distribution depends on materials and production processes like the following conventional example.

A conventional graded-index optical waveguide is equipped with a predetermined mask for an optical medium, and gives a distribution to a refractive index of the optical waveguide by diffusing a diffusion source in the optical medium through an aperture of the mask (refer to, for example, Japanese Patent Laid-Open No. 57-198410 (page 2, FIG. 3); hereafter, this is called document 1).

In addition, there are also some which each radiate light to an optical medium, including monomer whose refractive index becomes small by photopolymerization, with being equipped with a mask with a predetermined transmittance, and give a distribution to a refractive index of an optical waveguide (refer to, for example, Japanese Patent Laid-Open No. 60-64310 (pages 2 to 3, FIG. 1): hereafter, this is called document 2).

Furthermore, there are also some which each are a method of utilizing the same photopolymerization reaction as that in document 2, and irradiate ultraviolet rays from two different directions to produce a waveguide lens which has a concentric refractive index distribution (refer to, for example, Japanese Patent Laid-Open No. 60-175010 (FIG. 7): hereafter, this is called document 3).

Moreover, there are also some which each are a method of utilizing the same photopolymerization reaction as that in document 2, and produce a graded-index waveguide by changing irradiation amount (refer to, for example, Japanese Patent Laid-Open No. 1-134310 (FIG. 1): hereafter, this is called document 4).

In addition, there are also some which each are equipped with a mask, which has a predetermined aperture portion, for optical plastics including metal salt of an organic carboxylic acid, and give a distribution to a refractive index of an optical waveguide by performing dipping in a solvent such as ethanol or acetone to diffuse the organic carboxylic acid outside (refer to, for example, Japanese Patent Laid-Open No. 60-188906 (pages 3 to 5, FIGS. 2 to 4): hereafter, this is called document 5).

On the other hand, surface mounting can be mentioned as the technology of low-cost and mass production of optical modules used for optical communication or optical networks. This is the technology of producing external forms of a semiconductor laser and a lens, which are required for an optical module, with high precision beforehand, and performing passive alignment by arranging them in submicron accuracy on a silicon substrate in which a V-groove and the like are formed, or arranging alignment marks for positioning with high precision on optical components, fetching the alignment marks with a CCD camera or the like, and arranging them with applying image processing technology. In the case of passive alignment, since each optical component is arranged without monitoring light amount inputted into an optical fiber, the process tolerance and arrangement accuracy of these optical components affect the light amount finally inputted into the optical fiber. Therefore, it is necessary to process each optical component precisely and to align it with high precision.

In addition, in the case of a multimode optical fiber (hereafter, this is abbreviated as an MMF) such as a plastic fiber, there is no photodiode which has a light-receiving area corresponding to its large-diameter core, and there are also no peripheral parts such as a small and low-loss coupler which controls full modes. On the other hand, in the case of a single mode optical fiber (hereafter, this is abbreviated as an SMF), mode control is easy and a core diameter is also small, and hence, it is possible to obtain small and low-price peripheral parts.

By the way, among conventional optical modules, there are some which each use a thin film waveguide which has a grating coupler and a waveguide lens, and couple light, inputted into the thin film waveguide through the waveguide lens with the grating coupler, with an external optical component (refer to, for example, Japanese Patent Laid-Open No. 62-280827 (FIG. 1); hereafter, this is called document 6).

In addition, there are some which each are constituted of a V-groove group which is formed in parallel on a Si substrate, an optical fiber group positioned by the V-groove group, a light source group arranged in the same pitches, and a Fresnel lens group positioned by the V-groove group (refer to, for example, Japanese Patent Application Laid-Open No. 2004-109498 (FIG. 1); hereafter, this is called document 7).

Furthermore, there are those which each make highly precise optical axis adjustment unnecessary in the assembly of an optical module by using a graded index lens (GRIN lens) (refer to, for example, Japanese Patent Laid-Open No. 11-271575; hereafter, this is called document 8).

FIG. 29 shows a side view of a conventional optical module 610 shown in document 8.

The optical module 610 is constituted of an optical fiber 614 which is sandwiched between and held by quartz blocks 613 which are arranged through a spacer 612 on a substrate 611 and are vertically dividable, and serves as an optical waveguide, a laser diode 616 which is equipped with a terminal 616a which is fixed to a holder 615, provided on the substrate 611, and into which an electric signal is inputted, a GRIN lens 617 which is arranged between the quartz block 613 and laser diode 616, and is coupled to the optical fiber 614.

When an electric signal is inputted into the terminal 616a of the laser diode from the external, the laser diode 616 emits light or quenches light according to the status change of this electric signal, for example, ON/OFF of the signal. An optical signal which this laser diode 616 emits is converged by the GRIN lens 617 to be introduced into the optical fiber 614, and finally, is outputted into the external of the optical module 610.

Nevertheless, since it is necessary to inject diffusion material into an optical medium from the aperture of the mask, the conventional method in document 1 has a first subject that process becomes complicated by the supply of the diffusion material, the corruption by the diffusion material, and the like.

In addition, since it is necessary to perform the wet processing of performing the dipping of an optical plastic including the metal salt of an organic carboxylic acid at a solvent such as ethanol or acetone, the conventional method in document 5 has a first subject that process becomes complicated also in this case.

Furthermore, although the conventional methods in documents 2 to 4 each can produce a graded-index waveguide by the installation of the mask which adjusts a light amount, and the simple process of optical irradiation since polymerizing monomer in an optical medium by light changes a refractive index, it has a second subject that its heatproof temperature is 80° C. or less, and it has no heat resistance beyond 100° C., since an acrylic resin such as PMMA is used for the material made by a photopolymerization reaction. Hence, although it is satisfactory in an indoor environment, it cannot be used for outdoor use or a car for which the heat resistance of 100° C. or more is required.

In addition, since a grating coupler is required in order to couple with a thin film waveguide, the conventional method in document 6 has a third subject that complicated process is required and expensive and it cannot be achieved in low cost.

Furthermore, since a Fresnel lens corresponding to the diameter level of an optical fiber currently used is expensive, the conventional method in document 7 also has a third subject that it is unrealizable in low cost.

Moreover, although being low cost since a bulk type GRIN lens (aperture of 1 mm or more) is used, the conventional method in document 8 has a fourth subject that the miniaturization of an optical module cannot be performed.

In addition, in this specification, an optical fiber diameter level is defined as the size of being tenfold or less of optical fiber diameter.

Furthermore, although it is possible to produce a small waveguide type graded index lens, any one of the conventional methods shown in documents 2 to 4 has a fifth subject that a step of producing a waveguide type graded index lens becomes a step different from a step of producing an optical module using the produced waveguide type graded index lens. Since an expense which is required in manufacturing process influences cost since the waveguide type graded index lens is very small and the resin material cost occupying a manufacturing expense is extremely small, a production expense of the optical module becomes high cost when the step of producing the waveguide type graded index lens and the step of producing the optical module are different steps in this manner.

FIG. 28 is a structural diagram of a production apparatus 511 of a conventional optical waveguide described in document 3.

A mask 514 is installed on a surface (top face) of a high polymer film 513. Two change sections 514c which make ultraviolet rays 515 permeate are formed in parallel in a predetermined interval on this mask 514. The change portions 514c each have a distribution of transmittance of the ultraviolet rays 515 changing in a transverse direction, and are constituted so that the transmittance of the ultraviolet rays 515 may become zero at both ends and the largest in the center. Then, a pair of mirrors 516 and a prism 517 are provided above the mask 514, the prism 517 being provided in the center.

The parallel ultraviolet rays 515 are irradiated from a light source, and the ultraviolet rays 515 are divided into the right and the left by the prism 517, and are reflected by each of the pair of mirrors 516 to be irradiated on the mask 514 from two directions. The ultraviolet rays 515 penetrate only the change portions 514c of the mask 514 to proceed into the film 513, and the ultraviolet rays 515 permeating both the change portions 514c intersect in the film 513 to produce a circular exposed portion. This exposed portion becomes an optical waveguide 512.

Thus, the optical waveguide 512 is produced by irradiating ultraviolet rays on the film 513, polymerizing monomer in the film 513, and making a refractive index distribution formed.

Then, since it is necessary further to perform the separated process of producing an optical module using this optical waveguide 512 in order to complete an optical module, it becomes in high cost.

A first object of the present invention is to provide a manufacturing method of a graded-index optical member which produces the graded-index optical member in a simple process by forming a core section by changing a refractive index by an oxidation reaction caused by UV irradiation and heating using sheet-like polysilane.

In addition, a second object of the present invention is to provide a graded-index optical member which has the heat resistance of 100° C. or more by forming a core section by changing a refractive index by an oxidation reaction caused by UV irradiation and heating using sheet-like polysilane.

In addition, a third object of the present invention is to provide an optical module which is possible to make an optical module in low cost which uses the graded-index optical member of the present invention which is produced in the simple process of forming a core section by changing a refractive index by an oxidation reaction caused by UV irradiation and heating using a sheet-like base material whose main component is polysilane.

In addition, a fourth object of the present invention is to provide an optical module which is possible to make a small optical module which uses the small graded-index optical member of the present invention which is produced in the process of forming a core section by changing a refractive index by an oxidation reaction caused by UV irradiation and heating using a sheet-like base material whose main component is polysilane.

In addition, a fifth object of the present invention is to provide optical modules and the manufacturing methods of an optical module of the present invention each of which produces a waveguide type graded index lens and is able to fix an optical component at the same time.

DISCLOSURE OF THE INVENTION

In order to solve the above problems, the 1st aspect of the present invention is a graded-index optical member, comprising:

a core section which has a maximum portion of a refractive index substantially at a center of a cross-section, and a refractive index which does not increase with distance from said maximum portion; and a clad section which contacts at least partially with a periphery of said core section, and whose refractive index is substantially uniform, wherein said graded-index optical member is sheet-like and polysilane is a main component.

Furthermore, the 2nd aspect of the present invention is the graded-index optical member according to the 1st aspect of the present invention, wherein said core section has a concentration distribution of siloxane structure, wherein said concentration does not decrease with distance from said maximum portion of a refractive index.

Furthermore, the 3rd aspect of the present invention is the graded-index optical member according to the 2nd aspect of the present invention, wherein a concentration distribution of said siloxane structure of said core section is a distribution which increases with distance from said maximum portion of the refractive index substantially as a parabola centrosymmetrically.

Furthermore, the 4th aspect of the present invention is the graded-index optical member according to the 2nd aspect of the present invention, wherein a concentration distribution of said siloxane structure of said core section is a distribution which changes along a propagating direction of light.

Furthermore, the 5th aspect of the present invention is the graded-index optical member according to the 4th aspect of the present invention, wherein a change of a concentration distribution of said siloxane structure which changes along a propagating direction of light is periodic.

Furthermore, the 6th aspect of the present invention is the graded-index optical member according to the 4th aspect of the present invention, wherein the concentration distribution of said siloxane structure changing along said propagating direction of light is combination of a portion which varies in both directions of a film thickness direction and a width direction of said sheet-like polysilane, and a portion which varies only in said film thickness direction.

Furthermore, the 7th aspect of the present invention is the graded-index optical member according to the 1st aspect of the present invention, wherein an optical axis in said core section is substantially a straight line, and length of said core section is adjusted so that a focal point is located in a desire position on said optical axis.

Furthermore, the 8th aspect of the present invention is the graded-index optical member according to the 1st aspect of the present invention, wherein a plurality of said core sections are provided.

Furthermore, the 9th aspect of the present invention is the graded-index optical member according to the 8th aspect of the present invention, wherein at least one pair of the plurality of said core sections are coupled in part optically.

Furthermore, the 10th aspect of the present invention is the graded-index optical member according to the 8th aspect of the present invention, wherein an optical axis in each of the plurality of said core sections is substantially a straight line; and wherein the plurality of said core sections are arranged in parallel without intersecting mutually.

Furthermore, the 11th aspect of the present invention is the graded-index optical member according to the 8th aspect of the present invention, wherein an optical axis in each of the plurality of said core sections is substantially a straight line; and wherein the plurality of said core sections are arranged in a zigzag shape with adjacent core sections intersecting in part in their end sections.

Furthermore, the 12th aspect of the present invention is the graded-index optical member according to the 1st aspect of the present invention, wherein a substrate transparent to at least ultraviolet rays is provided on at least one surface of both surfaces of top and bottom faces of said sheet-like polysilane.

Furthermore, the 13th aspect of the present invention is the graded-index optical member according to the 1st aspect of the present invention, wherein said core section has a refractive index distribution which decreases substantially along with a parabola in concentric ellipses according to distance from said maximum portion of the refractive index.

Furthermore, the 14th aspect of the present invention is the graded-index optical member according to the 1st aspect of the present invention, wherein said core section has a refractive index distribution which decreases substantially along with a parabola in concentric circles or concentric ellipses according to distance from said maximum portion of the refractive index, and a cross-section of at least one end section area of an input side and an output side has a shape whose area becomes small toward said end section.

Furthermore, the 15th aspect of the present invention is the graded-index optical member according to the 14th aspect of the present invention, wherein said end section of said core section has a curved surface shape.

Furthermore, the 16th aspect of the present invention is a manufacturing method of a graded-index optical member which uses a sheet-like base material whose main component is polysilane, said method comprising:

a UV irradiation step which irradiates ultraviolet rays simultaneously through mask plates respectively from a top face and a bottom face of said sheet-like base material in a desired formation position of said graded-index optical member on said sheet-like base material; and a heating step of heating said sheet-like base material with supplying oxygen.

Furthermore, the 17th aspect of the present invention is the manufacturing method of a graded-index optical member according to the 16th aspect of the present invention, wherein polysilane structure of said sheet-like base material changes with an oxidation reaction to siloxane structure, whose refractive index is smaller than that of the polysilane structure, by irradiating ultraviolet rays at said UV irradiation step, and performing heating with supplying oxygen at said heating step.

Furthermore, the 18th aspect of the present invention is the manufacturing method of a graded-index optical member according to the 16th aspect of the present invention, wherein said mask plate has a graded ultraviolet ray transmittance that portions where ultraviolet ray transmittances are minimum are distributed on lines parallel to a center line of a core section of said graded-index optical member to be produced, and a ultraviolet ray transmittance does not decrease according to distances from the minimum portions toward a plane perpendicular to the parallel lines.

Furthermore, the 19th aspect of the present invention is the manufacturing method of a graded-index optical member according to the 18th aspect of the present invention, wherein said ultraviolet ray transmittance of said mask plate increases substantially along with a parabola as being apart toward a plane perpendicular from said parallel line.

Furthermore, the 20th aspect of the present invention is the manufacturing method of a graded-index optical member according to the 19th aspect of the present invention, wherein said graded ultraviolet ray transmittance is a distribution that a portion where an ultraviolet ray transmittance increases as being apart from said parallel line toward a perpendicular plane is from said parallel line to predetermined distance, and said predetermined distance becomes short along said propagating direction of light.

Furthermore, the 21st aspect of the present invention is the manufacturing method of a graded-index optical member according to the 18th aspect of the present invention, wherein each of said two mask plates has a plurality of linear portions which are minimum portions of a ultraviolet ray transmittance in such arrangement of not intersecting mutually; and wherein a portion where an ultraviolet ray transmittance increases as being apart from each of said linear portions toward a perpendicular plane is from said linear portion to predetermined distance.

Furthermore, the 22nd aspect of the present invention is the manufacturing method of a graded-index optical member according to the 18th aspect of the present invention, wherein each of said two mask plates has a plurality of linear portions, which are minimum portions of a ultraviolet ray transmittance, in positions where adjacent ones are arranged in a zigzag shape with intersecting mutually in part in their end sections; and wherein a portion where an ultraviolet ray transmittance increases as being apart from each of said linear portions toward a perpendicular plane is from said linear portion to predetermined distance.

Furthermore, the 23rd aspect of the present invention is the manufacturing method of a graded-index optical member according to the 16th aspect of the present invention, wherein said mask plates provided on a top face and bottom face of said sheet-like base material have the same graded ultraviolet ray transmittance mutually.

Furthermore, the 24th aspect of the present invention is the manufacturing method of a graded-index optical member according to the 16th aspect of the present invention, wherein a graded ultraviolet ray transmittance of said mask plate provided on a top face of said sheet-like base material and a graded ultraviolet ray transmittance of said mask plate provided on a bottom face of said sheet-like base material have negative correlation mutually along a propagating direction of light in said graded-index optical member to be produced.

Furthermore, the 25th aspect of the present invention is the manufacturing method of a graded-index optical member according to the 16th aspect of the present invention, wherein a graded ultraviolet ray transmittance of said mask plate is a distribution which has at least a portion which changes along a propagating direction of light in said graded-index optical member to be produced.

Furthermore, the 26th aspect of the present invention is the manufacturing method of a graded-index optical member according to the 25th aspect of the present invention, wherein said graded ultraviolet ray transmittance is a distribution which changes periodically along said propagating direction of light.

Furthermore, the 27th aspect of the present invention is the manufacturing method of a graded-index optical member according to the 25th aspect of the present invention, wherein said graded ultraviolet ray transmittance is combination of a portion where an ultraviolet ray transmittance changes along said propagating direction of light, and a portion where an ultraviolet ray transmittance is uniform along said propagating direction of light.

Furthermore, the 28th aspect of the present invention is the manufacturing method of a graded-index optical member according to the 16th aspect of the present invention, wherein a substrate transparent to at least ultraviolet rays is provided on at least one surface of both surfaces of top and bottom faces of said sheet-like base material.

Furthermore, the 29th aspect of the present invention is an optical module comprising:

a graded-index optical member according to the 7th aspect of the present invention;

a light emitting section arranged so that light may be entered from one end section of a core section of said graded-index optical member; and a light-receiving section arranged so that the light emitted from another end section of said core section may be made to be received.

Moreover, the 30th aspect of the present invention is an optical module according to the 29th aspect of the present invention, wherein a plurality of said core sections is arranged in parallel on said graded-index optical member without intersecting mutually;

wherein a plurality of said light emitting sections are arranged respectively in respective one end sections of the plurality of said core sections; and wherein a plurality of said light-receiving sections are arranged respectively in respective other end sections of the plurality of said core sections.

In addition, the 31st aspect of the present invention is an optical module, comprising:

A graded-index optical member according to the 7th aspect of the present invention; and a plurality of optical filters which pass only the light at specific wavelengths and reflect light at a wavelength other than said specific wavelengths and in which said specific wavelengths are wavelengths different from each other, wherein a plurality of core sections of said graded-index optical member are arranged in a zigzag shape partially with intersecting with adjacent sections in those end sections;

wherein each of the plurality of said optical filters is arranged in a crossing section of said adjacent core sections; and wherein light at a multiple wave length is entered from one entrance of a core section which is endmost among the plurality of said core sections.

Furthermore, the 32nd aspect of the present invention is an optical module, comprising:

two graded-index optical members according to the 7th aspect of the present invention;

a light emitting section arranged so that light may be entered from one end section of a core section of one of said graded-index optical members;

a light receiving section arranged so that said light receiving section may receive light outgoing from one end section of the core section of another one of said graded-index optical members; and an optical component arranged between another end section of the core section of said one graded-index optical member, and another end section of the core section of said another graded-index optical member.

In addition, the 33rd aspect of the present invention is the optical module according to the 32nd aspect of the present invention, wherein said optical component is any one or combination of an isolator, a polarizer, a wavelength plate, an optical filter, and a photonic crystal, and is arranged so as to cross an optical axis of said two graded-index optical members.

Furthermore, the 34th aspect of the present invention is the optical module according to the 32nd aspect of the present invention, wherein a plurality of core sections of said two graded-index optical members are arranged in parallel without intersecting mutually;

wherein said light emitting sections and said light-receiving sections are plural respectively;

wherein the plurality of said light emitting sections are arranged respectively in respective one end sections of the plurality of core sections of said one graded-index optical member; and wherein the plurality of said light receiving sections are arranged respectively in respective one end sections of a plurality of core sections of said another graded-index optical member.

Moreover, the 35th aspect of the present invention is the optical module according to the 32nd aspect of the present invention, wherein the core section of said one graded-index optical member is one;

wherein the core sections of said another graded-index optical member are plural;

wherein said optical component is an optical branching device; and wherein light which is entered from one end section of said core section of said one graded-index optical member is branched by said optical branching device, and is emitted from respective one end sections of the plurality of said core sections of said another graded-index optical member.

In addition, the 36th aspect of the present invention is the optical module according to the 32nd aspect of the present invention, wherein the core sections of said one graded-index optical member are plural;

wherein the core section of said another graded-index optical member is one;

wherein said optical component is an optical coupling device; and wherein light which is entered from respective one end sections of the plurality of said core sections of said one graded-index optical member is coupled by said optical coupling device, and is emitted from one end section of said core section of said another graded-index optical member.

Furthermore, the 37th aspect of the present invention is the optical module according to the 32nd aspect of the present invention, further comprising:

another light receiving section arranged in one end section of the core section of said one graded-index optical member, wherein said optical component is an optical filter which passes only light at a specific wavelength and reflects light at a wavelength other than said specific wavelength;

wherein said light receiving section is arranged in a position where light, which comes from said light emitting section and which is entered from one end section of the core section of said one graded-index optical member passes said optical filter, and is emitted from one end section of the core section of said another graded-index optical member; and wherein said another light receiving section is arranged in a position where said light, which is entered from one end section of the core section of said one graded-index optical member is reflected by said optical filter, and is emitted from one end section of the core section of said one graded-index optical member.

In addition, the 38th aspect of the present invention is the optical module according to the 29th aspect of the present invention, wherein said graded-index optical member is arranged so that a core section may become in a state of imperfect alignment with said light emitting section and/or said light receiving section; and wherein an input/output direction of light to an input/output end section of said light emitting section and/or said light receiving section to the core section of said graded-index optical member is inclined.

Furthermore, the 39th aspect of the present invention is the optical module according to the 29th aspect of the present invention, wherein at least one of said graded-index optical member, said light emitting section, and said light receiving section is positioned by a groove formed for the positioning of surface mounting.

Moreover, the 40th aspect of the present invention is an optical module, comprising:

a graded-index optical member according to the 13th aspect of the present invention;

an input section which enters an elliptical shaped beam into an input end section of the core section of said graded-index optical member; and a light receiving section which receives an output beam emitted from an output end section of said core section, wherein directions of a major axis and a minor axis of an elliptic shape of said refractive index distribution of said core section coincide with directions of a minor axis and a major axis of said elliptical shaped beam which is entered from said input section, respectively.

In addition, the 41st aspect of the present invention is a manufacturing method of an optical module, comprising:

an arranging step of arranging a first optical component having a light emitting section and a second optical component having a light receiving section in a predetermined interval on a substrate so that said light emitting section and said light receiving section may face each other;

a coating step of filling or coating polysilane in a sheet-like form between said light emitting section and said light receiving section at least so as to lay said light emitting section and said light receiving section underground; and a polysilane curing step of making a refractive index distribution formed in said polysilane so that light emitted from said light emitting section may enter into said light receiving section, as well as curing said polysilane.

Furthermore, the 42nd aspect of the present invention is the manufacturing method of an optical module according to the 41st aspect of the present invention, wherein said polysilane curing step not only cures said polysilane by irradiating ultraviolet rays, but also forms a refractive index distribution which is maximum on an optical axis of an optical path from said light emitting section to said light receiving section, and which decreases as separating from said optical axis perpendicularly.

Moreover, the 43rd aspect of the present invention is the manufacturing method of an optical module according to the 41st aspect of the present invention, wherein said light emitting section is an end of a light source or an optical fiber; and wherein said light receiving section is a photodetector or an end of an optical fiber.

In addition, the 44th aspect of the present invention is the manufacturing method of an optical module according to the 41st aspect of the present invention, wherein said arranging step arranges said light emitting section and said light receiving section so that an optical axis of an optical path from said light emitting section to said light receiving section may become imperfect alignment with said light emitting section and/or said light receiving section.

Furthermore, the 45th aspect of the present invention is the manufacturing method of an optical module according to the 41st aspect of the present invention, wherein said substrate has a groove for the positioning of surface mounting; and wherein said arranging step performs arrangement with positioning at least either of said first optical component and said second optical component by said groove of positioning.

Moreover, the 46th aspect of the present invention is the manufacturing method of an optical module according to the 41st aspect of the present invention, wherein said arranging step fixes an optical fiber on said substrate, thereafter cuts said optical fiber on said substrate so that an interval between two edge faces after being cut may become said predetermined interval, and makes one edge face of said two edge faces said light emitting section, and another edge face said light receiving section.

In addition, the 47th aspect of the present invention is the manufacturing method of an optical module according to the 42nd aspect of the present invention, wherein at least a portion of said substrate corresponding to a portion of said polysilane in which said refractive index distribution is formed is transparent to an ultraviolet ray;

wherein said polysilane curing step arranges two mask plates in both sides of said substrate on which said sheet-like polysilane is filled or coated, and thereafter irradiates uniform ultraviolet rays from the outside of said two mask plates; and wherein both of said two mask plates have such an ultraviolet ray transmittance distribution that an ultraviolet ray transmittance of a portion corresponding to a portion with a large refractive index which is formed in said polysilane may become small and a ultraviolet ray transmittance of a portion corresponding to a portion with a small refractive index which is formed in said polysilane may become large.

Furthermore, the 48th aspect of the present invention is the manufacturing method of an optical module according to the 47th aspect of the present invention, wherein ultraviolet ray transmittance distributions of both of said two mask plates each are a distribution which is minimum in a linear portion of facing an optical axis connecting said light emitting section and said light receiving section with a straight line, and increases as being apart perpendicularly from said linear portion; and wherein a GRIN lens which has a refractive index distribution in which a refractive index becomes maximum on said optical axis and a refractive index decreases as being apart from said optical axis perpendicularly is formed between said light emitting section and said light receiving section at said polysilane curing step.

Moreover, the 49th aspect of the present invention is the manufacturing method of an optical module according to the 47th aspect of the present invention, wherein a plurality of said light receiving sections are provided; and wherein said two mask plates each have:

a first ultraviolet ray transmittance pattern corresponding to making a refractive index distribution, which forms a first GRIN lens connected to said light emitting section, formed in said polysilane;

a second ultraviolet ray transmittance pattern corresponding to making a refractive index distribution, which forms a second GRIN lens array constituted of a plurality of second GRIN lenses connected to said light receiving sections respectively, formed in said polysilane; and a third ultraviolet ray transmittance pattern which corresponds to making a refractive index distribution, which forms a branching path which branches light, emitted from said first GRIN lens, and enters it into each of said light receiving sections of said second GRIN lenses, formed in said polysilane, and is connected to said first ultraviolet ray transmittance pattern and said second ultraviolet ray transmittance pattern.

In addition, the 50th aspect of the present invention is the manufacturing method of an optical module according to the 47th aspect of the present invention, wherein a plurality of said light emitting sections are provided; and wherein said two mask plates each have:

a first ultraviolet ray transmittance pattern corresponding to making a refractive index distribution, which forms a first GRIN lens array constituted of a plurality of first GRIN lenses connected to said light emitting sections respectively, formed in said polysilane;

a second ultraviolet ray transmittance pattern corresponding to making a refractive index distribution, which forms a second GRIN lens connected to said light receiving section, formed in said polysilane; and a third ultraviolet ray transmittance pattern which corresponds to making a refractive index distribution, which forms a coupling path which couples light, emitted from each of said light emitting sections of said first GRIN lens array, and enters it into said second GRIN lens, formed in said polysilane, and is connected to said first ultraviolet ray transmittance pattern and said second ultraviolet ray transmittance pattern.

Furthermore, the 51st aspect of the present invention is the manufacturing method of an optical module according to the 41st aspect of the present invention, further comprising:

a cutting step of cutting said sheet-like polysilane into two pieces so as to cut an optical path from said light emitting section to said light receiving section; and a third optical component mounting step of arranging a third optical component between said sheet-like polysilane cut into two pieces.

In addition, the 52nd aspect of the present invention is the manufacturing method of an optical module according to the 41st aspect of the present invention, wherein a plurality of said light emitting sections and light receiving sections are provided respectively; and wherein said polysilane curing step makes a refractive index distribution, where a refractive index becomes maximum on each optical axis, and the refractive index decreases as being apart from said optical axis perpendicularly, formed every optical path to each of said light receiving sections corresponding to each of said light emitting sections.

Furthermore, the 53rd aspect of the present invention is the manufacturing method of an optical module according to the 52nd aspect of the present invention, comprising:

a cutting step of cutting said sheet-like polysilane into two pieces so as to cut all optical paths from said light emitting section to said light receiving section; and a third optical component mounting step of arranging a third optical component between said sheet-like polysilane cut into two pieces.

Moreover, the 54th aspect of the present invention is the manufacturing method of an optical module according to the 51st aspect of the present invention, wherein said third optical component is any one of an isolator, a polarizer, a wavelength plate, and a filter.

In addition, the 55th aspect of the present invention is an optical module, comprising:

a first optical component which has a light emitting section;

a second optical component which has a light receiving section separated in a predetermined interval from said light emitting section; and sheet-like cured polysilane, having a refractive index distribution, in which at least said light emitting section and said light receiving section are laid underground, said polysilane situated between said light emitting section and said light receiving section, and conveying light emitted from said light emitting section into said light receiving section.

Furthermore, the 56th aspect of the present invention is the optical module according to the 55th aspect of the present invention, wherein a refractive index distribution, where a refractive index becomes maximum on an optical axis of an optical path from said light emitting section to said light receiving section by irradiating ultraviolet rays having distribution of light amount, and the refractive index decreases with distance from said optical axis perpendicularly, is formed in said polysilane, and a GRIN lens is formed in said polysilane by the refractive index distribution; and wherein a concentration distribution of siloxane structure in said GRIN lens part is minimum on said optical axis and increases essentially parabolically with distance perpendicularly from said optical axis.

Moreover, the 57th aspect of the present invention is the optical module according to the 55th aspect of the present invention, wherein said light emitting section is an end of a light source or an optical fiber; and wherein said light receiving section is a photodetector or an end of an optical fiber.

In addition, the 58th aspect of the present invention is the optical module according to the 55th aspect of the present invention, wherein said light emitting section and said light receiving section are arranged so that an optical axis of an optical path from said light emitting section to said light receiving section may become imperfect alignment with said light emitting section and/or said light receiving section.

Furthermore, the 59th aspect of the present invention is the optical module according to the 55th aspect of the present invention, wherein said first optical component, said second optical component, and said polysilane are arranged on a substrate which has a groove of positioning of surface mounting; and wherein at least either of said first optical component and said second optical component is positioned by said groove of positioning.

Moreover, the 60th aspect of the present invention is the optical module according to the 55th aspect of the present invention, wherein there are a plurality of said light receiving sections; and wherein what are formed in said polysilane by its internal refractive index distribution are:

a first GRIN lens connected to the said light emitting section;

a plurality of second GRIN lenses connected to said light receiving sections respectively; and a branching path which branches light, emitted from said first GRIN lens, and enters it into the plurality of said second GRIN lenses.

In addition, the 61st aspect of the present invention is the optical module according to the 55th aspect of the present invention, wherein there are a plurality of said light receiving sections;

wherein what are formed in said polysilane by its internal refractive index distribution are:

a plurality of first GRIN lenses connected to said light emitting sections respectively;

a second GRIN lens connected to said light receiving section; and a coupling path which couples light, emitted from the plurality of said first GRIN lenses, and enters it into said second GRIN lens.

Furthermore, the 62nd aspect of the present invention is the optical module according to the 55th aspect of the present invention, further comprising:

a third optical component arranged between said polysilane so as to traverse said optical path.

Moreover, the 63rd aspect of the present invention is the optical module according to the 55th aspect of the present invention, wherein said light emitting sections and said light-receiving sections are plural respectively; and wherein GRIN lenses are formed in said polysilane by its internal refractive index distribution between the respective said light emitting sections and the respective above-mentioned light receiving sections corresponding to them.

In addition, the 64th aspect of the present invention is the optical module according to the 63rd aspect of the present invention, further comprising a third optical component arranged so as to traverse all optical paths from said light emitting sections to said light receiving sections.

Furthermore, the 65th aspect of the present invention is the optical module according to the 62nd aspect of the present invention, wherein said third optical component is any one of an isolator, a polarizer, a wavelength plate, and a filter.

In addition, the 66th aspect of the present invention is the optical module according to the 32nd aspect of the present invention, wherein said graded-index optical member is arranged so that a core section may become in a state of imperfect alignment with said light emitting section and/or said light receiving section; and wherein an input/output direction of light to an input/output end section of said light emitting section and/or said light receiving section to the core section of said graded-index optical member is inclined.

Furthermore, the 67th aspect of the present invention is the optical module according to the 32nd aspect of the present invention, wherein at least one of said graded-index optical member, said light emitting section, and said light receiving section is positioned by a groove formed for the positioning of surface mounting.

Moreover, the 68th aspect of the present invention is the manufacturing method of an optical module according to the 53rd aspect of the present invention, wherein said third optical component is any one of an isolator, a polarizer, a wavelength plate, and a filter.

Furthermore, the 69th aspect of the present invention is the optical module according to the 64th aspect of the present invention, wherein said third optical component is any one of an isolator, a polarizer, a wavelength plate, and a filter.

BRIEF DESCRIPTION OF THE DRAWINGS

FIG. 2(a) includes diagrams showing a change of internal structure by oxidation of a polysilane-based resin in the first embodiment of the present invention;

FIG. 2(b) is an explanatory diagram of a refractive index distribution, formed in sheet-like polysilane by oxidation, in the first embodiment of the present invention;

FIG. 4(a) is a schematic diagram of a mask used for producing a GI type linear waveguide of the first embodiment of the present invention;

FIG. 4(b) is a schematic diagram of a mask used for producing a GI type S-shaped waveguide of the first embodiment of the present invention;

FIG. 4(c) is a schematic diagram of a mask used for producing a GI type Y-branch of the first embodiment of the present invention;

FIG. 4(d) is a schematic diagram of a mask used for producing a GI type directional coupler of the first embodiment of the present invention;

FIG. 8(a) is a schematic diagram of an upper and lower mask used at the time of producing a GI type MMI coupler with its side wall exposed of a third embodiment of the present invention;

FIG. 8(b) is a schematic diagram of the GI type MMI coupler of the third embodiment of the present invention, whose side wall is exposed;

FIG. 8(c) is an F-F' sectional view of the GI type MMI coupler of the third embodiment of the present invention, whose side wall is exposed;

FIG. 9(a) is a schematic diagram of an upper and lower mask used at the time of producing a GI type MMI coupler with its sidewall not exposed of a third embodiment of the present invention;

FIG. 9(b) is a schematic diagram of the GI type MMI coupler of the third embodiment of the present invention, whose side wall is not exposed;

FIG. 9(c) is a G-G' sectional view of the GI type MMI coupler of the third embodiment of the present invention, whose side wall is not exposed;

FIG. 10(a) is a schematic diagram of an upper and lower mask used at the time of producing a GI type AWG of a fourth embodiment of the present invention;

FIG. 10(b) is a schematic diagram of the GI type AWG of the fourth embodiment of the present invention;

FIG. 13(a) is a structural diagram wherein a WG-GRIN lens of the fifth embodiment of the present invention coincide its optical axis of the optical fiber;

FIG. 13(b) is a structural diagram wherein a WG-GRIN lens of the fifth embodiment of the present invention displace its optical axis of the optical fiber;

FIG. 21(a) is a structural schematic diagram of an optical module of a twelfth embodiment of the present invention;

FIG. 21(b) is a diagram showing a beam shape of the optical module of the twelfth embodiment of the present invention;

FIG. 21(c) is a J-J' sectional view of a GI type waveguide elliptical lens which constitutes the optical module of the twelfth embodiment of the present invention;

FIG. 22(a) is a structural schematic diagram of an optical module of the twelfth embodiment of the present invention, where an output beam shape of a light source is elliptical;

FIG. 22(b) is a diagram showing a beam shape of the optical module of the twelfth embodiment of the present invention, where an output beam shape of a light source is elliptical;

FIG. 22(c) is a K-K' sectional view of the GI type waveguide elliptical lens which constitutes the optical module of the twelfth embodiment of the present invention, where an output beam shape of a light source is elliptical;

Figure 1A:
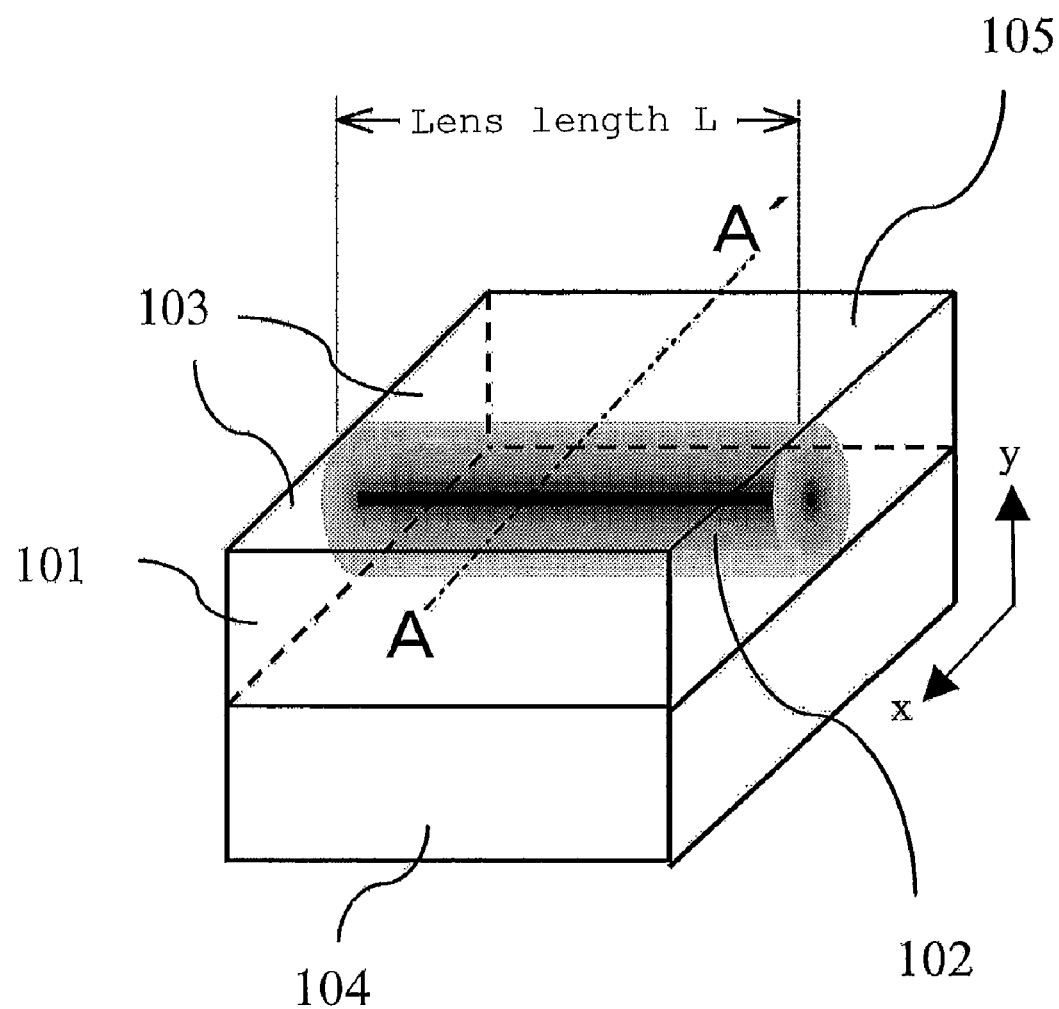
FIG. 1(a) is a structural schematic diagram of a graded-index optical waveguide (GI type optical waveguide) of a first embodiment of the present invention.

DESCRIPTION OF SYMBOLS 101 sheet-like polysilane
102 graded index (GI) core
103 clad
104 glass substrate
105 GI type optical waveguide
106 polysilane structure
107 siloxane structure
108 sheet-like polysilane
109 transparent substrate
110 UV irradiation
112 graded ultraviolet ray transmittance upper mask
113 graded ultraviolet ray transmittance lower mask
114 transparent substrate
115 UV irradiation
116 polysilane (after curing)
120 upper mask
121 lower mask
122 graded index (GI) core
123 clad
124 transparent substrate
130 upper mask
131 lower mask
132 graded index (GI) core
133 clad
134 transparent substrate
140 upper mask
141 lower mask
142 graded index (GI) core
143 clad
144 transparent substrate
145 GI type low refractive index portion
146 multiple incident light ($\lambda_1, \ldots, \lambda_n$)
147 multiple outgoing light ($\lambda_1, \ldots, \lambda_n$)
148 reflected light ($\lambda_1$)
149 GI type waveguide grating
150 GI type input waveguide
151 GI type output waveguide
152 graded index (GI) core
153 clad
154 transparent substrate
155 GI type slab
156 exposed edge face
157 GI type input waveguide mask portion
158 GI type output waveguide mask portion
159 GI type slab mask portion (edge face exposure type)
160 compound mask
161 GI type slab
162 GI type slab mask portion (edge face non-exposed type)
163 portion for core
164 portion for clad
165 compound mask
170 GI type input waveguide group
170 GI type output waveguide group
172 GI type array waveguide
173 GI type input slab
174 GI type output slab
175 multiple incident light ($\lambda_1, \ldots, \lambda_n$)
176 outgoing light ($\lambda_1), \ldots, (\lambda_n$)
177 GI type input waveguide group mask portion
175 GI type output waveguide group mask portion
179 GI type array waveguide mask portion 180 GI type input slab portion mask
181 GI type output slab portion mask
201 silicon substrate
202 light source
203 signal processing section
204 electric circuit section
205 V-groove
206 optical fiber
207 waveguide type graded index lens (WG-GRIN lens)
208 GI type core
211 transparent substrate
212 large-core diameter optical fiber
213 light-receiving section
220 light source array
221 optical fiber array
222 waveguide type graded index lens array (WG-GRIN lens array)
223 k-th filter
224 multiple-wavelength light $\lambda_1, \ldots, \lambda_7$)
225 k-th graded index core
226 clad
227 zigzag waveguide type graded index lens
228 input side optical fiber array
229 output side optical fiber array
230 optical isolator
231 input side waveguide type graded index lens array
232 output side waveguide type graded index lens array
233 polarizer
234 Faraday element
235 analyzer
236 branching device for single mode
237 input side multimode optical fiber
238 output side multimode optical fiber array
239 input side waveguide type graded index lens
240 output side waveguide type graded index lens array
241 input side waveguide type graded index lens
242 output side waveguide type graded index lens
243 input side graded index core
244 output side graded index core
245 input multiplexed light ($\lambda_1, \lambda_2, \lambda_3$)
246 output multiplexed light ($\lambda_1, \lambda_2$)
247 output light ($\lambda_3$)
248 clad
249 filter
250 first optical fiber
251 second optical fiber
252 third optical fiber
260 transparent substrate
261 graded index core
262 clad
263 single mode coupling device
264 output side multimode optical fiber
265 input side multimode optical fiber array
266 output side waveguide type graded index lens
267 input side waveguide type graded index lens array
270 transparent substrate
278 clad
281 silicon substrate
282 transparent substrate
283 signal processing section
284 electric circuit section
285 V-groove
286 waveguide type graded index lens (WG-GRIN lens)
293 transparent substrate
294 graded index core
295 clad
296 waveguide type graded index lens
297 transparent substrate
298 graded index core
299 clad
301 laser
302 input side lens
303 GI type elliptic core
304 GI type waveguide elliptical lens
305 clad
306 sheet-like polysilane
307 optical fiber
308 elliptical beam
309 circular beams
310 light source
311 GI type core
312 GI type waveguide lens
313 clad
314 tapered GI type lens
315 sheet-like polysilane
316 optical fiber
317 core
318 circular beam
319 circular beam
320 GI type waveguide elliptical lens
321 GI type core
322 clad
323 elliptical beam
325 light source
401 light source
402 optical fiber
403 gap
404 sheet-like polysilane (before curing)
405 graded index core
406 clad
407 waveguide type graded index lens (WG-GRIN lens)
408 fixed section
409 UV irradiation
410 graded UV transmittance upper mask
411 graded UV transmittance lower mask
412 photodetector
413 large-diameter optical fiber
414 optical fiber array
415 light source array
416 transparent substrate
417 transparent substrate
418 first cutting blade
419 first cut portion
420 filling nozzle
421 second cutting blade
422 second cut portion
423 optical isolator
424 input side multimode fiber (MMF)
425 output side multimode fiber (MMF) array
426 waveguide type graded index lens pattern
427 Y branching pattern for single mode fiber (SMF)
428 compound mask plate
429 input side waveguide type graded index lens
430 output side waveguide type graded index lens array
431 Y branching core for SMF
432 Y branching portion for SMF
440 transparent substrate
441 V-groove
442 transparent substrate
443 V-groove
444 sheet-like polysilane (before curing)
445 gap
446 TV irradiation
447 graded UV transmittance upper mask 448 graded UV transmittance lower mask
449 graded index core
450 clad
451 WG-GRIN lens
452 fixed section
453 gap
454 sheet-like polysilane (before curing)
455 UV irradiation
456 graded UV transmittance upper mask
457 graded UV transmittance lower mask
458 graded index core
459 clad
460 waveguide type graded index lens array
461 fixed section
462 optical fiber
463 gap
464 sheet-like polysilane (before curing)
465 UV irradiation
466 graded UV transmittance upper mask
467 graded UV transmittance lower mask
468 graded index core
469 clad
470 waveguide type graded index lens
471 fixed section
475 gap
476 sheet-like polysilane (before curing)
477 graded index core
478 clad
479 fixed section
480 transparent substrate

BEST MODE FOR CARRYING OUT THE INVENTION

Hereafter, embodiments of the present invention will described with referring to drawings.

Embodiment 1

Figure 1B:
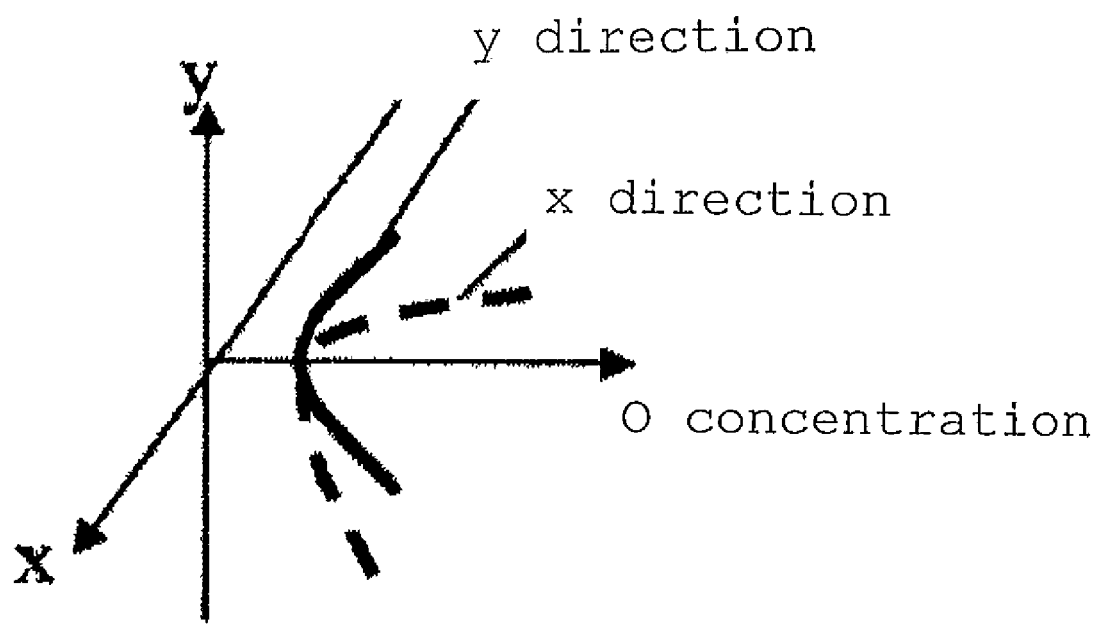
FIG. 1(b) is a graph showing oxygen concentration distribution of the GI type optical waveguide of the first embodiment of the present invention.
Figure 1C:
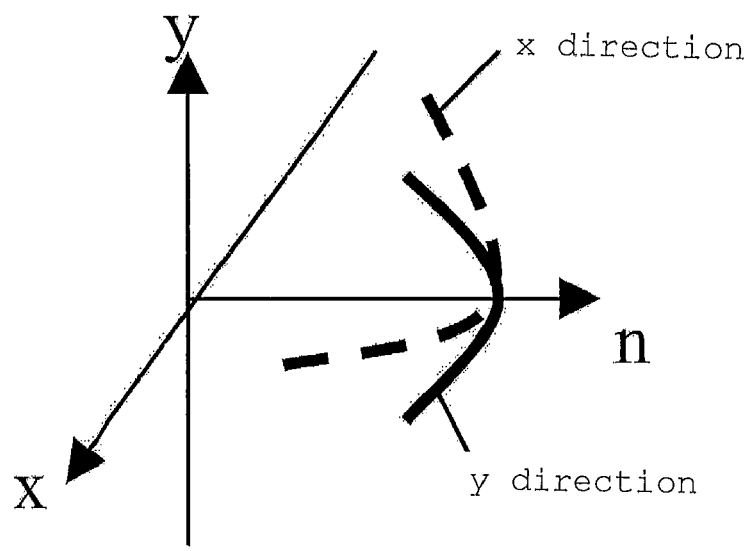
FIG. 1(c) is a graph showing a refractive index distribution of the GI type optical waveguide of the first embodiment of the present invention.
Figure 1D:
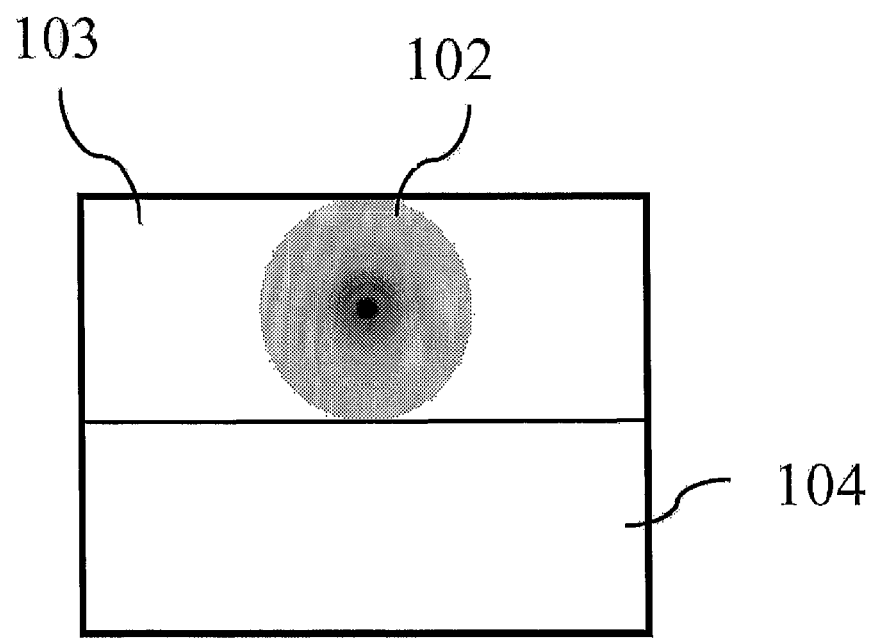
FIG. 1(d) is an A-A' sectional view of the GI type optical waveguide 105 of the first embodiment of the present invention.

FIG. 1(a) shows a structural schematic diagram of a graded-index optical waveguide (GI type optical waveguide) 105 of a first embodiment of the present invention. FIGS. 1(b) and 1(c) show an oxygen concentration distribution and a refractive index distribution of the GI type optical waveguide 105, respectively. In addition, FIG. 1(d) shows an A-A sectional view of the GI type optical waveguide 105 in FIG. 1(a). In addition, the GI type optical waveguide 105 is an example of a graded-index optical member of the present invention.

As shown in FIG. 1(a), this first embodiment is constituted of a GI type core 102 which has an in-plane refractive index distribution of sheet-like polysilane 101 (hereafter, this is referred to as GI), a clad 103 other than the GI type core 102, and, for example, a glass substrate 104 which supports the sheet-like polysilane 101, and is transparent to ultraviolet rays.

As shown in FIG. 1(b), the GI type core 102 has the oxygen concentration distribution which has a minimum portion on a center line of a cross-section, and increases according to distance from the minimum portion mostly along with a parabola centrosymmetrically. On the other hand, the clad 103 has an almost constant oxygen concentration.

Next, the manufacturing method of a GI type optical waveguide of this first embodiment and its principle will be explained using FIGS. 2 and 3.

FIG. 2(a) shows the change of internal structure of a polysilane based resin by oxidation. In addition, FIG. 2(b) is an explanatory diagram of a refractive index distribution formed in sheet-like polysilane by oxidation.

Polysilane structure 106 with a high refractive index in sheet-like polysilane 108 before curing is changed to siloxane structure 107 with a low refractive index by an oxidation reaction at the time of curing caused by UV (ultraviolet rays) exposure or heat treatment. Hence, as shown in FIG. 2(b), when UV irradiation 110 is given onto the sheet-like polysilane 108 before curing, which is coated on the transparent substrate 109, oxidation occurs by a reaction with oxygen in the air from an upper part given the UV irradiation 110 and the siloxane structure 107 is generated, and hence, the concentration of oxygen which constitutes the siloxane structure 107 decreases as it separates from a UV source.

Thus, since it is possible to distribute a portion of the polysilane structure 106 and a portion of the siloxane structure 107, generated by oxidation, by a method of the UV irradiation 110, and a supply method of oxygen to the sheet-like polysilane 108, it is possible freely to make a refractive index distribution formed. However, although it is possible to react with oxygen in an ambient atmosphere when film thickness of the sheet-like polysilane 108 is small, it is not possible to make a refractive index distribution formed in an inside where oxygen in an ambient atmosphere is unattainable in the case that the film thickness of the sheet-like polysilane 108 is large, or that the sheet-like polysilane 108 cannot touch directly air owing to a substrate or the like. In such a case, it is possible to make a refractive index distribution formed even in the inside where oxygen in an ambient atmosphere is unattainable by having diffused oxygen, an oxide, or a peroxide beforehand in the inside of the sheet-like polysilane 108 before curing.

In addition, when UV irradiation is performed from both sides of the top and bottom in FIG. 2(b), that is, also from the bottom of the transparent substrate 109, amounts of oxygen supply (oxygen concentrations before the siloxane structure 107 is generated) differ in a substrate side and an air side of the sheet-like polysilane 108, a refractive index in the air side where the amount of oxygen supply is large drops largely when amounts of UV irradiation to be given are equal in the top and bottom, and hence, a maximum refractive index position shifts to the substrate side. In this case, since the oxidation reaction in the air side is suppressed by making the amount of UV irradiation, irradiated from the substrate side, larger than that in the air side to make them asymmetrical, it is possible to make a refractive index distribution, which is symmetrical about a film thickness center, formed.

For example, what is necessary is just to perform the UV irradiation of the same intensity, from up-and-down double-sides of the sheet-like polysilane 108 before curing, so as to make a refractive index distribution, just in the case of a GI type slab waveguide, which has a maximum at a center in a film thickness direction and in which a refractive index decreases centrosymmetrically mostly along with a parabola according to distance from the center, formed.

However, when UV-irradiated from the substrate side at the time of performing curing by U exposure, a material transparent to UV, such as glass like quartz, borosilicate glass, or the like, a resin which passes UV, or a crystalline substrate such as $LiNbO_3$, and $LiTaO_3$ is used as a material of the transparent substrate 109.

In addition, when the film thickness of the sheet-like polysilane 108 is large or when the amounts of oxygen supply become asymmetrical in the upper and lower sides due to the transparent substrate 109, it is possible to adjust a refractive index distribution in a film thickness direction by adding oxygen, an oxide, or a peroxide to the sheet-like polysilane 108 beforehand or making the amounts of UV irradiation asymmetrical in the upper and lower sides.

Thus, as for polysilane, since the polysilane structure 106 is changed by an oxidation reaction to the siloxane structure 107 with a relatively low refractive index, a refractive index distribution inside the polysilane has negative correlation to the concentration of oxygen which constitutes the siloxane structure 107. Hence, since the GI type core 102 of the GI type optical waveguide 105 in FIG. 1(a) has the oxygen concentration distribution shown in FIG. 1(b), as shown in FIG. 1(c), the refractive index distribution inside the GI type core 102 becomes the distribution which has a maximum portion on a center line of a cross-section of the GI type core 102, and decreases according to distance from the maximum portion mostly along with a parabola centrosymmetrically. Hence, the refractive index distribution of the GI type core 102 in an A-A' cross-section of FIG. 1(a) becomes a circular distribution like FIG. 1(d). In addition, as to lightness and darkness of a portion of the GI type core 102 in FIG. 1(d), it is noted that a dark portion has a high refractive index, and a light portion has a low refractive index.

Since the refractive index distribution inside the polysilane has negative correlation to the oxygen concentration, the oxygen concentration distribution of the GI type core 102 becomes the distribution which has a minimum portion on the center line of its cross-section, and increases according to distance from the minimum portion mostly along with a parabola centrosymmetrically. Since the oxygen concentration distribution inside the polysilane depends on the concentration distribution of siloxane structure, it is possible to make the refractive index distribution, as shown in FIG. 1(c), formed by making the concentration distribution of siloxane structure inside the GI type core 102 the distribution that has a minimum portion on the center line of the cross-section and increases according to the distance from the minimum portion mostly along with a parabola centrosymmetrically.

Thus, it is possible to produce the GI type optical waveguide 105 by controlling the oxygen concentration distribution inside the polysilane, i.e., controlling the concentration distribution of the siloxane structure inside the polysilane.

In addition, in the GI type optical waveguide 105 of this first embodiment, although the GI type core 102 has structure that a portion except the upper portion and lower portion of its periphery contacts with the clad 103, as shown in FIG. 1(d), such structure that the entire periphery of the GI type core 102 contact with the clad 103 may be also sufficient.

Next, a manufacturing method of the GI type optical waveguide 105 made of polysilane in FIG. 1(a) in which a refractive index is distributed two-dimensionally in a film thickness direction and a width direction as shown in FIG. 1(c) will be explained.

Figure 3A:
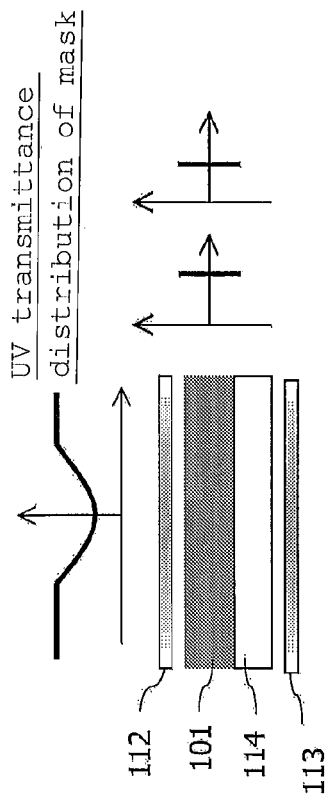
FIG. 3(a) is a drawing showing a preparation of a manufacturing method of the GI type optical waveguide of the first embodiment of the present invention.
Figure 3B:
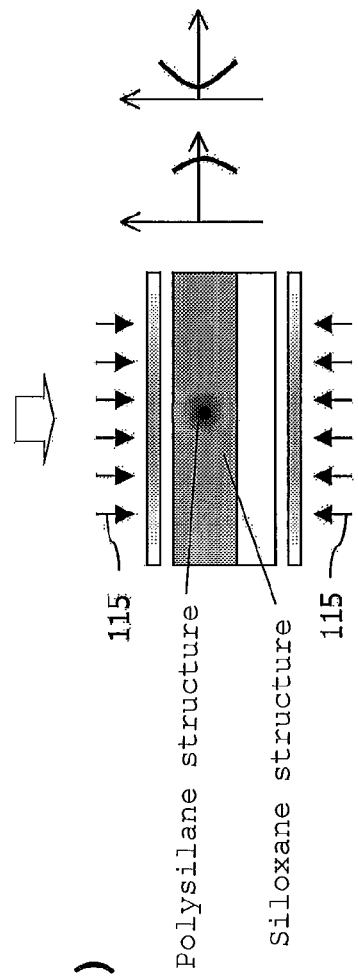
FIG. 3(b) is a drawing showing a UV irradiation step of the manufacturing method of the GI type optical waveguide of the first embodiment of the present invention.
Figure 3C:
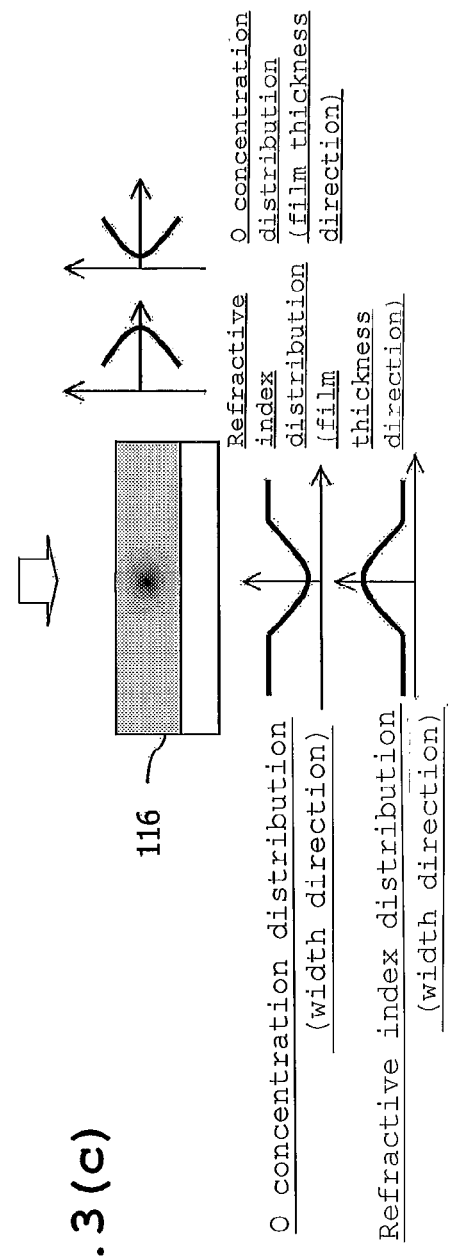
FIG. 3(c) is a drawing showing a GI type optical waveguide completed by the manufacturing method of the GI type optical waveguide of the first embodiment of the present invention.

FIG. 3 is a drawing showing manufacturing steps of the GI type optical waveguide 105, FIG. 3(a) shows a preparation step, FIG. 3(b) shows a UV irradiation step, and FIG. 3(c) shows a completed GI type optical waveguide.

First, as shown in FIG. 3(a), the sheet-like polysilane (before curing) 101 is coated on the transparent substrate 114. Then, the graded UV transmittance upper mask 112 is arranged on a top face on the transparent substrate 114 on which the sheet-like polysilane (before curing) 101 is coated, and the graded UV transmittance lower mask 113 is arranged on a bottom face, respectively. In addition, a substrate transparent at least to ultraviolet rays, that is, a substrate which passes at least wavelengths in an ultraviolet region is used for the transparent substrate 114. Furthermore, the polysilane (before curing) 101 corresponds to an example of a sheet-like base material of the present invention which uses polysilane as a main component.

A graph shown above the graded UV transmittance upper mask 112 in FIG. 3(a) shows a UV (ultraviolet rays) transmittance distribution in a width direction (crosswise direction in FIG. 3) of a portion corresponding to a position of the graded UV transmittance upper mask 112 and graded UV transmittance lower mask 113 which are shown in FIG. 3(a). Thus, both of the graded UV transmittance upper mask 112 and the graded U transmittance lower mask 113 each have a v (ultraviolet rays) graded transmittance which has a minimum portion on a line parallel to a center line of the GI type core 102 of the GI type optical waveguide 105 at the desired length, and increases according to distance from the above-mentioned minimum portion in a perpendicular direction of the parallel lines mostly along with a parabola centrosymmetrically. As to lightness and darkness which shows UV graded transmittances of the graded UV transmittance upper mask 112 and the graded UV transmittance lower mask 113 and is shown in FIGS. 3(a) and 3(b), a dark one shows a low transmittance (hard to pass ultraviolet rays), and a light one shows a high transmittance (easy to pass ultraviolet rays).

Next, as shown in FIG. 3(b), heating is performed while supplying oxygen, and the same quantities of UV (ultraviolet rays) exposure 115 are uniformly performed through the graded UV transmittance upper mask 112 and the graded UV transmittance lower mask 113, which each have the above-mentioned graded transmittance from two directions of a top direction and a bottom direction of the sheet-like polysilane (before curing) 101.

Thus, by performing the UV irradiation 115, it is possible to produce an optical waveguide which has a refractive index distribution which is film-thickness-center symmetric in a film thickness direction, and is width-center symmetric and has negative correlation to a graded transmittance of a mask in a width direction, that is, has a maximum at centers of film thickness and width and decreases according to distances from the centers of them centrosymmetrically mostly along with a parabola. As shown in FIG. 3(c), the polysilane (after curing) 116 becomes the optical waveguide which has such a refractive index distribution.

In addition, as to lightness and darkness which shows the graded indices of the polysilane (before curing) 101 and polysilane (after curing) 116 in FIGS. 3(a) to 3(c), it is shown that a dark portion has a high refractive index and a light portion has a low refractive index, and as shown in FIGS. 3(a) to 3(c), a distribution state of the refractive index changes according to the UV irradiation 115.

When this refractive index distribution is a centrosymmetric distribution, it becomes a distribution along with a parabola approximately. However, since the transmittances of the graded UV transmittance upper mask 112 and the graded UV transmittance lower mask 113 in a width direction which correspond to the clad 103 are constant, a centrosymmetric refractive index distribution exists in the film thickness direction of the clad 103 strictly. However, since the clad 103 receives a larger amount of UV irradiation 115 than that of the GI type core 102 and a rate of the siloxane structure 107 is large, the refractive index distribution of the clad 103 can be disregarded as compared with the refractive index distribution of the GI type core 102.

In addition, a graph shown below FIG. 3(c) shows a concentration distribution of O (oxygen) and a refractive index distribution which constitutes the siloxane structure 107 in a width direction, the concentration distribution and refractive index distribution corresponding to the position of the polysilane (after curing) 116 shown in FIG. 3(c). Thus, contrary to the refractive index distribution, the concentration distribution of oxygen which constitutes the siloxane structure 107 becomes a distribution which has a minimum at a center in the width direction and increases according to distance from the center centrosymmetrically mostly along with a parabola.

Furthermore, graphs shown in the right of FIGS. 3(a) to 3(c) show graded indices and concentration distributions of oxygen, which constitutes the siloxane structure 107, in the film thickness direction which correspond to the positions of the polysilane (before curing) 101 and polysilane (after curing) 116 which are shown in respective drawings in respective steps. Thus, the refractive index distribution and oxygen concentration distribution in the film thickness direction change according to the UV irradiation 115.

Moreover, in the case that the film thickness of the sheet-like polysilane (before curing) 101 is large or amounts of oxygen supply become asymmetric in the upper and lower sides by the transparent substrate 114, similarly to the case of the GI type slab waveguide mentioned above, it is possible to adjust the refractive index distribution in the film thickness direction by having an oxygen, an oxide, or a peroxide added to the sheet-like polysilane (before curing) 101 beforehand or making the amounts of UV irradiation 115 asymmetrical in the upper and lower sides.

In addition, generally, although it is necessary to mount an optical waveguide on a substrate for retention, a portion of the transparent substrate 114 can be used as the substrate for retention as it is, in the optical waveguide produced by this first embodiment. Hence, it is not necessary to prepare the substrate for retention separately, and it is possible to obtain an effect that a step of mounting it on the substrate for retention becomes unnecessary.

FIGS. 4(a) to 4(d) show schematic diagrams of masks for optical waveguides which have graded transmittances which control ultraviolet quantities and are used by the manufacturing method of the graded-index optical waveguide of this first embodiment. Each refractive index distribution of these masks for optical waveguides in the film thickness direction is constant.

FIG. 4(a) shows the graded UV transmittance upper mask 112 and the graded UV transmittance lower mask 113 in FIG. 3 which are explained above.

In addition to the GI type linear waveguide shown in FIG. 4(a), it is possible to produce various patterns of GI type optical waveguides by using a mask where a center line where transmittance becomes a minimum is a curve or a plurality of center lines exist. For example, it is possible to produce a GI type S-shaped waveguide by using the mask in FIG. 4(b), to produce a GI type Y branch by using the mask in FIG. 4(c), and to produce the GI type directional coupler by using the mask in FIG. 4(d).

Furthermore, each of the GI type linear waveguide, GI type S-shaped waveguide, and GI type Y branch which are produced using each mask in FIGS. 4(a) to 4(c) corresponds to an example of the graded-index optical member of the present invention. In addition, the GI type directional coupler produced with the mask in FIG. 4(d) corresponds to an example of the graded-index optical member of the present invention where at least one pair of core sections is coupled optically in part.

Moreover, as for the lightness and darkness which shows a refractive index distribution of an optical waveguide in each drawing, although it is shown that a dark one has a high refractive index and a light one has a low refractive index, as for the lightness and darkness which shows a graded ultraviolet ray transmittance of a mask, it is shown that a dark one have a low transmittance (hard to pass ultraviolet rays) and a light one has a high transmittance (easy to pass ultraviolet rays).

In addition, in the present invention, to make polysilane a main component means that other components may be included so long as polysilane is made a main component regardless of a material for production or a product.

Embodiment 2

A GI type optical waveguide of a second embodiment of the present invention is a GI type optical waveguide which is producible by using a mask, where a graded ultraviolet ray transmittance changes along a propagating direction, by the process of using the sheet-like polysilane of the first embodiment. In addition, the GI type optical waveguide of the second embodiment corresponds to an example of the graded-index optical member of the present invention.

Figure 5A:
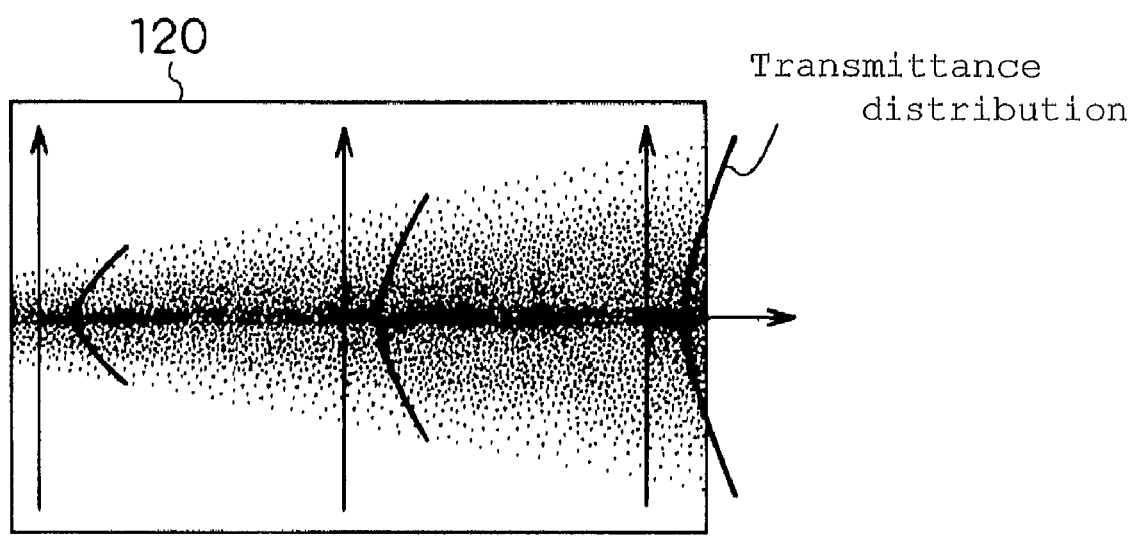
FIG. 5(a) is a schematic diagram of an upper mask used at the time of producing a GI type beam converter of a second embodiment of the present invention.
Figure 5B:
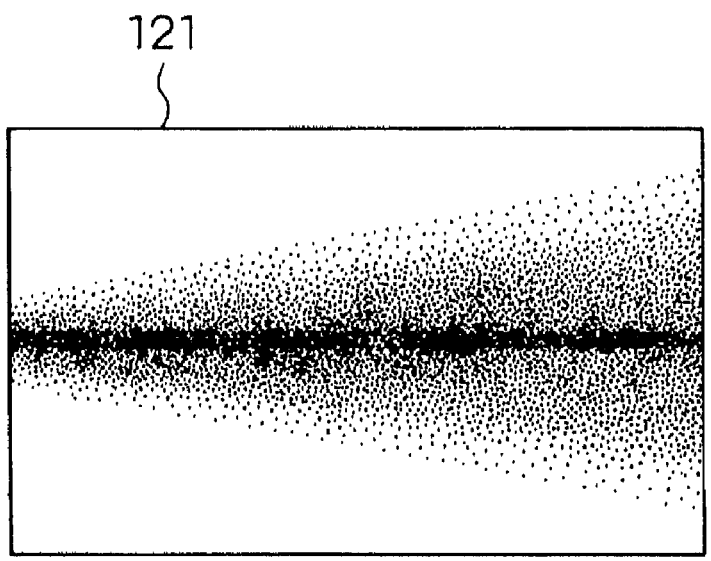
FIG. 5(b) is a schematic diagram of a lower mask used at the time of producing the GI type beam converter of the second embodiment of the present invention.
Figure 5C:
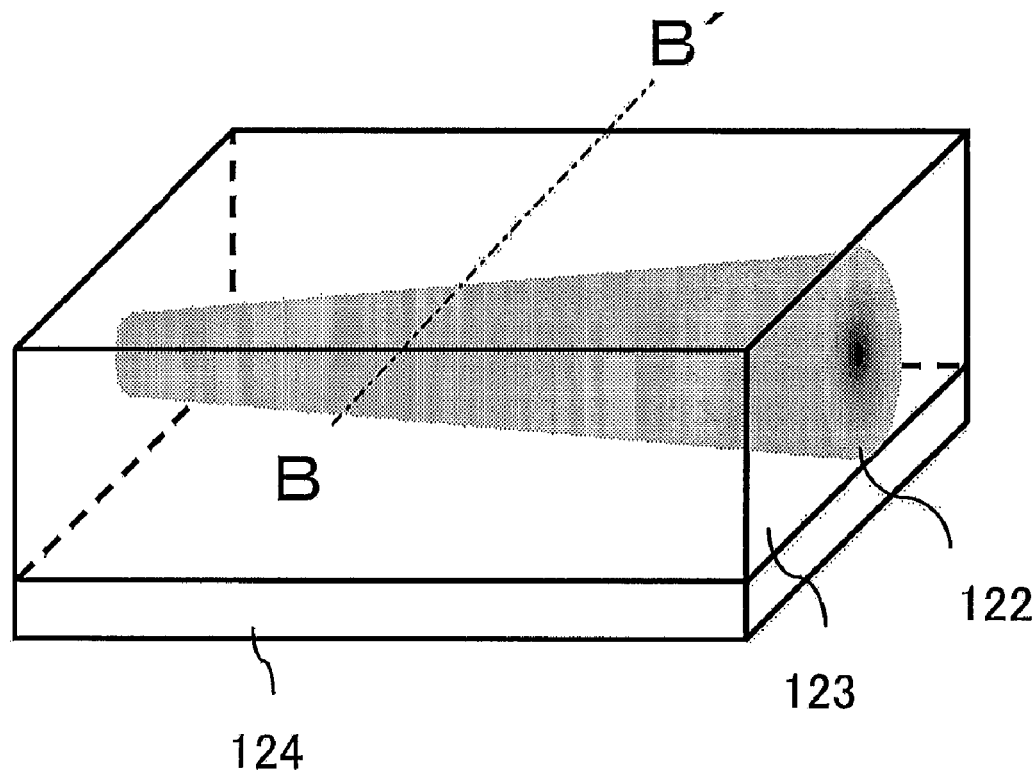
FIG. 5(c) is a schematic diagram of the GI type beam converter of the second embodiment of the present invention.
Figure 5D:
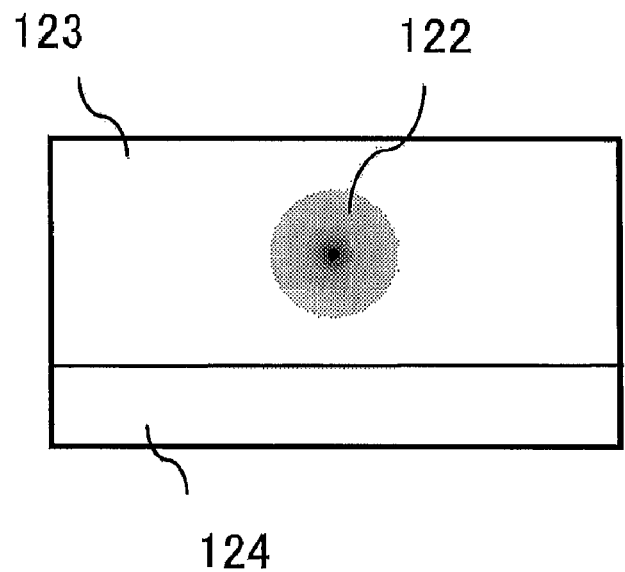
FIG. 5(d) is a B-B' sectional view of the GI type beam converter of the second embodiment of the present invention.

FIGS. 5(a) and 5(b) show schematic diagrams of upper and lower masks used when producing a GI type beam transducer whose mode field diameters differ at an input terminal and an output terminal, FIG. 5(c) shows a schematic diagram of the GI type beam transducer produced, and FIG. 5(d) shows a B-B' sectional view thereof respectively.

In the process of using the same sheet-like polysilane as that of the first embodiment in FIG. 3, UV irradiation is performed using an upper mask 120 as the graded UV transmittance upper mask 112, and using a lower mask 121 as the graded UV transmittance lower mask 113. Thus, when using the upper mask 120 and the lower mask 121 where the rates of change of the graded ultraviolet ray transmittances are changed with corresponding to core diameters changing in a propagating direction, the refractive index distribution which changes along the propagating direction of light is formed in a GI type core 122, and the GI type beam transducer whose mode field diameters differ at the input terminal and an output terminal as shown in FIG. 5(c) can be produced. Since an oxygen concentration distribution of the GI type core 122 and a concentration distribution of siloxane structure are distributions contradictory to a refractive index distribution, these distributions become distributions also changing along the propagating direction of light.

Figure 6A:
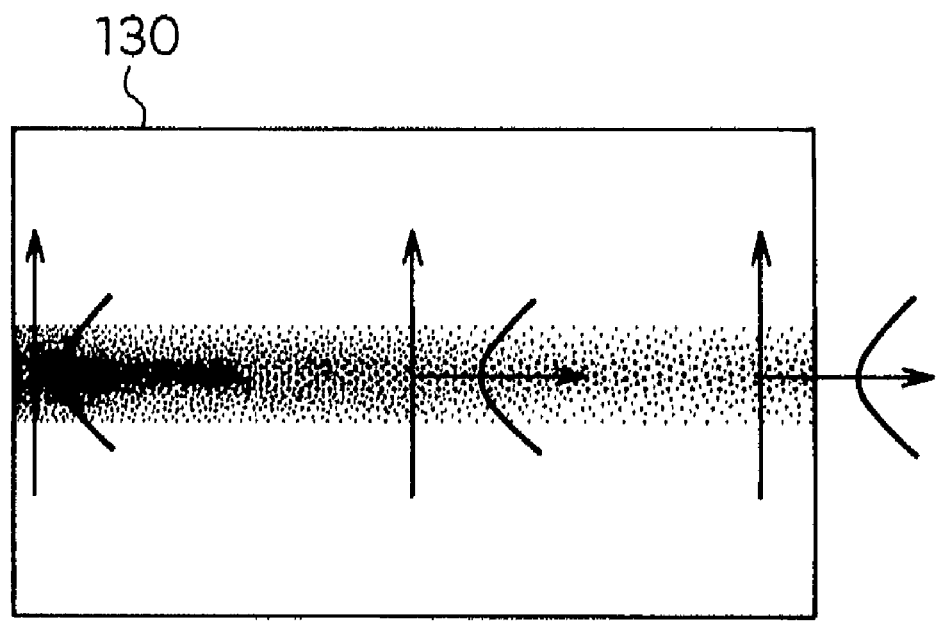
FIG. 6(a) is a schematic diagram of an upper mask used at the time of producing a GI type three-directional optical waveguide of the second embodiment of the present invention.
Figure 6B:
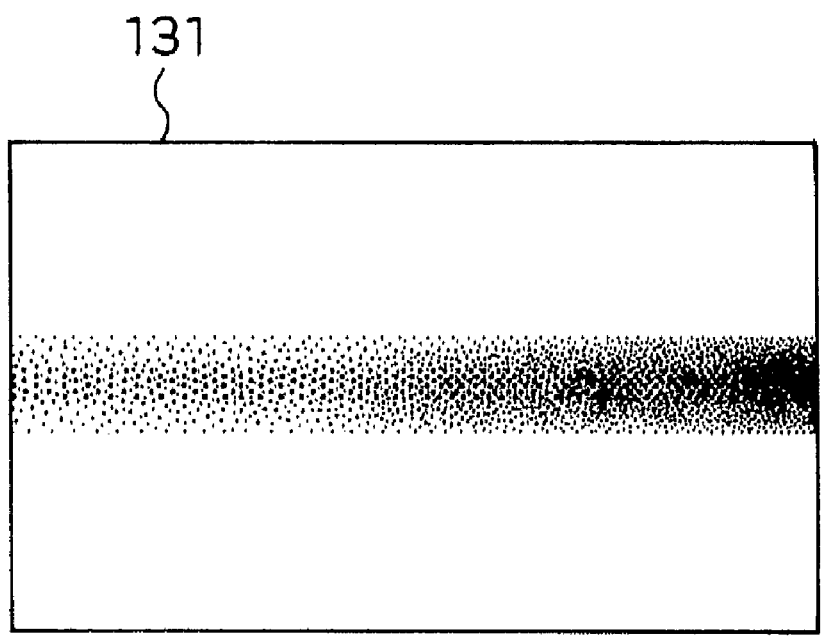
FIG. 6(b) is a schematic diagram of a lower mask used at the time of producing the GI type three-directional optical waveguide of the second embodiment of the present invention.
Figure 6C:
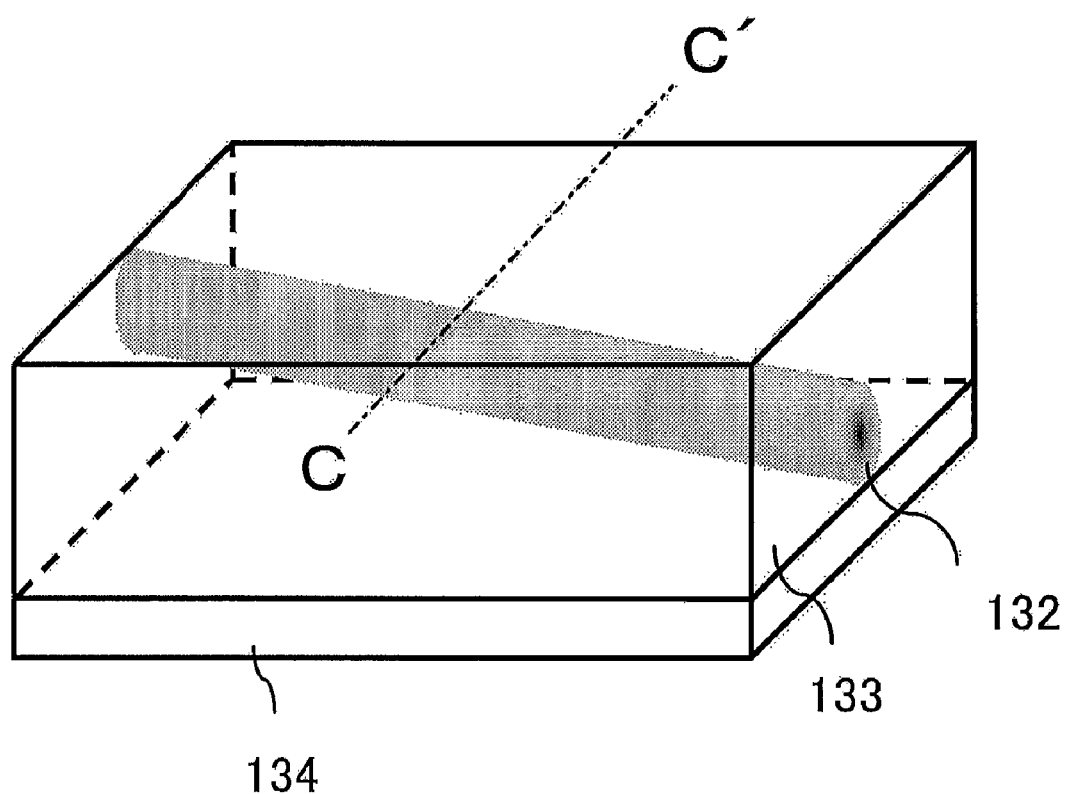
FIG. 6(c) is a schematic diagram of the GI type three-directional optical waveguide of the second embodiment of the present invention.
Figure 6D:
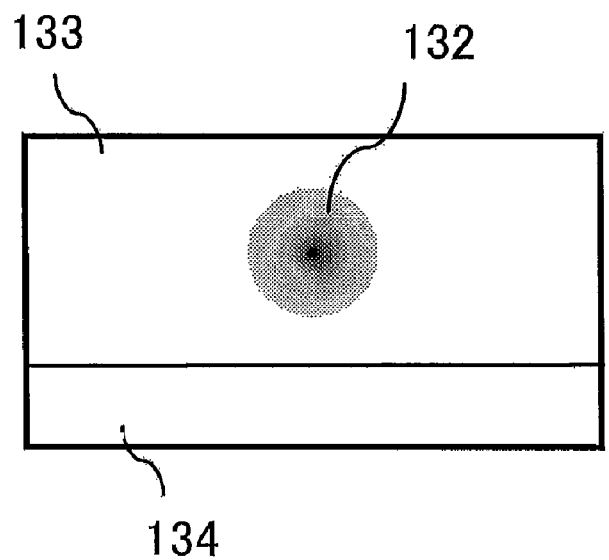
FIG. 6(d) is a C-C sectional view of the GI type three-directional optical waveguide of the second embodiment of the present invention.

FIGS. 6(a) and 6(b) show schematic diagrams of upper and lower masks used when producing a GI type three-dimensional optical waveguide where a core changes in the film thickness direction of the sheet-like polysilane, FIG. 6(c) shows a schematic diagram of the GI type three-dimensional optical waveguide produced, and FIG. 6(d) shows a C-C' sectional view thereof, respectively.

In the process of using the same sheet-like polysilane as that of the first embodiment in FIG. 3, UV irradiation is performed using an upper mask 130 as the graded UV transmittance upper mask 112, and using a lower mask 131 as the graded UV transmittance lower mask 113. Thus, although upper and lower shapes of the graded ultraviolet ray transmittance is the same along the propagating direction, when the upper mask 130 and the lower mask 131 which have graded ultraviolet ray transmittances whose absolute values have inverse correlation (the transmittance of the upper mask rises from the left to the right, and the transmittance of the lower mask drops) are used, it is possible to produce the GI type three-dimensional optical waveguide where the GI type core 122 changes in the film thickness direction of sheet-like polysilane from the left to the right as shown in FIG. 6(c).

Figure 7A:
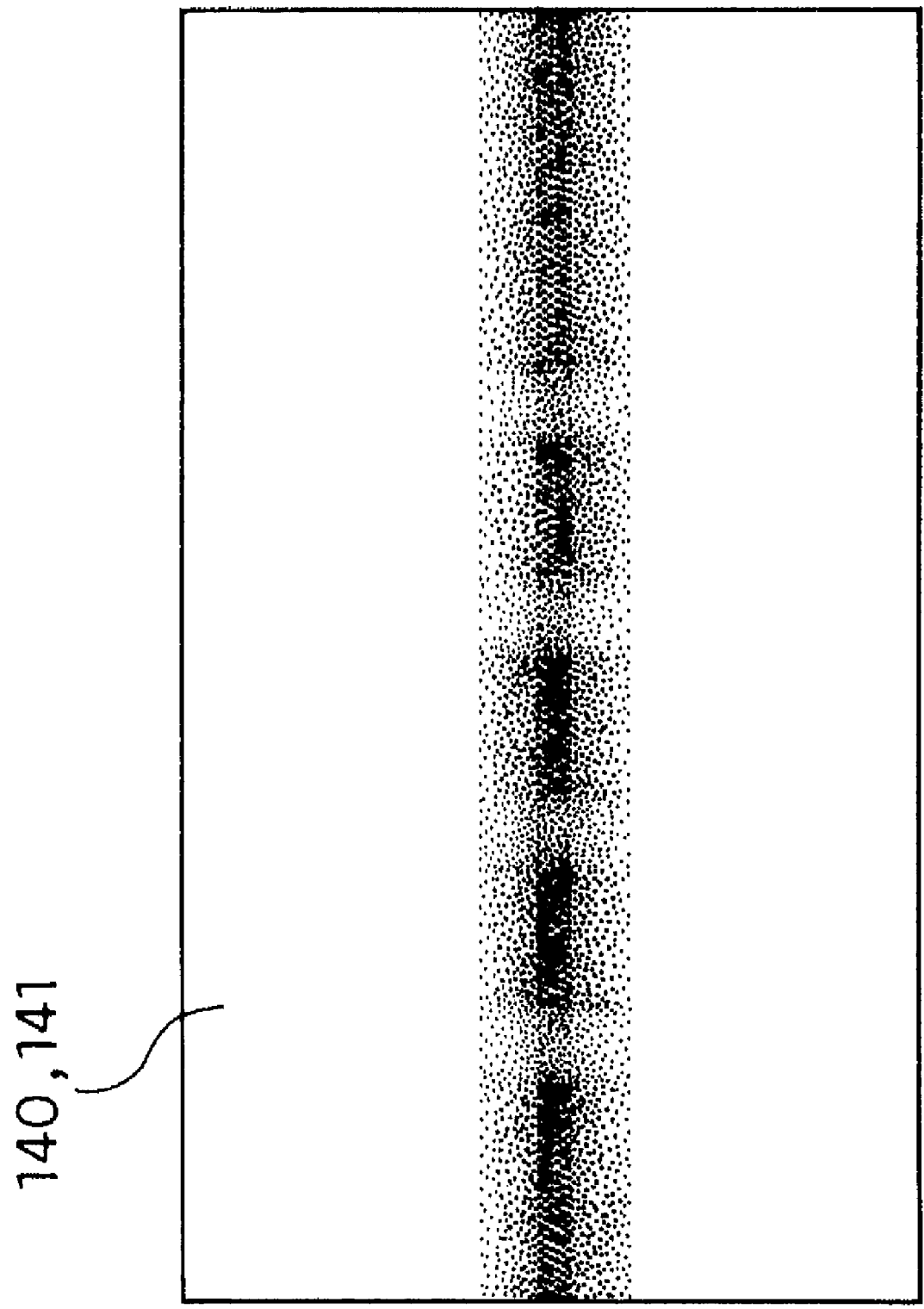
FIG. 7(a) is a schematic diagram of an upper and lower mask used at the time of producing a GI type grating filter of the second embodiment of the present invention.
Figure 7B:
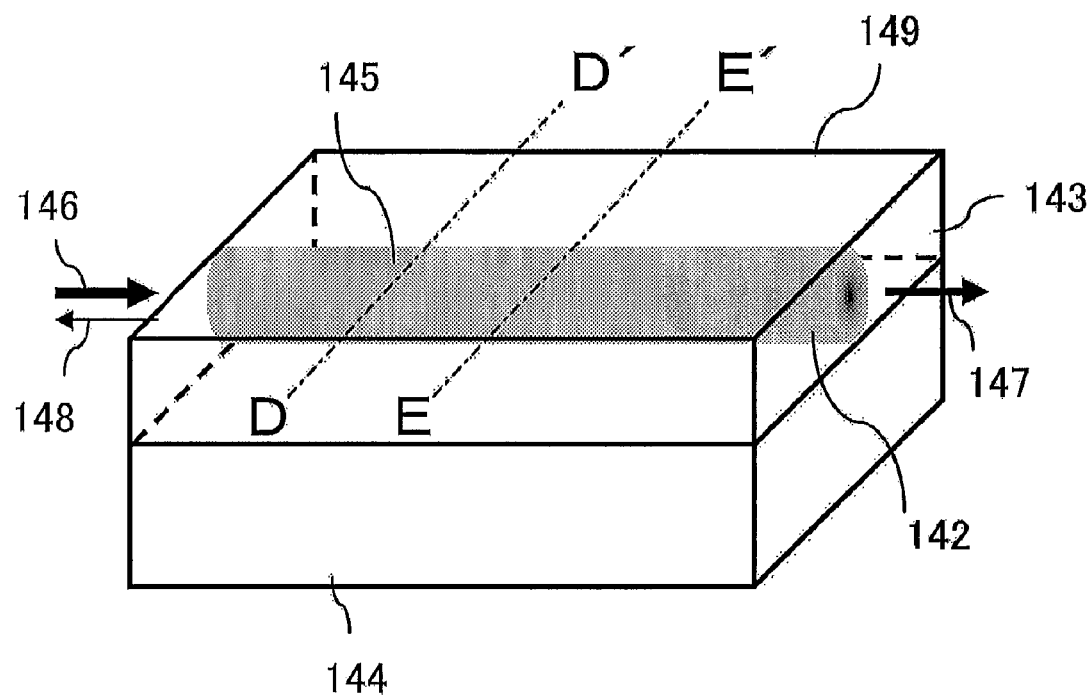
FIG. 7(b) is a schematic diagram of the GI type grating filter of the second embodiment of the present invention.
Figure 7C:
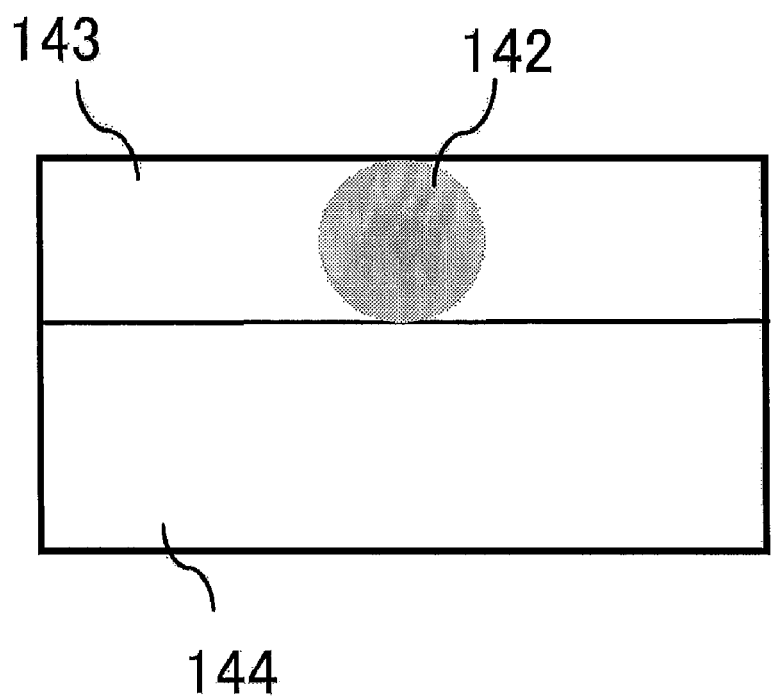
FIG. 7(c) is a D-D' sectional view of the GI type grating filter of the second embodiment of the present invention.
Figure 7D:
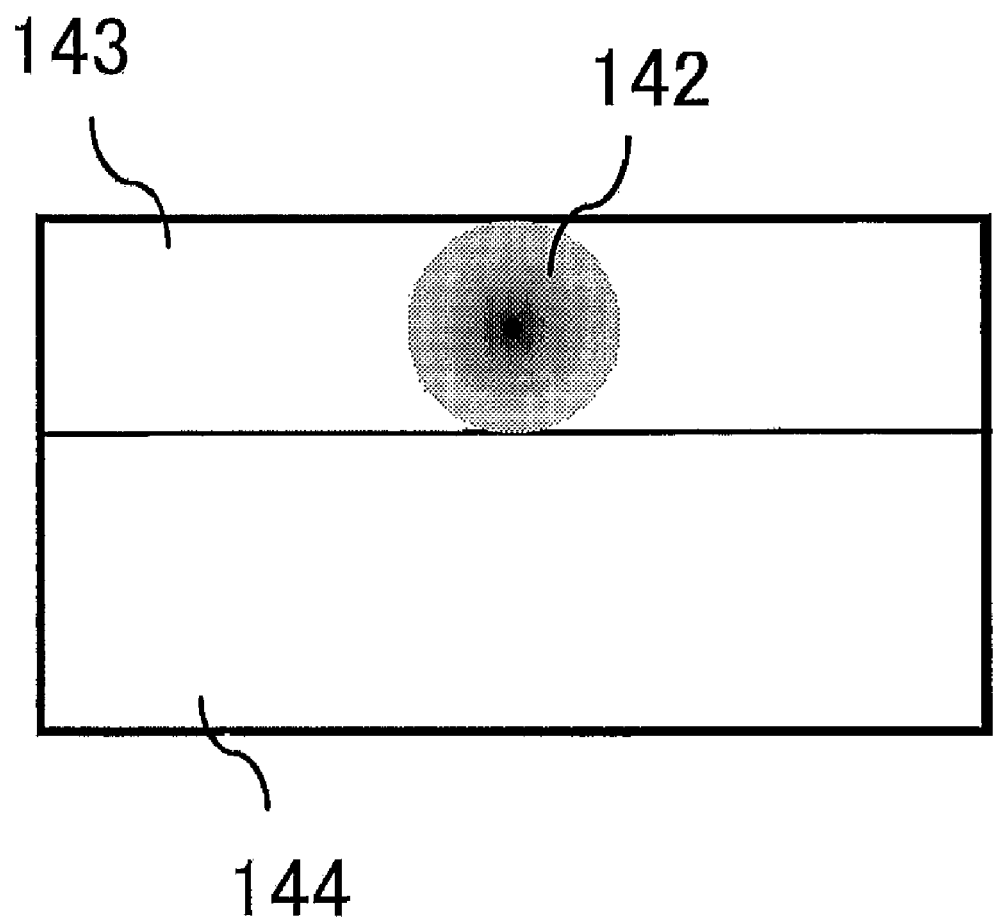
FIG. 7(d) is an E-E sectional view of the GI type grating filter of the second embodiment of the present invention.

FIG. 7(a) shows a schematic diagram of the upper and lower masks used when producing a G1 type waveguide grating where an absolute value of a refractive index distribution changes in periodically, FIG. 7(b) shows a schematic diagram of the GI type waveguide grating produced, FIG. 7(c) shows a D-D' sectional view, and FIG. 7(d) shows an E-E' sectional view, respectively.

In the process of using the same sheet-like polysilane as that of the first embodiment in FIG. 3, UV irradiation is performed using an upper mask 140 as the graded UV transmittance upper mask 112, and using a lower mask 141 as the graded UV transmittance lower mask 113. The upper mask 140 and the lower mask 141 have the same graded ultraviolet ray transmittance, as shown in FIG. 7(a)

Thus, when using the upper mask 140 and the lower mask 141 where absolute values of the graded ultraviolet ray transmittances are changed periodically along the propagating direction, it is possible to produce the GI type waveguide grating having a GI type refractive index portion 145 where the absolute value of the refractive index distribution changes periodically as shown in FIG. 7(b). Since the refractive index distribution changes periodically along the propagating direction, as shown in FIGS. 7(c) and 7(d), the refractive index distribution in a cross-section differs according to its position.

Since an oxygen concentration distribution of a GI type core 142 and a concentration distribution of siloxane structure are distributions contradictory to the refractive index distribution, these distributions become distributions also changing periodically along the propagating direction of light.

Embodiment 3

A GI type MMI coupler of the third embodiment of the present invention is a GI type MMI coupler with I/O waveguides which can be produced by using masks, where a GI type slab portion and GI type I/O waveguide portions are compounded, by the process of using the sheet-like polysilane of the first embodiment.

FIG. 8(b) shows a schematic diagram of the GI type MMI coupler where the I/O GI type waveguides, which have two-dimensional graded indices, and the GI type slab which exposes side walls and has a one-dimensional refractive index distribution in a film thickness direction are compounded, and FIG. 8(a) shows a schematic diagram of its mask. FIG. 8(c) shows an F-F' sectional view of the GI type MMI coupler shown in FIG. 8(b).

In addition, the GI type MMI coupler shown in FIG. 8(b) is an example of the graded-index optical member of the present invention.

The GI type MMI coupler of this third embodiment is a GI type multi-mode interference (MMI) coupler which is constituted of a GI type input waveguide 150 which has an oxygen concentration distribution which has a minimum portion of oxygen concentration on a center line of a cross-section of a core along a propagation direction of light, and increases according to distance from the minimum portion of oxygen concentration mostly along with a parabola centrosymmetrically as shown in FIG. 8(b) (a refraction index is a refractive index distribution which has a maximum portion on the center line of the cross-section of the core, and decreases according to distance from the maximum portion mostly along with a parabola centrosymmetrically), two GI type output waveguides 151 which each have the same refractive index distribution as that of the GI type input waveguide 150, a GI type slab 155 which has an oxygen concentration distribution which has a minimum portion of oxygen concentration at a center, and increases according to distance from the minimum portion of oxygen concentration mostly along with a parabola centrosymmetrically (a refraction index is a refractive index distribution which has a maximum portion on the center, and decreases according to distance from the maximum portion mostly along with a parabola centrosymmetrically) in a film thickness direction where the GI type input waveguide 150 and GI type output waveguides 151 are provided in an input terminal and an output terminal, respectively. In addition, the term "oxygen concentration" here means the concentration of oxygen which constitutes the siloxane structure 107 similarly to the description in the first embodiment.

However, as for the GI type slab 155, exposed edge faces 156 in a width direction are exposed to air, and width and length are optimized so that intensity of light may become maximum in a connecting position with the two GI type output waveguides 151 on the output terminal by interference in the propagating direction of a multi-mode excited in the width direction by incident light from the GI type input waveguide 150.

Such a GI type MMI coupler is combination of the GI type optical waveguide and GI type slab which are shown in the first embodiment. Hence, when using a compound mask 160 which is made by combining the same mask (FIGS. 4(a) and 4(b)) portions 157 and 158 for the GI type straight (curved) line I/O waveguides as those of the first embodiment and a GI type slab mask portion 159 (masks with fixed transmittances equal to minimum transmittances of the GI type input waveguide mask portion 157 and GI type output waveguide mask portion 158) and is shown in FIG. 8(a), it is possible to produce a compound GI type waveguide device by one-time UV irradiation from the upper and lower sides to the sheeting-like polysilane coated on a transparent substrate 154.

Since a concentration distribution of the siloxane structure of the GI type MMI coupler of this third embodiment which is produced using polysilane is a distribution contrary to the refractive index distribution, it becomes a distribution, which changes in the film thickness direction and width direction, in the GI type input waveguide 150 portion and GI type output waveguide 151 portion, and it becomes a distribution which changes only in the film thickness direction in the GI type slab 155 portion.

FIG. 9(b) shows a schematic diagram of another GI type MMI coupler of the third embodiment which is constituted of I/O GI type waveguides, which have two-dimensional graded indices, and a GI type slab which does not expose side walls and has a one-dimensional refractive index distribution in a film thickness direction, and FIG. 9(a) shows a schematic diagram of its mask. FIG. 9(c) shows a G-GI sectional view of the GI type MMI coupler shown in FIG. 9(b). In addition, the same reference numerals are used for the same components as those in FIG. 8.

In addition, the GI type MMI coupler shown in FIG. 9(b) is an example of the graded-index optical member of the present invention.

A GI type slab mask portion 162 of a compound mask 165 in the case of structure that a boundary in a width direction of a GI type slab 161 contacts to a clad 153 of polysilane as shown in FIG. 9 is constituted of a portion 163 for a core which has a fixed transmittance equal to a minimum transmittance of the GI type input waveguide mask portion 157 and GI type output waveguide mask portion 158 for the slab core, a portion 164 for a clad which has a fixed transmittance equal to a minimum transmittance of the GI type input waveguide mask portion 157 and GI type output waveguide mask portion 158 for the clad of the slab.

Embodiment 4

A GI type array waveguide grating (AWG) of a fourth embodiment of the present invention is produced in the process of using the sheet-like polysilane of the first embodiment, wherein I/O GI type waveguide, array waveguide, and GI type slab are compound. The I/O GI type waveguide and the array waveguide have two-dimensional graded indices while the GI type slab has a one-dimensional refractive index distribution in a film thickness direction.

FIG. 10(b) shows a schematic diagram of the GI type AWG of this fourth embodiment, and FIG. 10(a) shows a schematic diagram of a mask used for producing this GI type AWG. In addition, the GI type AWG of the fourth embodiment corresponds to an example of the graded-index optical member of the present invention.

The GI type AWG of the fourth embodiment is a GI type array waveguide grating (AWG) which is constituted of a GI type input waveguide group 170 which is constituted of at least one GI type input waveguide which has an oxygen concentration distribution which has a minimum portion of oxygen concentration on a center line of across-section of a core along a propagation direction of light, and increases according to distance from the minimum portion of oxygen concentration mostly along with a parabola centrosymmetrically as shown in FIG. 10(b) (a refraction index is a refractive index distribution which has a maximum portion on the center line of the cross-section of the core, and decreases according to distance from the maximum portion mostly along with a parabola centrosymmetrically), a GI type output waveguide group 171 which is constituted of at least one GI type output waveguide which has the same refractive index distribution as those GI type input waveguides, a GI type array waveguide 172 which has the same refractive index distribution as that of those GI type input waveguides, a GI type input slab 173 which has oxygen concentration distribution which has a minimum portion of oxygen concentration at a center, and increases according to distance from the minimum portion of oxygen concentration mostly along with a parabola centrosymmetrically (a refraction index is a refractive index distribution which has a maximum portion on the center, and decreases according to distance from the maximum portion mostly along with a parabola centrosymmetrically) in a film thickness direction where the GI type input waveguide group 170 and GI type array waveguides 172 are provided in an input terminal and an output terminal, respectively, and a GI type output slab 174 which has an oxygen concentration distribution which has a minimum portion of oxygen concentration at the center, and increases according to distance from the minimum portion mostly along with a parabola centrosymmetrically (a refraction index is a refractive index distribution which has a maximum portion on the center, and decreases according to distance from the maximum portion mostly along with a parabola centrosymmetrically) in a film thickness direction where the GI type array waveguide 172 and GI type output waveguides 171 are provided in an input terminal and an output terminal, respectively. In addition, the term "oxygen concentration" here means the concentration of oxygen which constitutes the siloxane structure 107 similarly to the description in the first embodiment.

However, the GI type input slab 173 and GI type output slab 174 have the structure of spreading in a width direction toward the GI type array waveguide 172 from the GI type input waveguide group 170 or GI type output waveguide group 171 so that light can diffuse uniformly, as to multiple-wavelength incident light ($\lambda 1, \ldots, \lambda n$) 175 from the GI type input waveguide group 170, optical path difference arises between a GI type waveguide inside the GI type array waveguide 172, and a GI type waveguide outside it while multiple-wavelength light which spreads in the width direction in the GI type input slab 173 passes the GI type array waveguide 172, each wavelength is separately condensed into each GI type output waveguide position of the GI type output waveguide group 171 connected to the output terminal of the GI type output slab 174 when being condensed in the GI type output slab 174, and each of the separate wavelengths is outputted individually by each GI type output waveguide as an outgoing light 176.

Such a GI type AWG is the combination of the GI type optical waveguide shown in the first embodiment and GI type slab, similarly to the GI type MMI coupler of the third embodiment. Hence, when using a compound mask for a GI type AWG which is made by combining the same mask portions 177, 178, and 179 for the GI type straight (curved) line waveguides (FIGS. 4(a) and 4(b)) as those of the first embodiment and a GI type I/O slab portion masks 180 and 181 (masks with fixed transmittances equal to minimum transmittances of the GI type input waveguide group mask portion 177 and GI type output waveguide group mask portion 178) and is shown in FIG. 10(a), it is possible to produce a compound GI type waveguide device by one-time UV irradiation from the upper and lower sides to the sheet-like polysilane.

Thus, it is also possible to produce complicated device structure by an oxidation reaction of polysilane by the one-time UV irradiation by combining various masks for optical waveguides.

Embodiment 5

Figure 11:
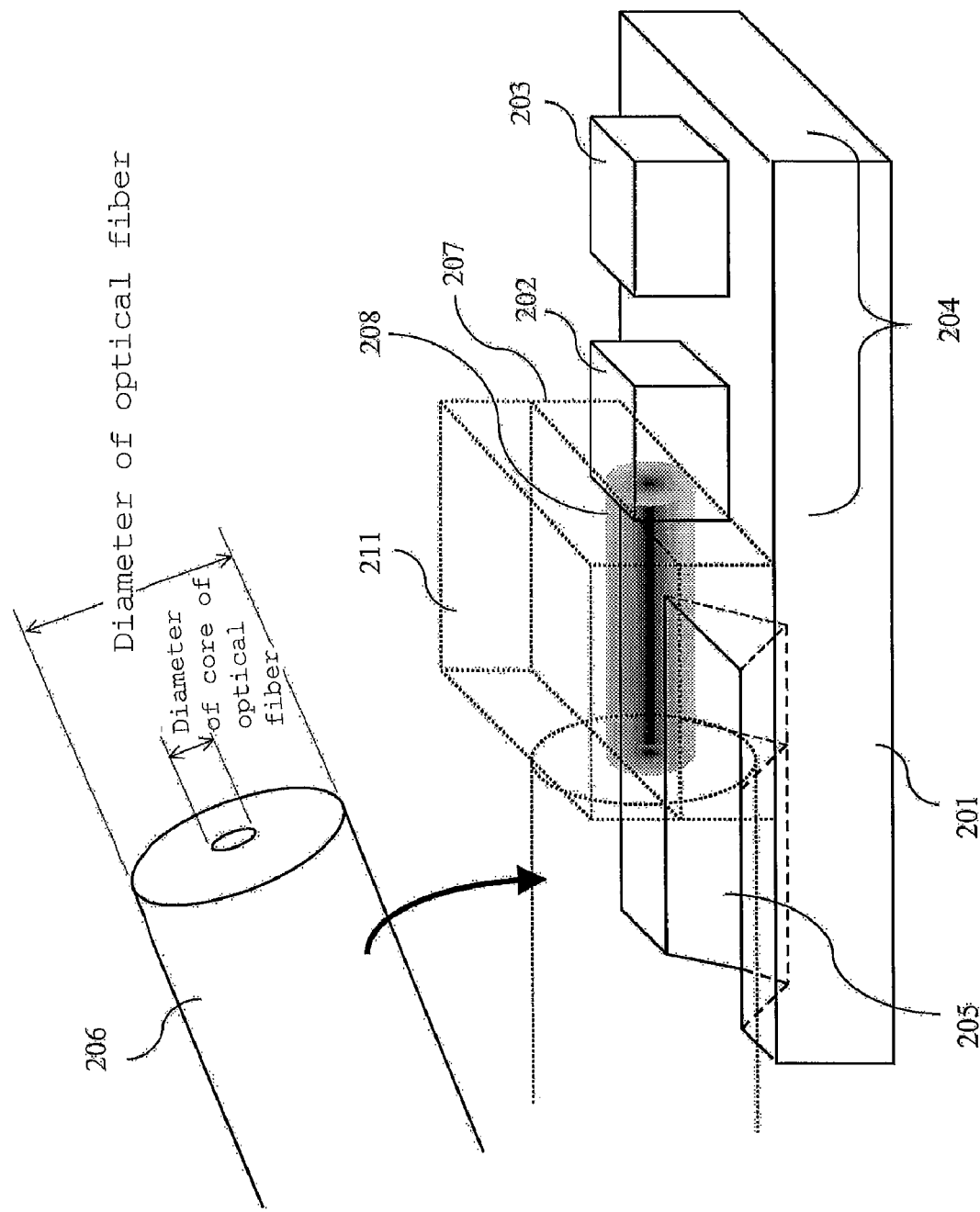
FIG. 11 is a structural schematic diagram of an optical module of a fifth embodiment of the present invention, which couples the light source and optical fiber.

FIG. 11 is a structural schematic diagram of an optical module of a fifth embodiment of the present invention, which couples a light source and an optical fiber.

As shown in FIG. 11, an optical module of this fifth embodiment is constituted of a silicon substrate 201 of surface mounting, an electric circuit section 204 which is constituted of a light source 202 and a signal processing section 203, and is arranged on the silicon substrate 201, an optical fiber 206 positioned by a V-groove 205 provided beforehand in the silicon substrate 201, a waveguide type graded index lens 207 which is provided on an optical path of the light source 202 and optical fiber 206, and couples the light source 202 and optical fiber 206 in desired optical characteristics (loss, a beam shape, etc.) (hereafter, abbreviated as a WG-GRIN lens).

The WG-GRIN lens 207 is the same structure as the GI type optical waveguide 105 in FIG. 1(a) which is explained in the first embodiment. Thus, the WG-GRIN lens 207 is an example of the graded-index optical member of the present invention.

In addition, the light source 202 corresponds to an example of the light emitting section of the present invention, and the optical fiber 206 coupled with the WG-GRIN lens 207 corresponds to an example of the light receiving section of the present invention. Furthermore, the V-groove 205 corresponds to an example of the groove of the present invention, which is formed for the positioning of surface mounting.

In FIG. 11, the WG-GRIN lens 207 provided on an optical path between the optical fiber 206 and light source 202 has a sheet-like shape as shown by the GI type optical waveguide 105 in FIG. 1(a), and is formed on a transparent substrate 211 transparent to ultraviolet rays. In the structural diagram of FIG. 11, the WG-GRIN lens 207 is arranged in an orientation where the GI type optical waveguide 105 with structure shown in FIG. 1(a) is reversed.

Moreover, since a refractive index distribution of a GI type core 208 of the WG-GRIN lens 207 used here is designed from relation between an emitting beam status of the light source 202, and a desired status of a beam entered into the optical fiber 206, it may not be necessarily centrosymmetric to an optical axis. For example, when a shape of a beam from a light source is concentric circular to an optical axis in the case of a common optical fiber which has a core isotropic to the optical axis, optimum coupling can be performed in the case that the refractive index distribution of the GI type core 208 of the WG-GRIN lens 207 is also concentric circular.

In addition, since input-output behavioral characteristics of a GRIN lens is determined by formula 1, when an incident beam status $(r_1, \theta_1)$ and an emitting beam status $(r_2, \theta_2)$ are determined, a shape (a, L) and a refractive index distribution $(n_0, g)$ of a WG-GRIN lens can be designed.

$$\begin{bmatrix} r_2 \\ \theta_2 \end{bmatrix} = \begin{bmatrix} \cos gL & \frac{1}{n_0 g} \sin gL \\ -n_0 g \sin gL & \cos gL \end{bmatrix} \begin{bmatrix} r_1 \\ \theta_1 \end{bmatrix} \quad \text{[Formula 1]}$$

$r_1$, $r_2$: Displacements of incident light and outgoing light from lens center (optical axis)

$\theta_1$, $\theta_2$: Incident and outgoing angles of incident light and outgoing light a: Diameter of lens (core diameter=film thickness of sheet-like WG-GRIN lens in effect)

L: Length of lens $N_0$: Refractive index of core on optical axis g: Graded index constant In addition, when the optical fiber 206 is an SMF with 10 μm or less of core diameter shown in FIG. 11, the lens length L shown in FIG. 1(a) is designed in an about 0.5n (n: integer) pitch since a condensing optical system is optimum for coupling for both of the input and output of the WG-GRIN lens 207. Since a condensing system is optimum for an input side and a condensing system or a collimating system is optimum for an output side for coupling in the case of an MMF with 50 μm or more of core diameter of the optical fiber 206, the lens length L is designed in a 0.25n to 0.5n (n: integer) pitch.

Hence, the optical axis in the GI type core 208 of the WG-GRIN lens 207 is linear, and when both end faces of the GI type core 208 adhere to optical components to be coupled, length of the GI type core 208 is adjusted so that imaging may be performed on both the ends according to optical characteristics determined by formula 1.

In addition, since it is necessary to perform optimum coupling including an air portion in a gap when a gap such as air exists between the WG-GRIN lens 207 and optical component to be coupled, it is necessary to design the WG-GRIN lens in consideration of diffraction in the air portion. Thus, it is designed so as to become such a refractive index distribution and length that imaging is performed in a desired position on an optical axis including the air portion of the gap.

Figure 12:
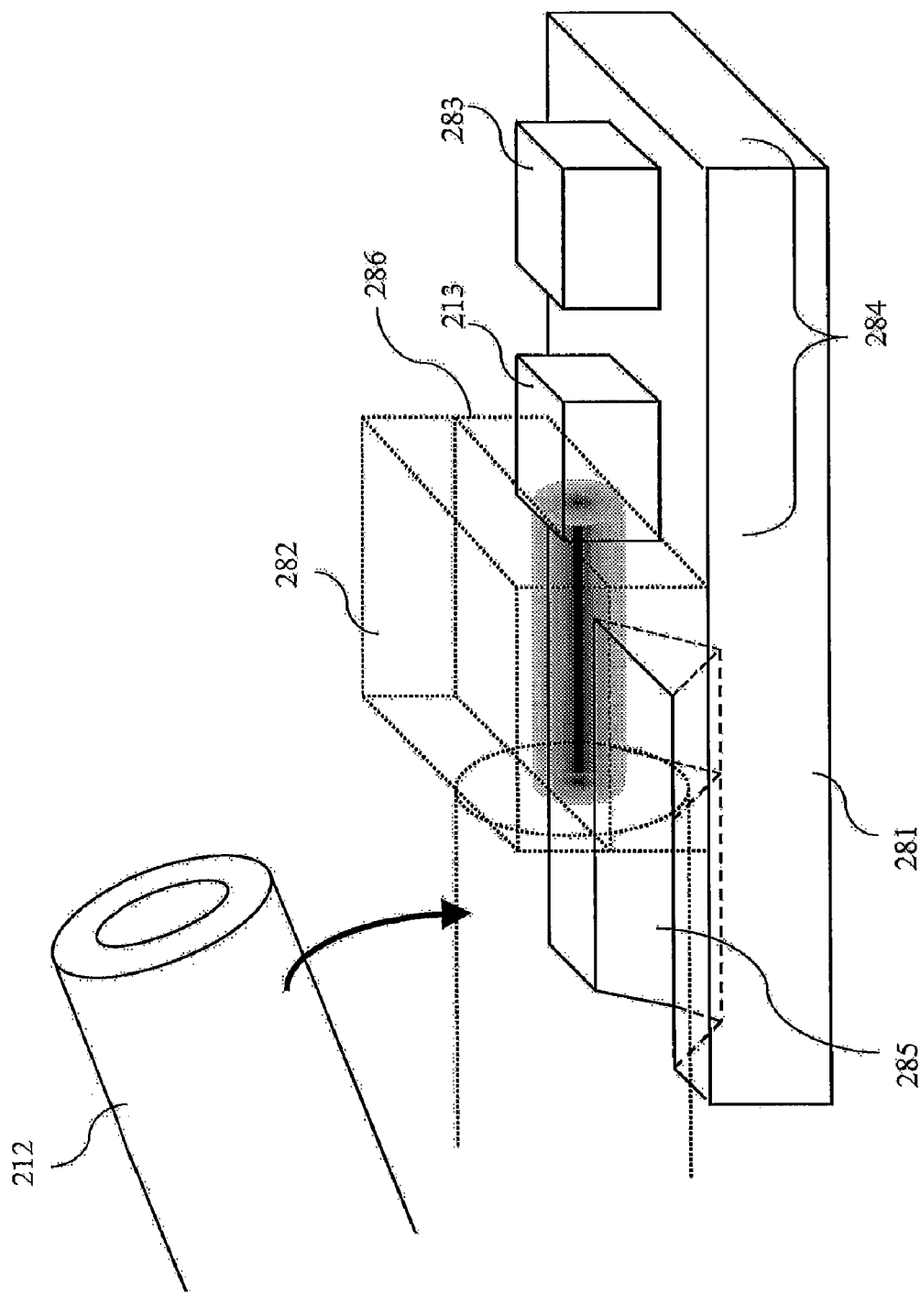
FIG. 12 is a structural schematic diagram of an optical module of the fifth embodiment of the present invention, which couples a light receiving section and the optical fiber.

FIG. 12 shows a structural schematic diagram of an optical module of the fifth embodiment of the present invention, which has structure of coupling a light receiving section and an optical fiber.

The optical module with this structure is constituted of a silicon substrate 281 for surface mounting, an electric circuit section 284 which is constituted of a light receiving section 213 and a signal processing section 283, and is arranged on the silicon substrate 281, a large-core diameter optical fiber 212 positioned by a V-groove 285 provided beforehand in the silicon substrate 281, and a WG-GRIN lens 286 which is provided on an optical path of the light receiving section 213 and large-core diameter optical fiber 212, and couples the light receiving section 213 and large-core diameter optical fiber 212 in desired optical characteristics (loss, a beam shape, etc.). The WG-GRIN lens 286 has the same structure as the GI type optical waveguide 105 in FIG. 1(a) which is explained in the first embodiment. Thus, the WG-GRIN lens 286 is an example of the graded-index optical member of the present invention.

In addition, in the structure of FIG. 12, the large-core diameter optical fiber 212 coupled with the WG-GRIN lens 286 corresponds to an example of the light emitting section of the present invention.

In FIG. 12, the WG-GRIN lens 286 provided on an optical path between the large-core diameter optical fiber 212 and light receiving section 213 has a sheet-like shape as shown by the GI type optical waveguide 105 in FIG. 1(a), and is formed on the transparent substrate 282 transparent to ultraviolet rays. In the structural diagram of FIG. 12, the WG-GRIN lens 286 is arranged in an orientation where the GI type optical waveguide 105 with structure shown in FIG. 1(a) is reversed.

The large-core diameter optical fiber 212 is, for example, a plastic fiber with 100 μm or more of core diameter. As shown in FIG. 12, when the electric circuit section 284 is a receiver circuit, since a light-receiving area of a photodetector is small against a core diameter of the large-core diameter optical fiber 212, the WG-GRIN lens 286 is designed so that an incident beam from the large-core diameter optical fiber 212 may be condensed to the photodetector.

It is possible to produce the WG-GRIN lens 207 and WG-GRIN lens 286 of this fifth embodiment in the process of using the same sheet-like polysilane as that in the first embodiment of FIG. 3.

In the case of assembling an optical module using a WG-GRIN lens with the transparent substrate 114 produced in the process of FIG. 3, as shown in FIG. 11, when making a sheet-like polysilane side of the WG-GRIN lens 207 a side of the silicon substrate 201 and arranging them on the optical axis between the optical fiber 206 and light source 202, it is possible to optically couple the optical fiber 206 and light source 202. Similarly, as shown in FIG. 12, when making a sheet-like polysilane side of the WG-GRIN lens 286 a side of the silicon substrate 281 and arranging them on the optical axis between the large-core diameter optical fiber 212 and a photodetector of the light receiving section 213, it is possible to optically couple the large-core diameter optical fiber 212 and the photodetector.

Since film thickness (core diameter) of the WG-GRIN lens of this fifth embodiment produced at the process shown in FIG. 3 is only the size of a diameter of an optical fiber, it is possible to perform further miniaturization rather than using a conventional GRIN lens with an aperture of 1 mm or more and length of several millimeters.

In addition, in the structure of the optical modules in FIGS. 11 and 12, when optical coupling is possible, even if a transparent substrate is arranged in a silicon substrate side, it is satisfactory in any way. In addition, optical axis alignment of the WG-GRIN lens of this fifth embodiment is performed by marking alignment or passive alignment, arranging it into a groove on the silicon substrate (not shown), like the conventional.

Furthermore, when arranging a WG-GRIN lens and an optical fiber with making their optical axes coincide, return light may cause characteristic degradation of a light source.

This return light is generated in all the interfaces. For example, in the case of the optical module shown in FIG. 11, it is generated in turns from the light source 202 in the order of: (1) an interface between air and the WG-GRIN lens 207; (2) an interface between the WG-GRIN lens 207 and air; (3) an interface between air and the optical fiber 206; (4) an interface between the optical fiber 206, which is not shown, and a portion connected to it; and the like.

The return light of the above-mentioned items (3) and (4) which passes through the edge faces of the WG-GRIN lens 207 will be explained using FIG. 13.

FIG. 13 shows a structural diagram of a coupling portion of the optical fiber 206 and WG-GRIN lens 207 which are shown in FIG. 11. FIG. 13(a) shows a structural diagram at the time of arranging the optical fiber 206 and WG-GRIN lens 207 so as to make their optical axes coincide, and FIG. 13(b) shows a structural diagram at the time of arranging the optical fiber 206 and WG-GRIN lens 207 with making their optical axes displaced, respectively.

When arranging them so as to make their optical axes coincide as shown in FIG. 13(a), return light from the optical fiber 206 penetrates edge faces of the optical fiber 206 and WG-GRIN lens 207 without being reflected, the penetrated return light enters into the light source 202, and an output of the light source 202 drops.

In FIG. 13(b), the optical fiber 206 and WG-GRIN lens 207 are arranged so that an angle between these optical axes may be displaced by α. By arranging them in this way, the light from the optical fiber 206 is totally reflected on the edge face of the WG-GRIN lens 207. Hence, it is possible to suppress the loss of power of the light source 202 since it is possible to prevent the return light from the optical fiber 206 from entering into the light source 202 after being reflected on the edge face of the WG-GRIN lens 207.

Generally, when return light causes the characteristic degradation of a light source, an isolator is used to prevent the return light from penetrating and entering into the light source, but cost increases because of using the isolator in this case.

As shown in FIG. 13(b), by arranging the WG-GRIN lens 207 of this fifth embodiment in the state of axial displacement, it is possible to prevent an injection of the return light to a light source without using an isolator or the like, and hence, the characteristic degradation of the light source is not caused.

In addition, by inclining an edge face of the WG-GRIN lens 207 of this fifth embodiment to incline I/O directions to I/O edge faces of the light source 202 and optical fiber 206 to an optical axis, it is possible to prevent the return light in the above-mentioned items (1) and (2) which are reflected light from the edge face of the WG-GRIN lens 207 to the light source 202.

Thus, by using the WG-GRIN lens (waveguide type graded index lens) of this fifth embodiment which can be produced in low cost using the oxidation reaction which occurs at the time of the ultraviolet curing of sheet-like polysilane, and whose aperture is the size nearly equal to a diameter level of an optical fiber, it is possible to achieve the miniaturization of an optical module in low cost.

In addition, although a GI type core of the WG-GRIN lens of this fifth embodiment has a refractive index distribution which becomes maximum on an optical axis of an optical path of the light source 202 and optical fiber 206, and decreases according to the distance from the maximum point on the optical axis mostly parabolically, as shown in FIG. 1(c) the refractive index distribution may not necessarily be the distribution of decreasing as being separated from a maximum point on an optical axis, but should just be a distribution which does not increase as being separated from a maximum point on an optical axis. For example, it is also sufficient to be such a refractive index distribution that has the same refractive index in a cylindrical range including an optical axis, and has a refractive index which decreases as being separated from the cylindrical portion.

Embodiment 6

Figure 14:
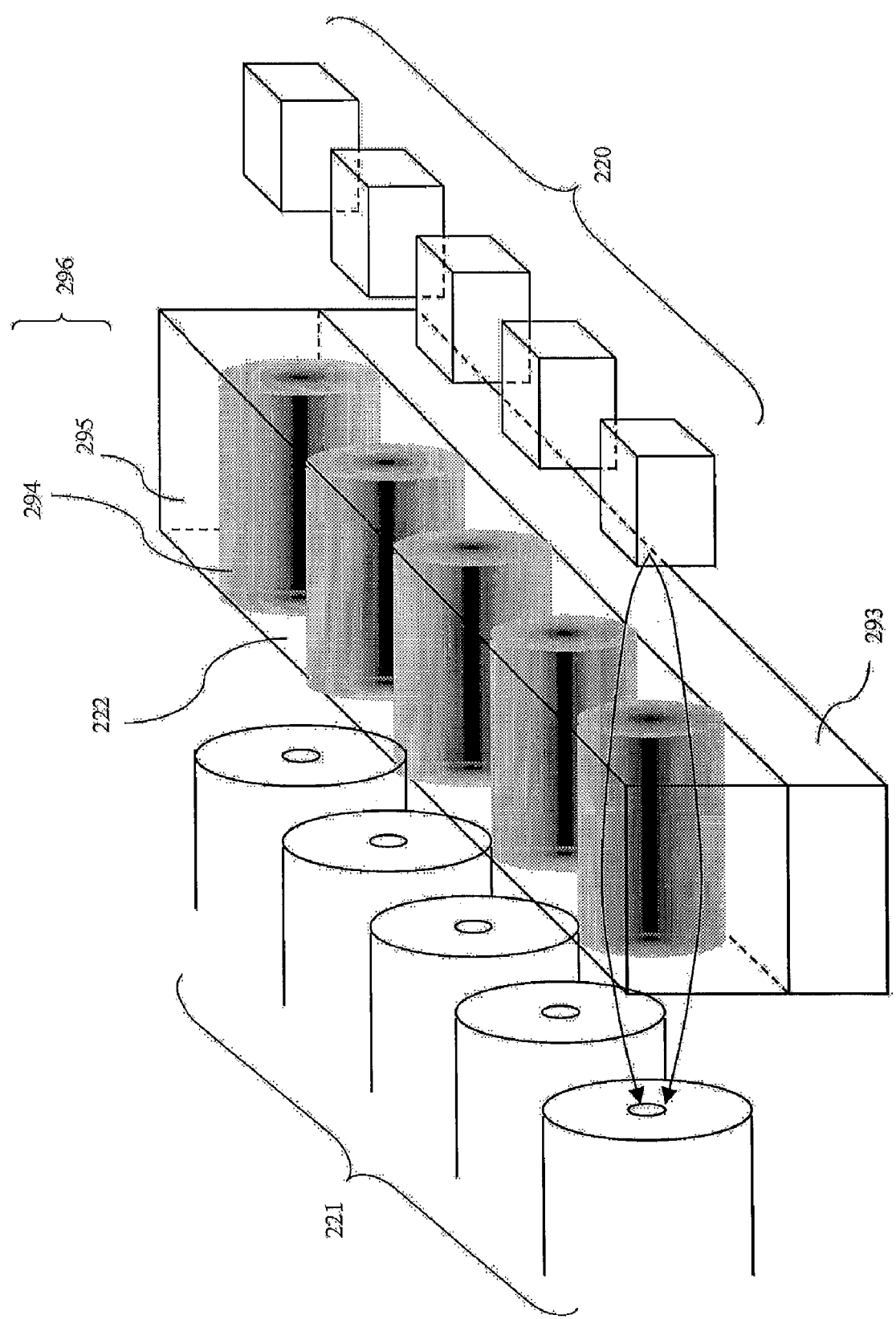
FIG. 14 is a structural schematic diagram of an array type optical module of a sixth embodiment of the present invention.

FIG. 14 shows a structural schematic diagram of an optical module of a sixth embodiment of the present invention.

The optical module of the sixth embodiment is equipped with a light source array 220 (a signal processing section is not shown) arranged in parallel, and an optical fiber array 221 which faces the light source array 220, and in which each optical fiber which is coupled with each light source of the light source array 220 is arranged in parallel. Then, it is equipped with a waveguide type graded index lens array 222 (hereafter, this is abbreviated as a WG-GRIN lens array) which is provided on each optical path of each light source of the light source array 220, and each optical fiber of the optical fiber array 221 corresponding to them, which couples each light source and each optical fiber in desired optical characteristics (loss, a beam shape, and the like), and which is provided on a transparent substrate 293.

The WG-GRIN lens array 222 is equipped with a clad 295 made of a sheet-shaped polysilane based resin, and a graded index type core 294 made of a polysilane based resin every optical path which has a refractive index distribution which becomes maximum on each optical axis of each optical path and decreases mostly parabolically according to distance from the maximum point on the each optical axis. Then, one graded index type core 294 and a clad 295 of a portion which contacts the graded index type core 294 constitute one waveguide type graded index lens (WG-GRIN lens) 296.

In addition, the WG-GRIN lens array 222 corresponds to an example of the graded-index optical member of the present invention which is equipped with a plurality of core sections which are arranged in parallel without intersecting mutually.

Furthermore, since the refractive index distribution of each graded index type core 294 may not necessarily be centrosymmetry to each optical axis corresponding to it, it is designed from the relation between an emitting beam state of a light source, and a desired state of a beam which corresponds to it and is entered into an optical fiber.

As to a manufacturing method of the WG-GRIN lens array 222 of this sixth embodiment, it is possible to produce the array-like WG-GRIN lens array 222 at onetime by using a mask (equivalent to the graded UV transmittance upper mask 112 and the graded UV transmittance lower mask 113 in FIG. 3) which makes UV graded transmittances for the production of the graded index type core 294 arranged in parallel on a mask to perform UV irradiation through the mask from the upper and lower sides of sheet-like polysilane (before curing), by using the process of using the sheet-like polysilane explained in FIG. 3 of the first embodiment.

Moreover, the length of a half of the interval between the adjacent graded index type cores 294 in this case corresponds to an example of the predetermined distance of the present invention which is a portion in which the ultraviolet ray transmittance increases as being apart.

Thus, since it is possible to form the WG-GRIN lens with an aperture of about a diameter of an optical fiber simply in an array also for an array-like optical module, it is possible to miniaturize an optical module array.

In addition, although it is described that the WG-GRIN lens 296 is separately arranged from the light source array 220 and the optical fiber array 221 respectively in FIG. 14, it is also sufficient to arrange the light source array 220 and/or the optical fiber array 221 with closely contacting the WG-GRIN lens 296. It is possible to arrange the light source array 220 and the optical fiber array 221 with contacting an edge face of the WG-GRIN lens 296 by making the WG-GRIN lens 296 such length that a focal position is on an edge face. When arranging these so as to contact these closely, it becomes possible to obtain a large merit that an optical axis can be adjusted in machine accuracy.

Embodiment 7

Figure 15:
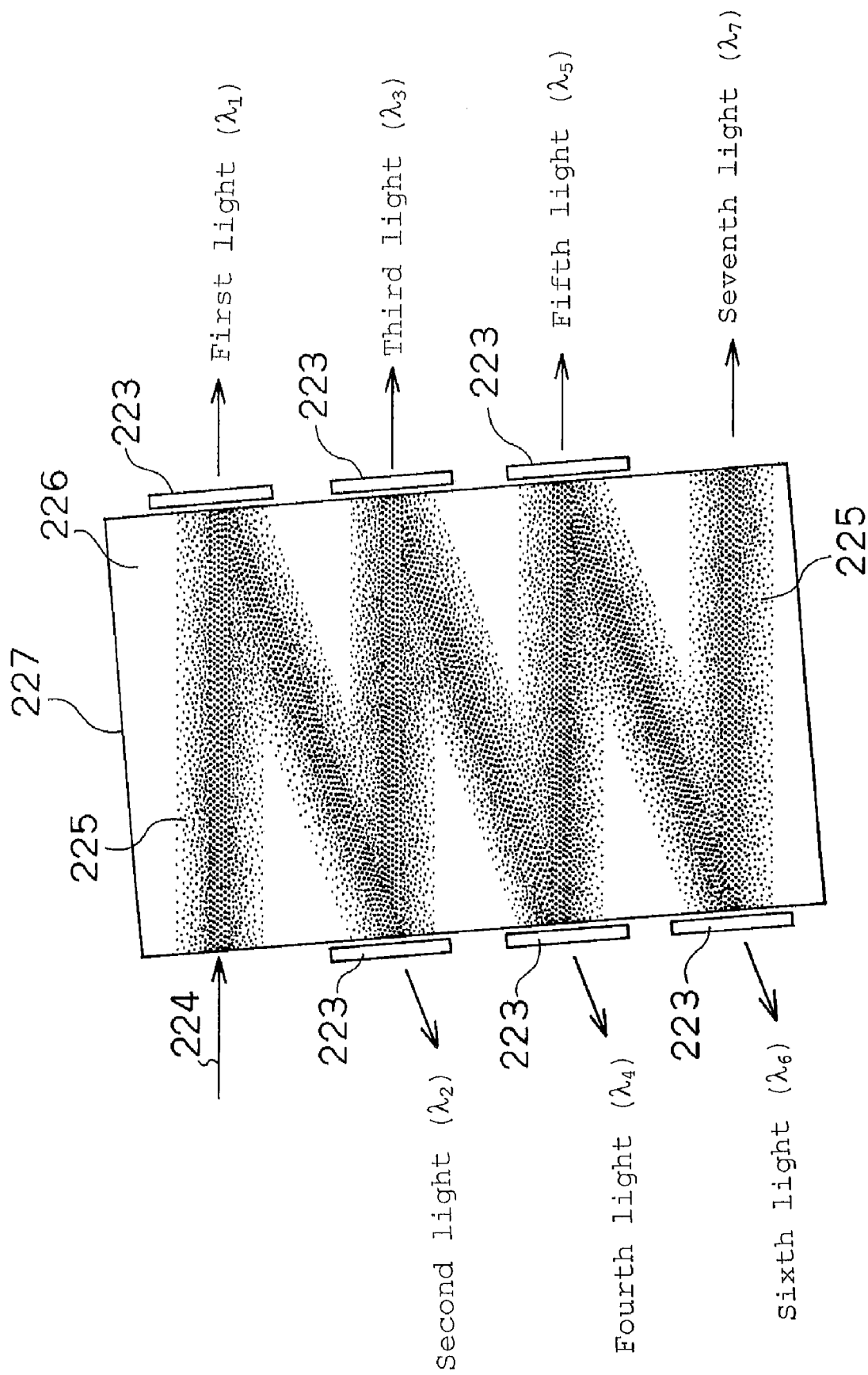
FIG. 15 is a structural schematic diagram of an optical module of a seventh embodiment of the present invention, which has a zigzag core.

FIG. 15 shows a structural schematic diagram of an optical module of a seventh embodiment of the present invention.

The optical module of this seventh embodiment is equipped with a k-th filter (k=1, . . . , 6) 223 which passes a specific wavelength (σk) and makes other wavelengths ($\lambda_1, \ldots, \lambda_{k-1}, \lambda_{k+1}, \ldots, \lambda_7$) reflected, and a zigzag waveguide type graded index lens 227. In addition, the zigzag waveguide type graded index lens 227 is an example of the graded-index optical member of the present invention.

The zigzag waveguide type graded index lens 227 has a k-th graded index core 225 arranged between a k-th filter and a (k+1)-th filter in the same sheet-like clad 226, so as to best-couple multiple-wavelength light ($\lambda_1, \ldots, \lambda_7$) 224 from an optical fiber (not shown) to the first filter 223, the reflected light ($\lambda_{k+1}, \ldots, \lambda_7$) by the k-th filter to the (k+1)-th filter, and the reflected light (seventh light: $\lambda_7$) by the sixth filter 223 to an optical fiber (not shown).

As shown in FIG. 15, the k-th graded index core 225 has a zigzag shape, respective k-th filters 223 face each other so that perpendiculars of respective reflecting surfaces may not intersect mutually, the multiple-wavelength light 224 entering into the first filter 223 from the optical fiber (not shown) is reflected on the second to sixth filters 223 in order in the zigzag shape, and the reflected light (seventh light: $\lambda_7$) of the last sixth filter 223 is received by an optical fiber (not shown). In addition, the transmitted light (k-th light: $\lambda_{k+1}$) separated from the reflected light ($\lambda_{k+2}, \ldots, \lambda_7$) by the (k+1)-th filter can be coupled optimally with an optical fiber (not shown) respectively.

Furthermore, the k-th graded index core (k=1, . . . , 7) 225 corresponds to an example of a plurality of core sections of the present invention which are arranged in the zigzag shape with adjacent sections intersecting mutually in their end sections in part.

As to a manufacturing method of the zigzag waveguide type graded index lens 227 of this seventh embodiment, it is possible to produce the array-like zigzag waveguide type graded index lens 227 at one time by using a mask (equivalent to the graded UV transmittance upper mask 112 and the graded UV transmittance lower mask 113 in FIG. 3) which makes UV graded transmittances for the production of the k-th graded index type core 225 arranged in a zigzag shape on a mask to perform UV irradiation through the mask from the upper and lower sides of sheet-like polysilane (before curing), by using the process of using the sheet-like polysilane explained in FIG. 3 of the first embodiment.

In addition, the distance to a center portion of the adjacent k-th graded index type core 225 in this case corresponds to an example of the predetermined distance of the present invention which is a portion in which the ultraviolet ray transmittance increases as being apart.

Thus, also in the case of a WDM filter using a conventional bulk type GRIN lens with the size of several millimeters or more, since a plurality of lenses can be formed easily in the desired arrangement when using the WG-GRIN lens made of polysilane which has an aperture of about the diameter of an optical fiber, it is possible to miniaturize the WDM filter.

In addition, in this seventh embodiment, although the value of k is set at 1 to 7, it is not limited to this value range, but, so long as it is two or more, it is good without limit.

Embodiment 8

Figure 16:
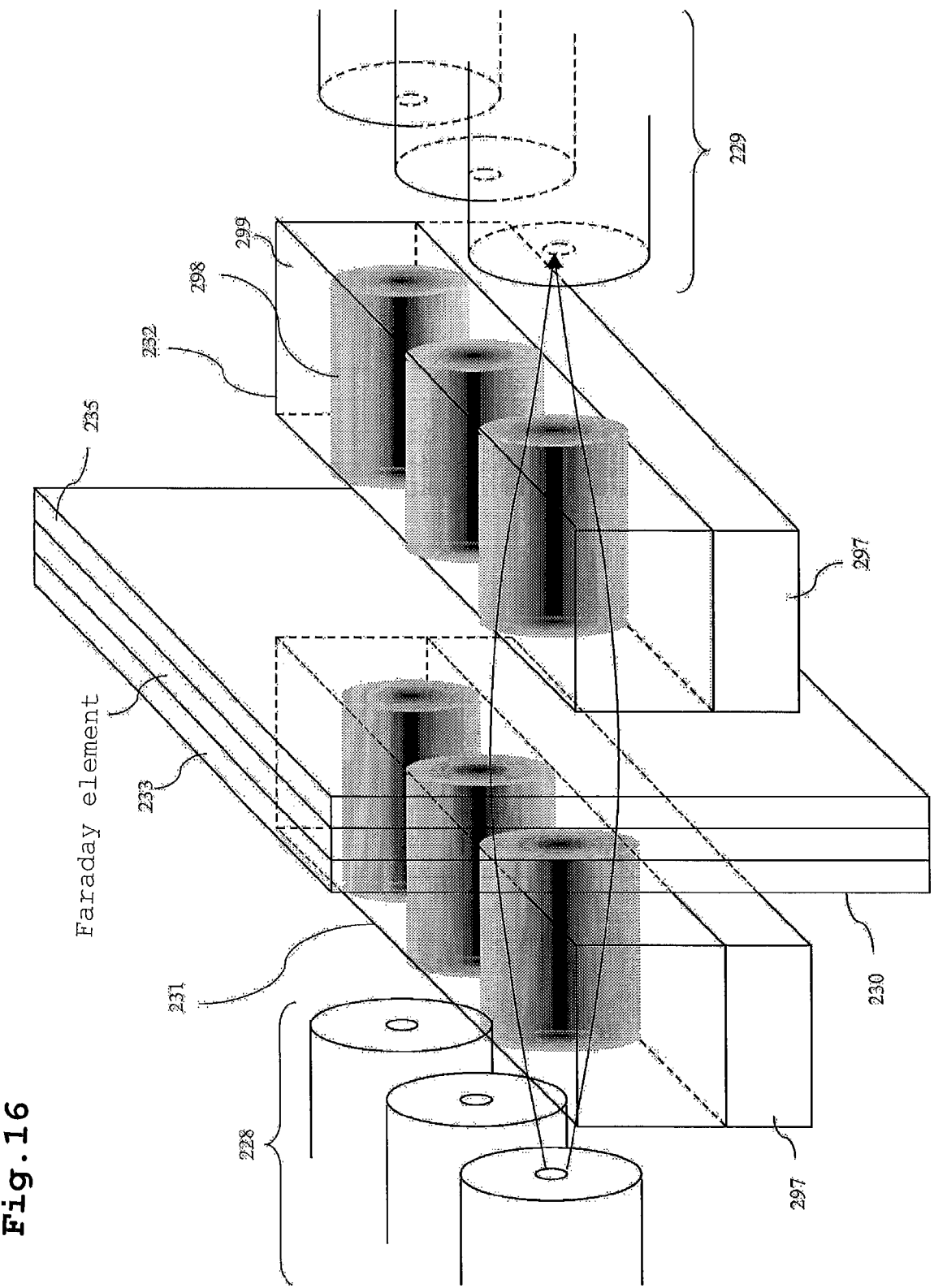
FIG. 16 is a structural schematic diagram of an array type optical module of an eighth embodiment of the present invention.

FIG. 16 shows a structural schematic diagram of an optical module of an eighth embodiment of the present invention.

The optical module of this eighth embodiment is equipped of an input side optical fiber array 228 arranged in parallel, and an output side optical fiber array 229 in which a plurality of optical fibers which face respective optical fibers of the input side optical fiber array 228 to be made to be coupled, are arranged in parallel. And, it is equipped with an optical isolator 230 arranged so as to cross all the optical paths between each optical fiber of the input side optical fiber array 228 and each optical fiber of the output side optical fiber array 229.

In addition, in order that each optical fiber with which the input side optical fiber array 228 and the output side optical fiber array 229 couple can be coupled optimally, it is equipped with an input side waveguide type graded index lens array 231 which is formed between each optical fiber of the input side optical fiber array 228 and the optical isolators 230 on a transparent substrate 297, and an output side waveguide type graded index lens array 232 which is formed between each optical fiber of the output side optical fiber array 229 and the optical isolators 230 on the transparent substrate 297.

Furthermore, the input side waveguide type graded index lens array 231 and the output side waveguide type graded index lens array 232 correspond to an example of the graded-index optical member of the present invention. Moreover, the optical isolator 230 corresponds to an example of the optical component of the present invention.

The input side waveguide type graded index lens array 231 is formed by graded index type cores 298 of WG-GRIN lenses being arranged in parallel in a sheet-like clad 299. Similarly, the output side waveguide type graded index lens array 232 is formed by graded index type cores 298 of WG-GRIN lenses being arranged in parallel in the sheet-like clad 299.

Then, lengths and graded indices of those graded index type cores 298 are adjusted so that light emitted from an end section of each optical fiber of the input side optical fiber array 228 may be collimated in an outgoing edge of the graded index type core 298 of the input side waveguide type graded index lens array 231 corresponding to each. In addition, lengths and graded indices of those graded index type cores 298 are adjusted so that the collimated light entering from incident edges of the graded index type cores 298 of the output side waveguide type graded index lens array 232 may be imaged in end sections of respective optical fibers of the output side optical fiber array 229. Thus, it is possible to produce the input side waveguide type graded index lens array 231 and the output side waveguide type graded index lens array 232 which are equipped with the graded index type cores 298 having focal points in the desired positions on optical axes by using the process which uses the same sheet-like polysilane as that in the first embodiment of FIG. 3.

However, since the same optical isolator 230 is used for all the optical paths, it is necessary to align I/O directions of the input side optical fiber array 228 and the output side optical fiber array 229. In addition, the optical isolator 230 is constituted of a polarizer 233, a Faraday element 234, and an analyzer 35 from an incident side in order.

Thus, since it is possible to lessen an optical system when a lens with the size nearly equal to a diameter of an optical fiber is used, it is possible to control a plurality of optical transmissions by one optical isolator.

Furthermore, the optical module of this eighth embodiment is applicable not only to the case of an optical isolator but also a transmission type functional device, for example, a polarizer, a wave plate, a filter, a photonic crystal, or the like similarly.

Moreover, in FIG. 16, although it is described that the input side optical fiber array 228, optical isolator 230, input side waveguide type graded index lens array 231, output side waveguide type graded index lens array 232, and output side optical fiber array 229 are separately arranged respectively, it is also sufficient to arrange these with making these closely contacted. Even when arranging these with making these closely contacted, by adjusting lengths of the input side waveguide type graded index lens array 231 and the output side waveguide type graded index lens array 232, it is possible to optimally couple the input side optical fiber array 228 and the output side optical fiber array 229. In this case, it is possible to obtain a large merit that optical axis can be adjusted in machine accuracy.

Embodiment 9

Figure 17:
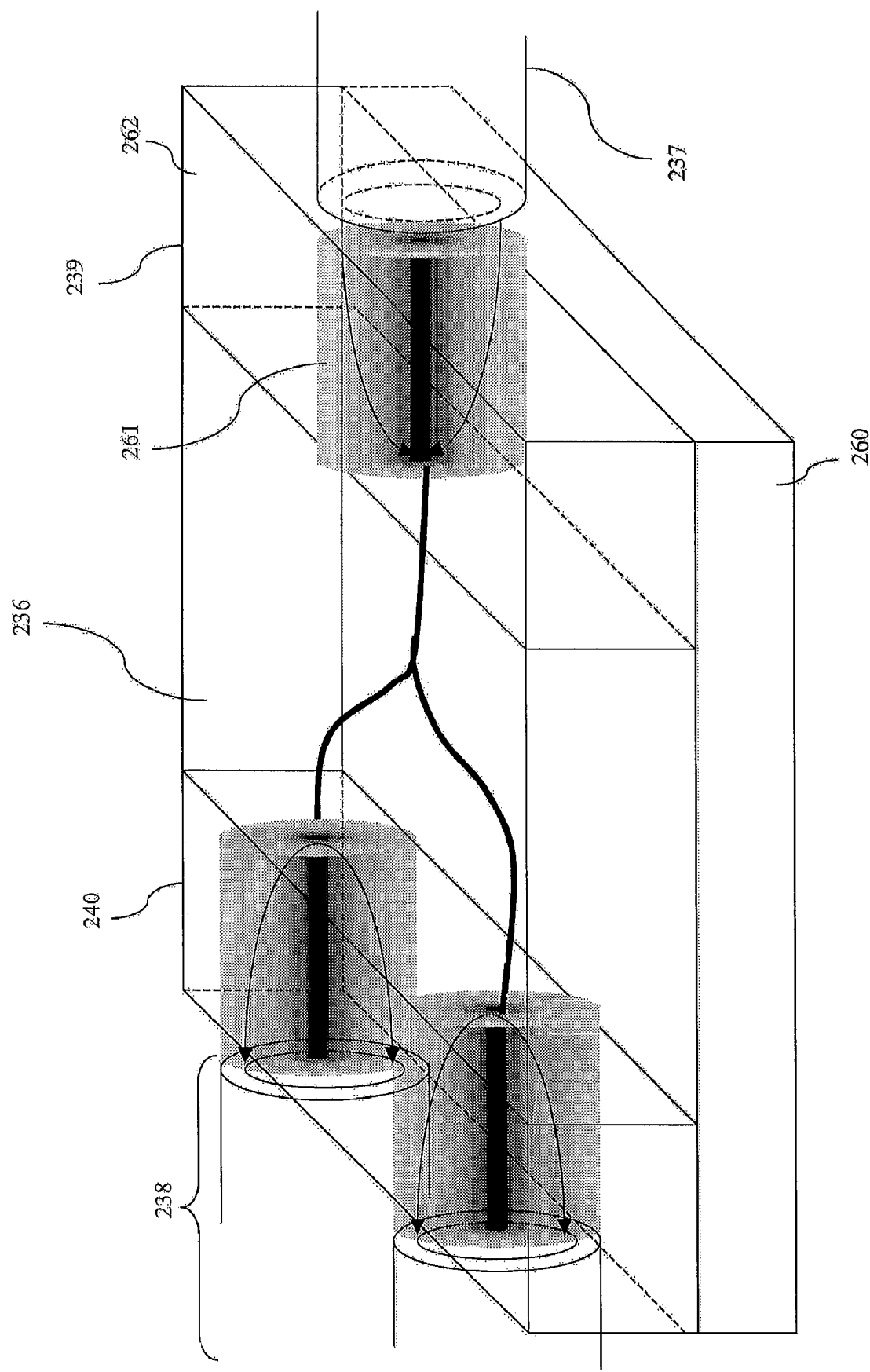
FIG. 17 is a structural schematic diagram of an optical module of a ninth embodiment of the present invention, which uses a branch device for a single mode.

FIG. 17 shows a structural schematic diagram of an optical module of a ninth embodiment of the present invention.

The optical module of this ninth embodiment is equipped with a branching device 236 for a single mode, an input side multimode optical fiber 237, and an output side multimode optical fiber array 238. And, it is equipped with an input side waveguide type graded index lens 239 which has one graded index type core 261 and a sheet-like clad 262 which couples an input side multimode optical fiber 237 and an branching device 236 for a single mode. In addition, it is equipped with an output side waveguide type graded index lens 240 which has two graded index type cores and a sheet-like clad which couples an output side multimode optical fiber array 238 and the branching device 236 for a single mode.

In addition, the input side waveguide type graded index lens 239 and the output side waveguide type graded index lens array 240 correspond to an example of the graded-index optical member of the present invention.

And the branching device 236 for a single mode, the input side waveguide type graded index lens 239, and the output side waveguide type graded index lens array 240 are arranged on the same transparent substrate 260.

However, Since a beam diameter of MMF is converted into a beam diameter of SMF in an optical system of a multimode optical fiber (MMF) whose large optical fiber diameter is 50 μm or more, and a branching device for a single mode (Y branch for SMF) whose optical fiber diameter is 10 μm or less, the input side waveguide type graded index lens 239 and the output side waveguide type graded index lens array 240 have the length in about the 0.25n (integer) pitch.

Figure 18:
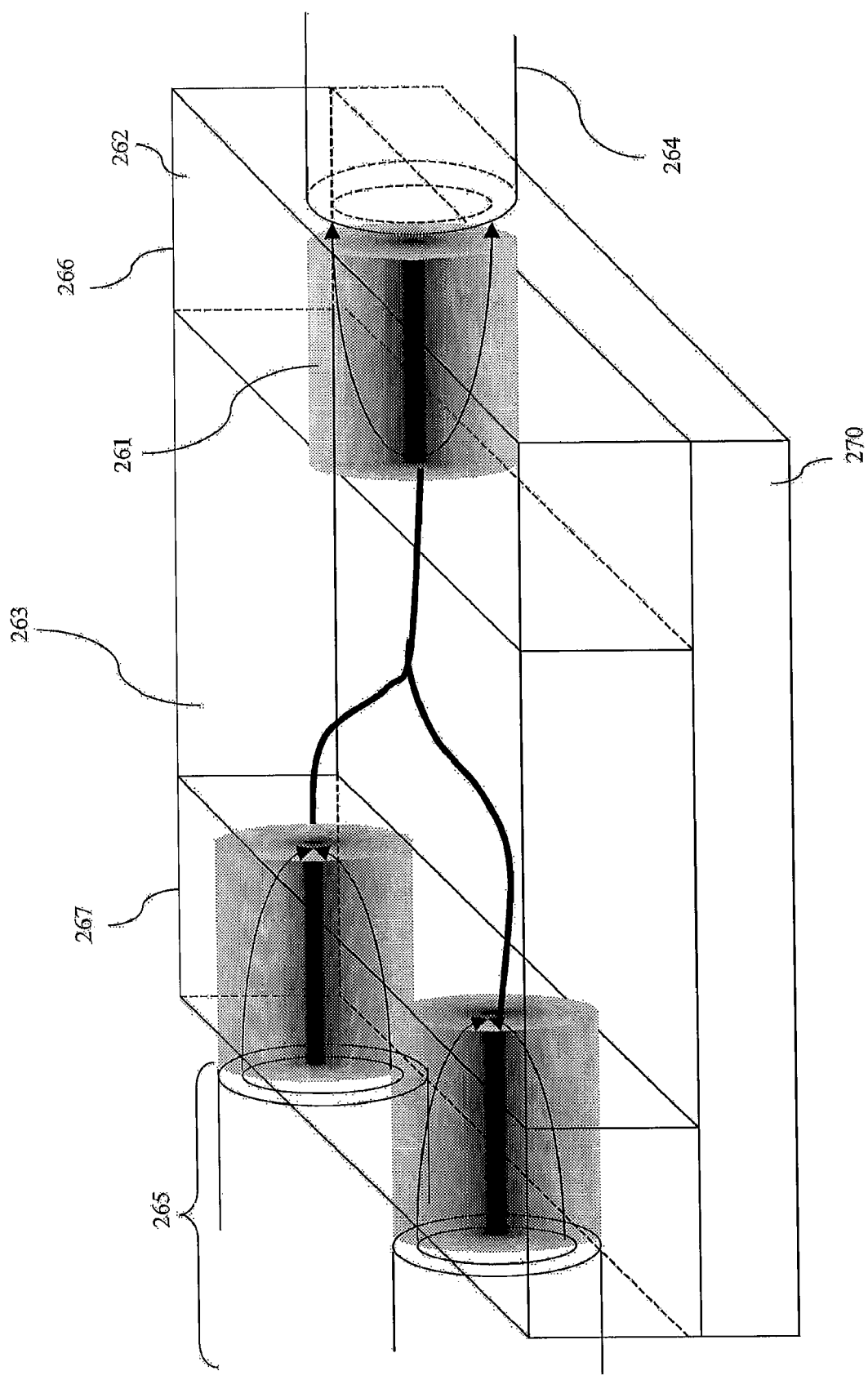
FIG. 18 is a structural schematic diagram of an optical module of the ninth embodiment of the present invention, which uses a coupling device for a single mode.

FIG. 18 shows a structural schematic diagram of an optical module with another structure according to the ninth embodiment of the present invention.

The optical module with the structure shown in FIG. 18 differs in that it is the structure of synthesizing light against the structure that the optical module in FIG. 17 branches light.

The optical module shown in FIG. 18 is equipped with a coupling device 263 for a single mode, an output side multimode optical fiber 264, and an input side multimode optical fiber array 265. And, it is equipped with an output side waveguide type graded index lens 266 which has one graded index type core 261 and a sheet-like clad 262 which couples an output side multimode optical fiber 264 and a coupling device 263 for a single mode. In addition, it is equipped with an output side waveguide type graded index lens array 267 which has two graded index type cores and a sheet-like clad which couples an input side multimode optical fiber array 265 and the coupling device 263 for a single mode.

In addition, the output side waveguide type graded index lens 266 and the input side waveguide type graded index lens array 267 correspond to an example of the graded-index optical member of the present invention.

Furthermore, the coupling device 263 for a single mode, the output side waveguide type graded index lens 266, and the input side waveguide type graded index lens array 267 are arranged on the same transparent substrate 270.

When a lens with the size nearly equal to a diameter of an optical fiber is used as shown in FIGS. 17 and 18, it is possible to lessen an optical system of performing beam conversion from MMF to SMF, and hence, it is possible to achieve high-performance, miniaturization, and low-pricing of an optical device for MMF since it is possible to use an optical device for SMF which is low-cost and high-performance, and small (Y branch in these cases) for MMF.

In addition, the optical module of this ninth embodiment is applicable not only to the case of a Y branch but also a waveguide type functional device for SMF, for example, a coupler and branch, a coupler, a filter, a photonic crystal, or the like.

Furthermore, the optical module of this ninth embodiment is applicable not only to the case of converting a MMF optical system into an SMF optical system, but also to the conversion of optical systems whose beam diameters differ. For example, since a photonic crystal is a slab type and a combinable beam diameter is smaller than SMF, it is applicable to the conversion between an SMF optical system and a photonic crystal optical system.

For example, it is possible to produce the input side waveguide type graded index lens 239 and the output side waveguide type graded index lens array 240 of the optical module of this ninth embodiment shown in FIG. 17 in the process of using the same sheet-like polysilane as the first embodiment in FIG. 3.

Here, a pattern for a mask of the branching device 236 for a single mode is also drawn on a mask into which a mask for the input side waveguide type graded index lens 239 and a mask for the output side waveguide type graded index lens array 240 are unified. And, by performing UV irradiation to all of the output side waveguide type graded index lens array 240, the input side waveguide type graded index lens 239, and the branching device 236 for a single mode, it is possible to produce the unified output side waveguide type graded index lens array 240, input side waveguide type graded index lens 239 and branching device 236 for a single mode at one time.

In addition, in this case, since a refractive index distribution is unnecessary to the branching device 236 for a single mode, it is not necessary to provide a graded ultraviolet ray transmittance in the mask pattern of a portion corresponding to the branching device 236 for a single mode.

Embodiment 10

Figure 19:
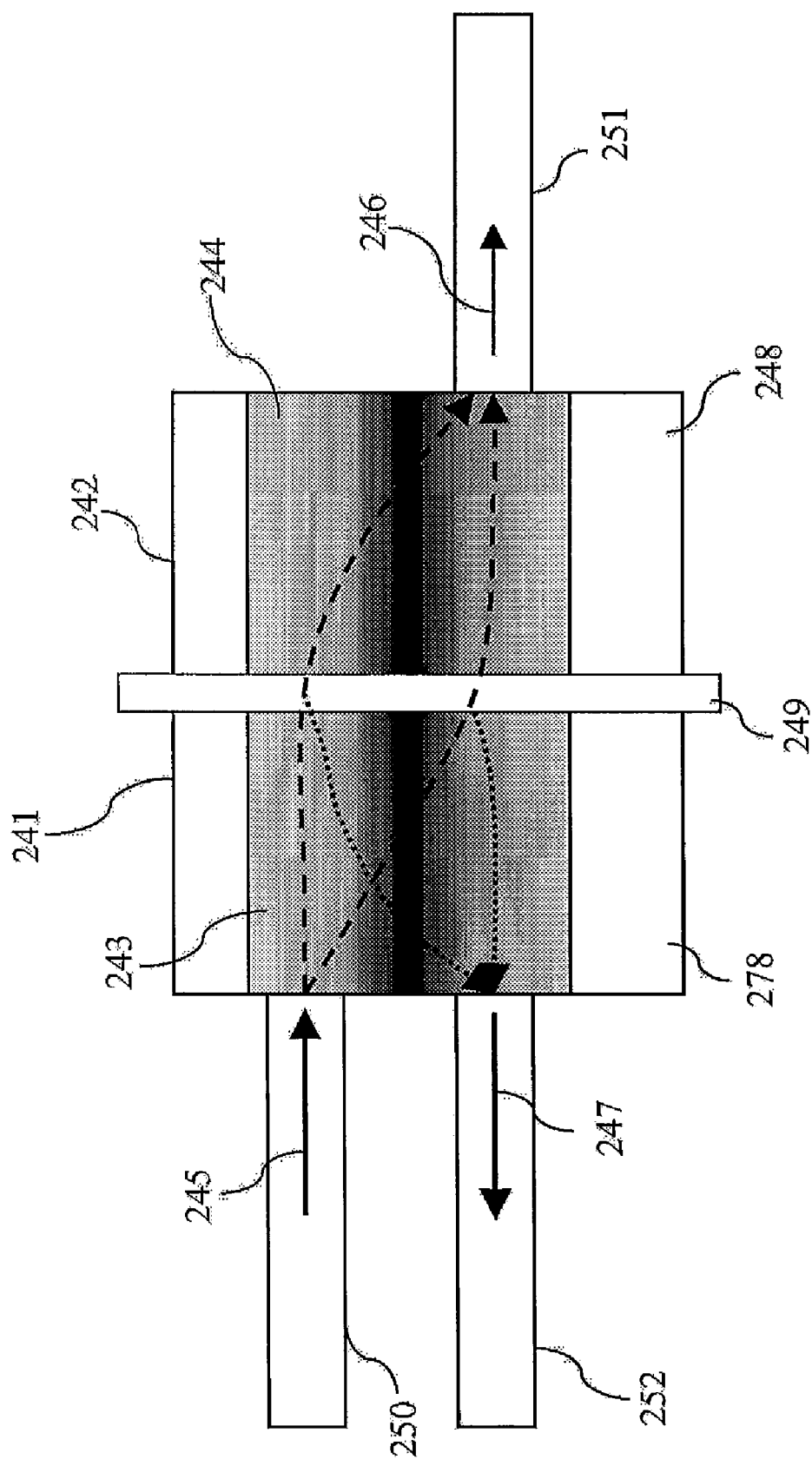
FIG. 19 is a structural schematic diagram of a three-wavelength optical coupler and branch of a tenth embodiment of the present invention.

FIG. 19 shows a structural schematic diagram of an optical module of a tenth embodiment of the present invention.

The optical module of this tenth embodiment is three-wavelength optical coupler and branch using the WG-GRIN lens with the same structure as the GI type optical waveguide 105 shown in FIG. 1(a). The input side waveguide type graded index lens 241 and the output side waveguide type graded index lens 242 which are shown in FIG. 19 have the same structure as the GI type optical waveguide 105 shown in FIG. 1(a), and FIG. 19 is a top view of these WG-GRIN lenses.

In addition, the input side waveguide type graded index lens 241 and the output side waveguide type graded index lens array 242 correspond to an example of the graded-index optical member of the present invention.

The optical module of this tenth embodiment is equipped with a first optical fiber 250, which inputs input multiplexed light ($\lambda_1$, $\lambda_2$, $\lambda_3$) 245, and a third optical fiber 252, which outputs output light ($\lambda_3$) 247, the two fibers which are arranged in parallel in an input side (left side in FIG. 19)

Furthermore, it is equipped with the input side waveguide type graded index lens 241 which has a refractive index distribution in which a refractive index is maximum on a center line and decreases parabolically according to distance from the center line, and which has the length of about the 0.25n (n: integer) pitch, and the first optical fiber 250 and the third optical fiber 252 are coupled symmetric about the center line with an input end face of the input side waveguide type graded index lens 241.

Then, a filter 249 which passes light at $\lambda_1$ and $\lambda_2$ and reflects light at 3 is arranged in an edge face side of a side where the first optical fiber 250 of the input side waveguide type graded index lens 241 does not couple. In addition, the output side waveguide type graded index lens 242 is arranged at a transmission side of the filter 249, having the same centerline as the input side waveguide type graded index lens 241 has, having a refractive index distribution in which a refractive index is maximum on the center line and decreases parabolically according to the distance from the center line, and having the length of about the 0.25n (n: integer) pitch.

In addition, the input side waveguide type graded index lens 241 and the output side waveguide type graded index lens 242 have the same structure as the GI type optical waveguide 105 shown in FIG. 1(a), and the input side waveguide type graded index lens 241 is formed of an input side graded index type core 243 and a clad 278. Then, the output side waveguide type graded index lens 242 is formed of an output side graded index type core 244 and a clad 248. Although FIG. 19 is a structural diagram of these GRIN lenses in view of a top face, when they are seen from a side face, they have a shape that their film thickness is nearly equal to a diameter of the input side graded index type core 243 and a diameter of the output side graded index type core 244.

Furthermore, a second optical fiber 251 is arranged in a position of an output side edge face of the output side waveguide type graded index lens 242 where the transmitted (output) multiplexed light ($\lambda_1$, $\lambda_2$) 246 of the filter 249 is outputted.

Here, when the input side waveguide type graded index lens 241 and the output side waveguide type graded index lens 242 have the same optical characteristics, the third optical fiber 252 and the second optical fiber 251 are on the same optical axis.

In addition, the first optical fiber 250 coupled with the input side graded index type core 243 corresponds to an example of the light emitting section of the present invention. In addition, the second optical fiber 251 coupled with the output side graded index type core 244 corresponds to the example of the light receiving section of the present invention. In addition, the third optical fiber 252 coupled with the input side graded index type core 243 corresponds to an example of another light receiving section of the present invention.

In the optical module of this tenth embodiment constituted in this way, among the input multiplexed light 245 inputted from the first optical fiber 250, light at wavelengths of $\lambda_1$ and $\lambda_2$ passes the filter 249, and enters into the second optical fiber 251 as the output multiplexed light 246. On the other hand, light at a wavelength of $\lambda_3$ is reflected by the filter 249 and enters into the third optical fiber 252 as the output light 247. Thus, it is possible to control the input multiplexed light 245 entering from the first optical fiber 250.

Thus, since it is possible to lessen an optical system when a lens of this tenth embodiment with the size nearly equal to a diameter of an optical fiber is used, it is possible to control a plurality of optical transmissions by one optical isolator for the light entering into a position displaced from a center line of a waveguide type graded index lens.

In addition, the optical module of this tenth embodiment is applicable not only to the case of a filter, but also to a half-mirror type branching accompanied by reflected light and transmitted light, and the like similarly.

As explained above, since the optical modules of the fifth to tenth embodiments use a waveguide type graded index lens (GRIN lens) which can be produced in low cost using the oxidation reaction which occurs at the time of the ultraviolet curing of sheet-like polysilane, and whose aperture is the size nearly equal to a diameter of an optical fiber, it is possible to achieve the miniaturization in low cost. In addition, since it is possible to also make the arbitrary number of waveguide type graded index lenses formed in arbitrary positions within a sheet-like shape by UV irradiation, it is also possible to perform the assembly of an array-like optical module easily.

Embodiment 11

Figure 20A:
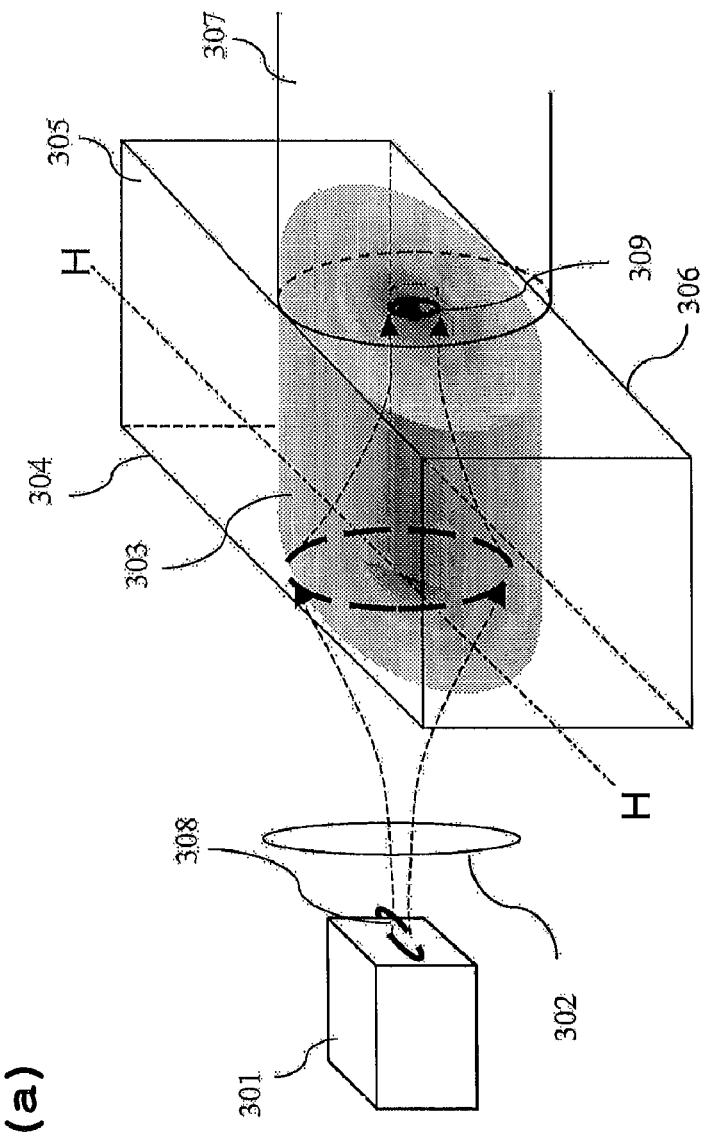
FIG. 20(a) is a structural schematic diagram of an optical module of an eleventh embodiment of the present invention.
Figure 20B:
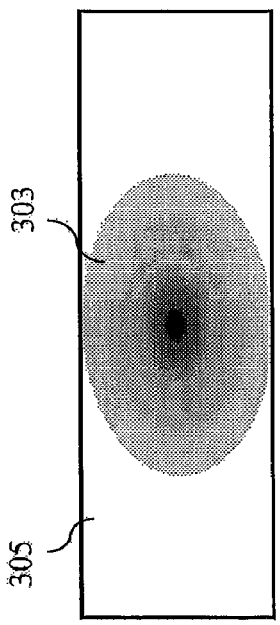
FIG. 20(b) is an H-H' sectional view of a GI type waveguide elliptical lens which constitutes the optical module of the eleventh embodiment of the present invention.

FIG. 20(a) is a structural schematic diagram of an optical module of an eleventh embodiment of the present invention. FIG. 20(b) is an H-H' sectional view of a GI type waveguide elliptical lens 304 which constitutes the optical module shown in FIG. 20(a).

The optical module of the eleventh embodiment is constituted of a GI type waveguide elliptical lens 304, a laser 301 emitting an elliptical beam 308 from a wall interface in an input side of the GI type waveguide elliptical lens 304, an input side lens 302 performing optical coupling of the GI type waveguide elliptical lens 304 and the laser 301, and an optical fiber 307 coupled with an output side of the GI type waveguide elliptical lens 304.

The GI type waveguide elliptical lens 304 is formed of sheet-like polysilane 306, and has a GI type elliptic core 303 which has a minimum portion of concentration of siloxane structure on an optical axis of a sheet-shaped cross-section, and has a concentration distribution of the siloxane structure which increases according to distance from the minimum portion of concentration of the siloxane structure mostly along with a parabola in concentric ellipses, and a clad 305 around the GI type elliptic core 303. As explained in the first embodiment using FIG. 2, the siloxane structure has a refractive index lower than the polysilane structure.

As to lightness and darkness shown in a portion of a GI type elliptic core 303 in FIGS. 20(a) and 20(b), a dark portion shows a portion with a large refractive index (that is, a portion with low concentration of siloxane structure), and a light portion shows a portion with a small refractive index (that is, a portion with high concentration of siloxane structure).

Here, since the elliptical beam 308 emitted from the laser 301 has a larger diffraction effect in a direction of a minor axis (longitudinal direction), a major axis and the minor axis of the ellipse beam reverse on an incident plane of the GI type waveguide elliptical lens 304 and what is in the longitudinal direction becomes the major axis (a beam diameter is larger). Therefore, so as to couple efficiently a beam with the optical fiber 307 which has a circular core, a rate of change of the refractive index distribution of GI type waveguide elliptical lens 304 is larger in a direction (longitudinal direction) where a beam diameter on the incident plane is larger, as shown in FIG. 20(b). That is, the GI type waveguide elliptical lens 304 has the minor axis in the direction (longitudinal direction) where a beam diameter on the incident plane is larger.

It is possible to couple the circular beam 309 with the circular core of the optical fiber 307 by such constitution.

In addition, the GI type waveguide elliptical lens 304 is an example of a graded-index optical member of the present invention. Furthermore, the incident plane of GI type waveguide elliptical lens 304 corresponds to an example of the light receiving section of the present invention, and the end section of the optical fiber 307 into which the circular beam 309 enters is an example of the input section of the present invention.

Moreover, although an emitting beam of a laser like a Fabry-Perot laser emitting a beam from a wall interface becomes elliptic, it is desirable in the case that an emitting beam shape is concentric like a surface emission-type laser that a refractive index distribution of a GI type core section is concentric rather than elliptic.

Embodiment 12

FIG. 21(a) is a structural schematic diagram of an optical module of a twelfth embodiment of the present invention. FIG. 21(b) shows a beam shape in each cross-section of FIG. 21(a), and FIG. 20(c) is a J-J' sectional view of a GI type waveguide lens 312 which constitutes the optical module shown in FIG. 21(a).

The optical module of the twelfth embodiment is constituted of a GI type waveguide lens 312, a tapered GI type lens 314 which follows the GI type waveguide lens 312, a light source 310 emitting an almost circular beam 318, and an optical fiber 316 having a circular core 317 arranged in an output side of the GI type waveguide lens 312. In addition, a tapered portion of the tapered GI type lens 314 corresponds to an example of the curved end section of the core section of the graded-index optical member of the present invention.

A GI type waveguide lens 312 has a GI type core 311 which has a minimum portion of concentration of siloxane structure on an optical axis of a cross-section of sheet-like polysilane 315, and has a concentration distribution of the siloxane structure which increases according to distance from the minimum portion of concentration of the siloxane structure mostly along with a parabola concentrically, and a clad 313 around the GI type core 311.

The tapered GI type lens 314 is cascaded in an input side of the GI type waveguide lens 312, and has a minimum portion of concentration of siloxane structure on an optical axis, and has a concentration distribution of the siloxane structure which increases according to distance from the minimum portion of concentration of the siloxane structure mostly along with a parabola concentrically, and a core section whose cross-sectional area becomes small toward an edge which has a curved surface, and a clad section around the core section.

As to lightness and darkness shown in a portion of a GI type core 311 in FIGS. 21(a) and 21(c), a dark portion shows a portion with a large refractive index (that is, a portion with low concentration of siloxane structure), and a light portion shows a portion with a small refractive index (that is, a portion with high concentration of siloxane structure).

As shown in FIG. 21(b), since a beam outputted from the light source 310 is a circular beam 318, the circular beam enters also into the GI type waveguide lens 312. And, since a refractive index of the GI type core 311 of the GI type waveguide lens 312 is distributed concentrically to an optical axis as shown in FIG. 21(c), a circular beam 319 enters also into the core 317 of the optical fiber 316.

Thus, by making the tapered GI type lens 314, which couples the GI type waveguide lens 312 and the light source 310, formed in an input side of the GI type waveguide lens 312, a lens in the input side like the input side lens 302 shown in FIG. 20 becomes unnecessary, and hence, reduction of parts man-hour and reduction of assembling man-hour can be achieved.

In addition, when an output beam shape of a light source is elliptic, what is necessary is just to make the tapered GI type lens 314 formed at an edge of the GI type waveguide elliptical lens.

FIG. 22(a) shows a structural schematic diagram of an optical module of the twelfth embodiment of the present invention in the case that an output beam shape of a light source is elliptical. FIG. 22(b) shows a beam shape in each cross-section of FIG. 22(a), and FIG. 22(c) is a K-K' sectional view of a GI type waveguide elliptical lens 320 which constitutes the optical module shown in FIG. 22(a). In addition, the same reference numerals are used for the same components as those in FIG. 21.

The optical module of the twelfth embodiment shown in FIG. 22 is constituted of a GI type waveguide elliptical lens 320, a tapered GI type elliptical lens 314 which follows the GI type waveguide elliptical lens 320, a light source 325 emitting an elliptical beam 323, and an optical fiber 316 having a circular core 317 arranged in an output side of the GI type waveguide elliptical lens 320.

The GI type waveguide elliptical lens 320 has a GI type core 321 which has a minimum portion of concentration of siloxane structure on an optical axis of a cross-section of the sheet-like polysilane 315, and has a concentration distribution of the siloxane structure which increases according to distance from the minimum portion of concentration of the siloxane structure mostly along with a parabola in concentric ellipses, and a clad 322 around the GI type core 321.

As to lightness and darkness shown in a portion of the GI type core 321 in FIGS. 22(a) and 22(c), a dark portion shows a portion with a large refractive index (that is, a portion with low concentration of siloxane structure), and a light portion shows a portion with a small refractive index (that is, a portion with high concentration of siloxane structure).

The tapered GI type lens 314 is cascaded in an input side of the GI type waveguide elliptical lens 320, and has a minimum portion of concentration of siloxane structure on an optical axis, and has a concentration distribution of the siloxane structure which increases according to distance from the minimum portion of concentration of the siloxane structure mostly along with a parabola concentrically, and a core section whose cross-sectional area becomes small toward an edge which has a curved surface, and a clad section around the core section.

As shown in FIG. 22(b), since a beam outputted from the light source 325 is the elliptical beam 323, an elliptical beam where a major axis and a minor axis of the elliptical beam 323 are reversed and the major axis becomes in a longitudinal direction enters into an incident plane of the GI type waveguide elliptical lens 320. And, as shown in FIG. 22(c), since the rate of change of the refractive index distribution of the GI type waveguide elliptical lens 320 enlarges (becomes a minor axis) in a direction (longitudinal direction) where a beam diameter on an incident plane becomes large, the circular beam 319 couples with the core 317 of the optical fiber 316.

In addition, in the process of using the same sheet-like polysilane as the first embodiment of FIG. 3 as a production method of the tapered GI type lens 314, it is also good to perform production using a mask having a graded ultraviolet ray transmittance corresponding to a refractive index distribution of the tapered GI type lens 314, or, it is also good to produce an edge of the GI type optical waveguide by making it a top lens with a dies or machining. The refractive index distribution of the tapered GI type lens produced by the former production method becomes a distribution of changing to an optical axis (the rate of change increases toward an edge). On the other hand, the refractive index distribution of the tapered GI type lens produced by the latter production method can be made two kinds of distributions, that is, the case of changing to an optical axis, and the case of not changing. In addition, the tapered GI type lens produced by the latter production method becomes structure without a clad section.

Embodiment 13

FIG. 23 is a diagram showing production steps of an optical module of a thirteenth embodiment of the present invention, which is equipped with a light source and an optical fiber. FIGS. 23(a) to 23(c) show a first step to a third step, respectively. FIG. 23(d) shows structure of the completed optical module.

A manufacturing method of the optical module of the thirteenth embodiment will be explained using FIG. 23.

Figure 23A:
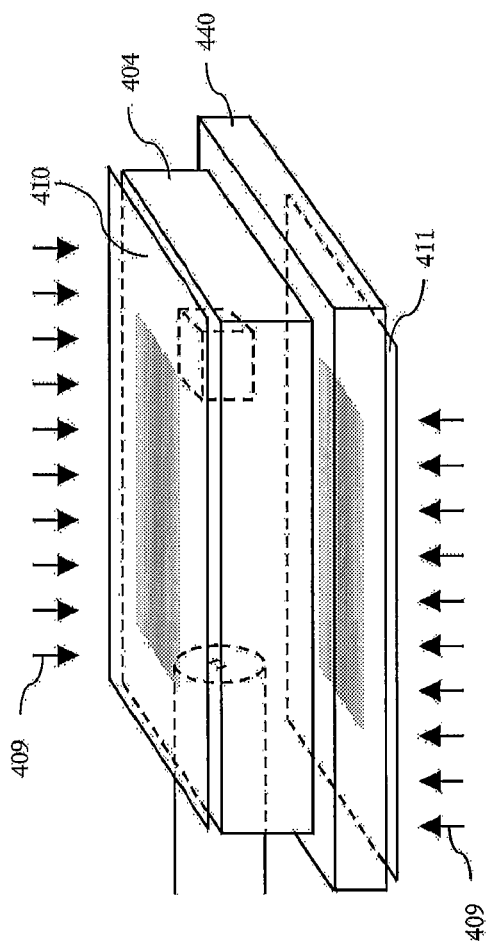
FIG. 23(a) is a diagram of a first step of production steps of an optical module of a thirteenth embodiment of the present invention, which is equipped with a light source and an optical fiber.

First, at the first step, as shown in FIG. 23(a), a light source 401 and an optical fiber 402 whose optical axes are aligned are arranged on a transparent substrate 440 with keeping a gap 403 which is a predetermined interval L. On the transparent substrate 440, a V-groove 441 for positioning of the optical fiber 402 is formed, and the optical fiber 402 is arranged according to this V-groove 441.

Figure 23B:
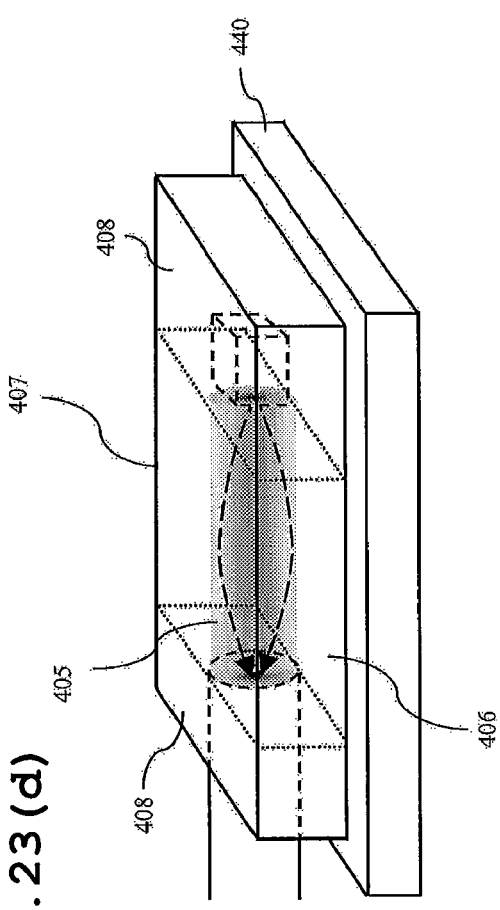
FIG. 23(b) is a diagram of a second step of production steps of the optical module of the thirteenth embodiment of the present invention, which is equipped with the light source and optical fiber.

Next, at the second step, as shown in FIG. 23(b), polysilane is coated on a portion of the gap 403, and the vicinity of respective counter-face surfaces including respective facing surfaces of the light source 401 and optical fiber 402, and the sheet-like polysilane (before curing) 404 is made to be formed on the transparent substrate 440. Thus, here, the polysilane is coated so that the portions of respective counter-face surfaces of the light source 401 and optical fiber 402 may be laid underground.

Figure 23C:
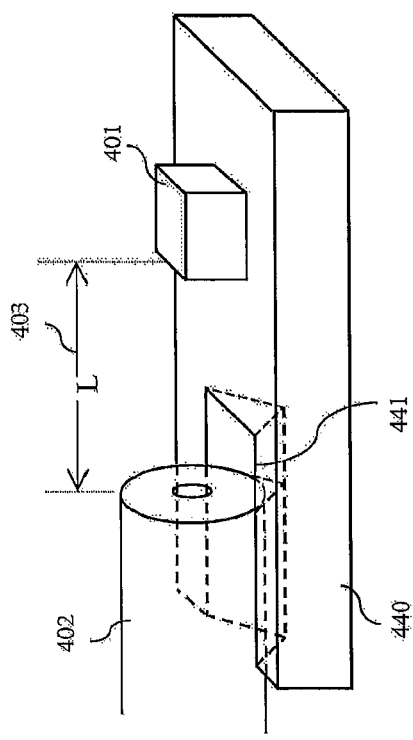
FIG. 23(c) is a diagram of a third step of production steps of the optical module of the thirteenth embodiment of the present invention, which is equipped with the light source and optical fiber.

Then, at the third step, as shown in FIG. 23(c), a graded UV transmittance upper mask 410 is arranged on a top face on the transparent substrate 440 on which the sheet-like polysilane (before curing) 404 is coated, and a graded UV transmittance lower mask 411 is arranged on a bottom face, respectively. The graded UV transmittance upper mask 410 and the graded UV transmittance lower mask 411 have graded ultraviolet ray transmittances respectively. Each of those graded ultraviolet ray transmittances is minimum in a linear portion which faces an optical axis from the light source 401 to the optical fiber 402, and is distributed so that it may increase parabolically to predetermined distance according to distance from the linear portion. And, in portions of each mask other than the portion in which an ultraviolet ray transmittance increases to this predetermined distance, the same ultraviolet ray transmittance as an outermost part of the portion in which the ultraviolet ray transmittance increases is distributed uniformly.

Then, as shown in FIG. 23(c), UV (ultraviolet rays) irradiation 409 with a light intensity uniform for an irradiation surface is performed from a top face of the graded UV transmittance upper mask 410 and from a bottom face of the graded U transmittance lower mask 411. Since the graded UV transmittance upper mask 410 and the graded UV transmittance lower mask 411 have the graded ultraviolet ray transmittance as mentioned above, by performing the UV (ultraviolet rays) irradiation 409 with uniform light intensity, the portion of the gap 403 of the sheet-like polysilane (before curing) 404 is radiated by ultraviolet rays in the amount which is minimum on an optical axis in a perpendicular direction to the optical axis from the light source 401 to the optical fiber 402, and increases according to distance from the optical axis parabolically. And, the amount of ultraviolet rays equivalent to a maximum amount of ultraviolet rays irradiated on the gap 403 is irradiated on the portions of the sheet-like polysilane (before curing) 404 other than it.

Figure 23D:
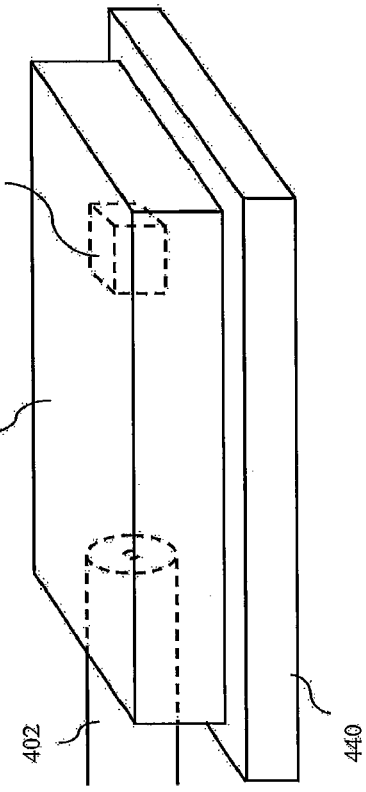
FIG. 23(d) is a completion drawing of the optical module of the thirteenth embodiment of the present invention, which is equipped with the light source and optical fiber.

Since ultraviolet rays which have a distribution in such light intensity are irradiated to the sheet-like polysilane (before curing) 404, as shown in FIG. 23(d), a sheet-like waveguide type graded index lens 407 (hereafter, this is abbreviated as a WG-GRIN lens) which is equipped with a graded index type core 405 which has a refractive index distribution which is maximum on an optical axis from the light source 401 to the optical fiber 402, and decrease according to distance from the optical axis parabolically, and a clad 406 having a fixed refractive index around it, and which is made of polysilane is formed in a portion of the gap 403.

Since an oxygen concentration distribution and a concentration distribution of siloxane structure in the graded index type core 405 are distributions opposite to the refractive index distribution, these distributions become distributions which are minimum on an optical axis from the light source 401 to the optical fiber 402, and increase according to distance from the optical axis parabolically.

And, since ultraviolet rays at an amount equivalent to the portion used as the clad 406 are irradiated on portions other than the gap 403 of the sheet-like polysilane (before curing) 404, a fixed section 408 which is made of polysilane and has the same components as the clad 406 near respective edge faces of the light source 401 and optical fiber 402 is formed. Since the sheet-like polysilane (before curing) 404 is hardened by the UV irradiation 409, positions of the light source 401, WG-GRIN lens 407, and optical fiber 402 are fixed by the fixed section 408, and the optical module of the thirteenth embodiment is completed.

In addition, the light source 401 corresponds to an example of the first optical part of the present invention, and the optical fiber 402 corresponds to an example of the second optical part of the present invention. Furthermore, the transparent substrate 440 corresponds to an example of the substrate of the present invention, and the V-groove 441 corresponds to an example of the groove of positioning according to the present invention. Moreover, the first step, second step, and third step correspond to an example of the arranging step, coating step, and polysilane curing step of the present invention, respectively.

In addition, as for a shape of the polysilane coated at the second step, although it is desirable that the portion in which the WG-GRIN lens 407 is formed has uniform film thickness, it is not necessary that the fixed section 408 and portions other than the portion in the gap 403 in which the WG-GRIN lens 407 is formed have constant film thickness.

Furthermore, it is not always necessary that an amount of ultraviolet rays radiate the sheet-like polysilane (before curing) 404 of a portion in which the WG-GRIN lens 407 is made to be formed increases according to the distance from the optical axis from the light source 401 to the optical fiber 402, but it is sufficient so long as it does not decrease according to the distance from the optical axis. Hence, for example, it is also sufficient that a fixed amount of ultraviolet rays may be irradiated near the optical axis from the light source 401 to the optical fiber 402, and the amount of UV irradiation may be made to increase according to the distance from the area where the amount of ultraviolet rays is fixed.

As for the optical module of the thirteenth embodiment produced by the above-mentioned manufacturing method, since film thickness (core diameter) of the WG-GRIN lens 407 is only about the size of a diameter of an optical fiber, it is possible to perform remarkable miniaturization rather than using a conventional GRIN lens with an aperture of 1 mm or more and length of several mm. In addition, since it is possible to fix the light source 401 and optical fiber 402 simultaneously with producing the WG-GRIN lens 407, the manufacturing process of the optical module also becomes simple.

In addition, the alignment of the optical axes of the light source 401 and optical fiber 402 is performed by the marking alignment or passive alignment of arranging them in a groove (V-groove 441 etc.) on a silicon substrate as shown in FIG. 23(a) like the conventional.

Moreover, since a refractive index distribution of the GI type core 405 is designed from relation between an emitting beam status of the light source 401, and a desired status of a beam entered into the optical fiber 402, it may not be necessarily centrosymmetric to an optical axis from the light source 401 to the optical fiber 402. For example, when a shape of a beam from a light source is concentric circular to an optical axis in the case of a common optical fiber which has a core isotropic to the optical axis, optimum coupling can be performed in the case that the refractive index distribution of the GI type core 405 of the WG-GRIN lens 407 is also concentric circular.

In addition, when the optical fiber 402 is an SMF with 10 µm or less of core diameter shown in FIG. 23, the lens length L (=gap 403) is designed in about the 0.5n (n: integer) pitch since a condensing optical system is optimum for coupling for both of the input and output of the WG-GRIN lens 407. Since a condensing system is optimum for an input side and a condensing system or a collimating system is optimum for an output side for coupling in the case of an MMF with 50 µm or more of core diameter of the optical fiber 402, the lens length L is designed in a 0.25n to 0.5n (n: integer) pitch.

Figure 24:
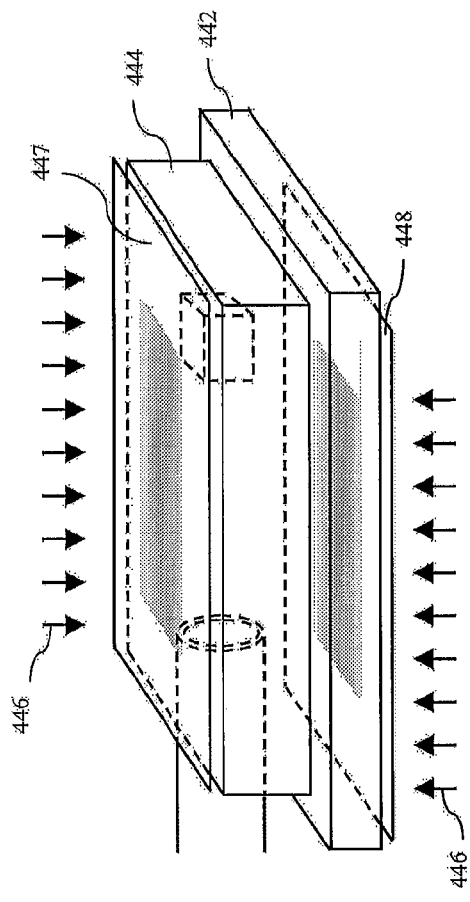
FIG. 24(a) is a diagram of a first step of production steps of an optical module of the thirteenth embodiment of the present invention, which is equipped with a large-diameter optical fiber and a photodetector.
FIG. 24(b) is a diagram of a second step of production steps of the optical module of the thirteenth embodiment of the present invention, which is equipped with the large-diameter optical fiber and photodetector.
FIG. 24(c) is a diagram of a third step of production steps of the optical module of the thirteenth embodiment of the present invention, which is equipped with the large-diameter optical fiber and photodetector.
FIG. 24(d) is a completion drawing of the optical module of the thirteenth embodiment of the present invention, which is equipped with the large-diameter optical fiber and photodetector.
Figure 24:
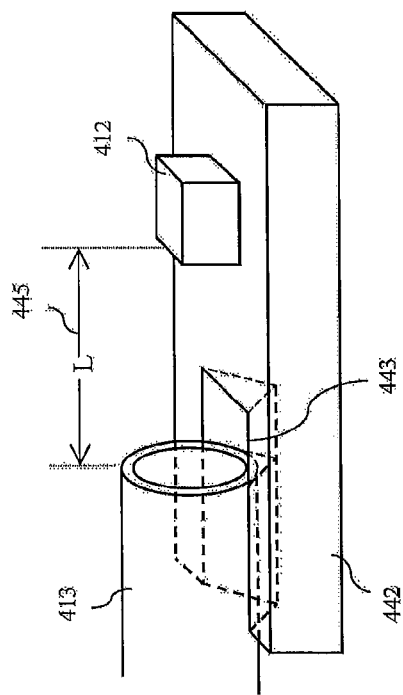
Figure 24:
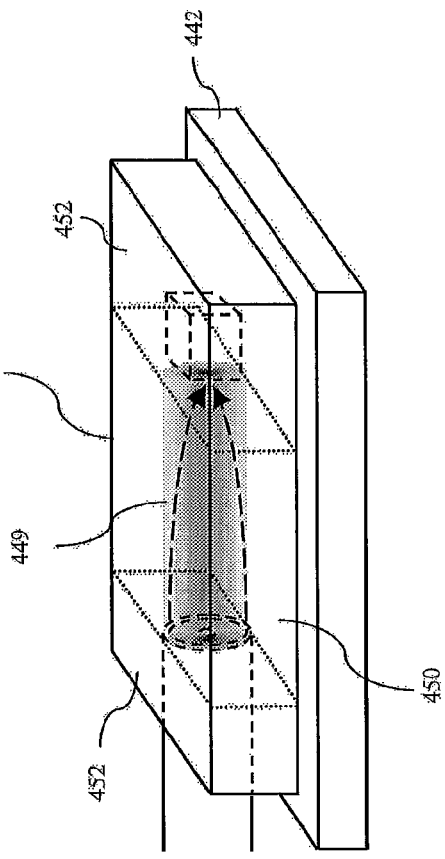
Figure 24:
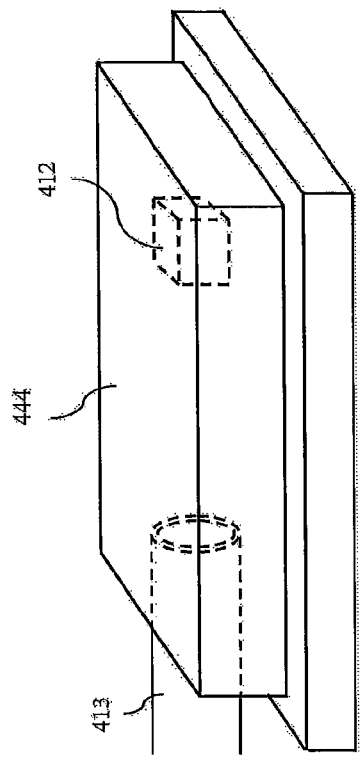

FIG. 24 is a diagram showing production steps of the optical module of the thirteenth embodiment of the present invention, which is equipped with a photodetector and a large-diameter optical fiber. FIGS. 24(a) to 24(c) show a first step to a third step, respectively. FIG. 24(d) shows structure of the completed optical module.

Difference is that the light source 401 is made the light emitting section, and the end section of the optical fiber 402 is made the light receiving section in FIG. 23, and on the other hand, the end section of the large-diameter optical fiber 413 is made the light emitting section, and the photodetector 412 is made the light receiving section in the optical module in FIG. 24. Portions having the same numerals as those in FIG. 23 have the same functions. In addition, about a manufacturing method, since it is the same as that of the case in FIG. 23, description will be omitted.

In addition, in FIG. 24, the large-diameter optical fiber 413 corresponds to an example of the first optical component of the present invention, and the photodetector 12 corresponds to an example of the second optical component of the present invention.

As shown in FIG. 24, when an optical module is coupling of the large-diameter optical fiber 413 and photodetector 412, since the photodetector 412 has a small light-receiving area while the large-diameter optical fiber 413 such as a plastic fiber may have a core diameter of more than 100 µm, a waveguide type graded index lens (WG-GRIN lens) 451 is designed so that an incident beam from the large-diameter optical fiber 413 may condense to the photodetector.

Forming mechanisms of the WG-GRIN lens 407 shown in FIG. 23 and the WG-GRIN lens 451 shown in FIG. 24 are the same as forming mechanisms explained in the first embodiment using FIGS. 2 and 3.

Generally, when return light causes the characteristic degradation of a light source, an isolator is used to prevent the return light from penetrating and entering into the light source, but cost increases because of using the isolator in this case.

Similarly to the WG-GRIN lens 207 in FIG. 13(b) explained in the second embodiment, by arranging the WG-GRIN lens 407 in the thirteenth embodiment in the state of axial displacement, it is possible to prevent an injection of return light to a light source without using an isolator or the like, and hence, and not to cause characteristic degradation of the light source.

In addition, by inclining an edge face of the WG-GRIN lens 407 in the optical module of the thirteenth embodiment, shown in FIG. 23, to incline I/O directions to I/O edge faces of the light source 401 and optical fiber 402 to an optical axis, it is possible to prevent the return light, which is reflected light from the edge face of the WG-GRIN lens 407 to the light source 401, in (1) an interface between air and the WG-GRIN lens 407, and (2) an interface between the WG-GRIN lens 407 and air.

Thus, in the optical module of the thirteenth embodiment equipped with a WG-GRIN lens (waveguide type graded index lens) which can be produced in low cost using the oxidation reaction which occurs at the time of the ultraviolet curing of sheet-like polysilane, and whose aperture is the size nearly equal to a diameter of an optical fiber, since portions not used as the WG-GRIN lens become fixed sections of an optical component, it is possible to achieve simplification of assembly of the optical module.

In addition, when coating polysilane in a gap between respective optical components in the state that optical components such as an optical fiber and a light source are surface-mounted on a silicon substrate to make a waveguide type graded index lens formed, it is recommendable to make it possible also to irradiate ultraviolet rays from a reverse side of the silicon substrate by using the silicon substrate made of a transparent material for ultraviolet rays, or by using a silicon substrate which is transparent at least only in a portion where a waveguide type graded index lens is formed.

Embodiment 14

FIG. 25 is a diagram showing production steps of an optical module of a fourteenth embodiment of the present invention, which is equipped with a light source array and an optical fiber array. FIGS. 25(a) to 25(c) show a first step to a third step, respectively. FIG. 25(d) shows structure of the completed optical module.

A manufacturing method of the optical module of the fourteenth embodiment will be explained using FIG. 25.

Figure 25A:
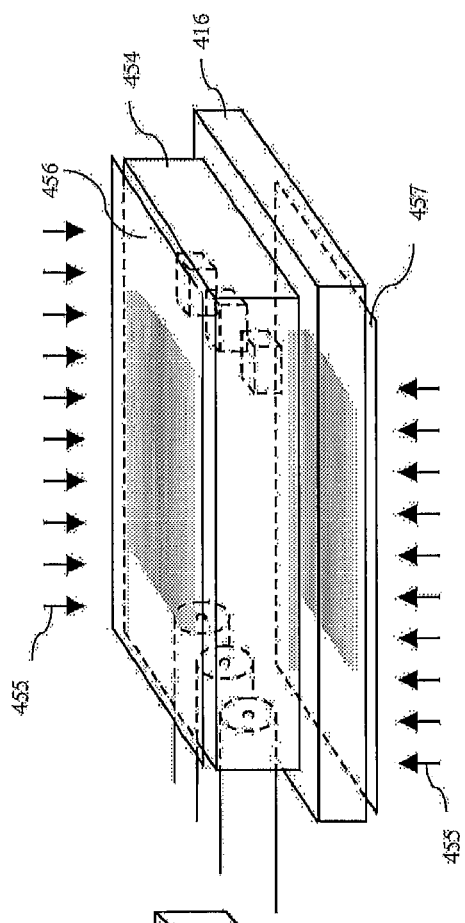
FIG. 25(a) is a diagram of a first step of production steps of an optical module of a fourteenth embodiment of the present invention, which is equipped with a light source array and an optical fiber array.

First, at the first step, as shown in FIG. 25(a), a light source array 415 arranged on a transparent substrate 416 in parallel, and an optical fiber array 414 which faces the light source array 415, and in which each optical fiber which is coupled with each light source of the light source array 415 is arranged in parallel are arranged with keeping a predetermined gap 453.

Figure 25B:
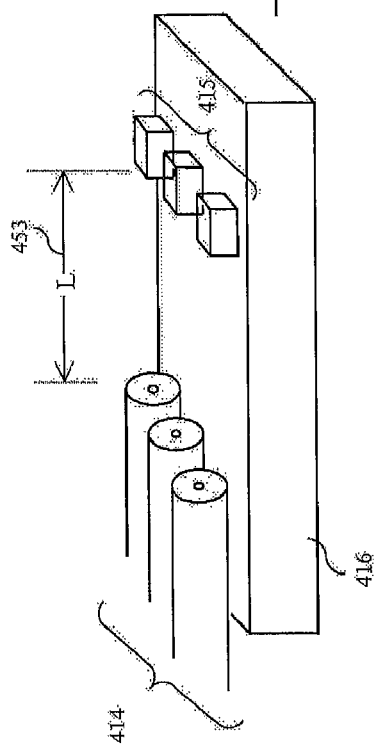
FIG. 25(b) is a diagram of a second step of production steps of the optical module of the fourteenth embodiment of the present invention, which is equipped with the light source array and optical fiber array.

Next, at the second step, as shown in FIG. 25(b), polysilane is coated on a portion of the gap 453, and the vicinity of respective counter-face surfaces including respective facing surfaces of the light source array 415 and optical fiber array 414, and the sheet-like polysilane (before curing) 454 is made to be formed on the transparent substrate 416.

Figure 25C:
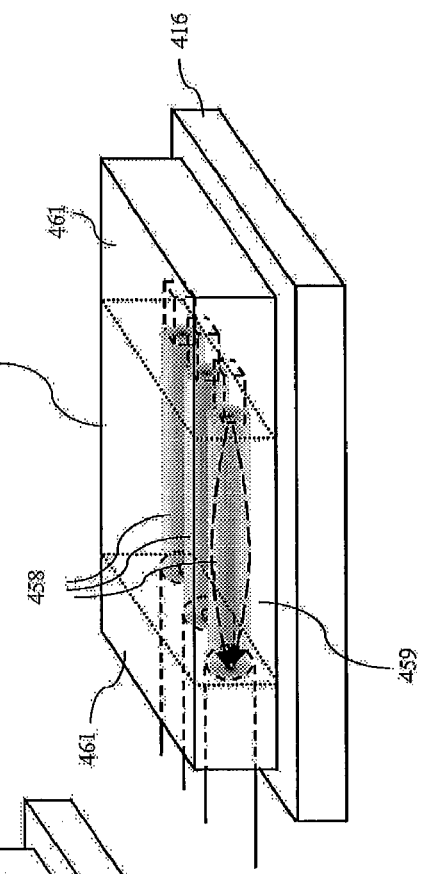
FIG. 25(c) is a diagram of a third step of production steps of the optical module of the fourteenth embodiment of the present invention, which is equipped with the light source array and optical fiber array.

Then, at the third step, as shown in FIG. 25(c), a graded UV transmittance upper mask 456 is arranged on a top face on the transparent substrate 416 on which the sheet-like polysilane (before curing) 454 is formed, and a graded UV transmittance lower mask 457 is arranged on a bottom face, respectively. The graded UV transmittance upper mask 456 and the graded UV transmittance lower mask 457 each have a graded ultraviolet ray transmittance. Each of those graded ultraviolet ray transmittances is minimum in a plurality of linear portions which face an optical axis from each light source of the light source array 415 to each optical fiber of the optical fiber array 414, and is distributed so that it may increase parabolically to predetermined distance according to distance from each of the linear portions. And, in portions of each mask other than the portion which faces the portion of the gap 453, the same ultraviolet ray transmittance as a maximum ultraviolet ray transmittance in a portion which the ultraviolet ray transmittance increases is distributed uniformly.

Then, as shown in FIG. 25(c), UV (ultraviolet rays) irradiation 455 with a light intensity uniform for an irradiation surface is performed from a top face of the graded UV transmittance upper mask 456 and from a bottom face of the graded U transmittance lower mask 457. Since the graded UV transmittance upper mask 456 and the graded UV transmittance lower mask 457 have the graded ultraviolet ray transmittance as mentioned above, by performing the UV (ultraviolet rays) irradiation 455 with uniform light intensity, the portion of the gap 453 of the sheet-like polysilane (before curing) 454 is radiated by ultraviolet rays in the amount which is minimum on each optical axis from each light source of the light source array 415 to each corresponding optical fiber of the optical fiber array 414, and increases according to distance from the optical axis parabolically. And, the amount of ultraviolet rays equivalent to a maximum amount of ultraviolet rays irradiated on the gap 453 is irradiated on the portions other than the gap 453 of the sheet-like polysilane (before curing) 454.

Figure 25D:
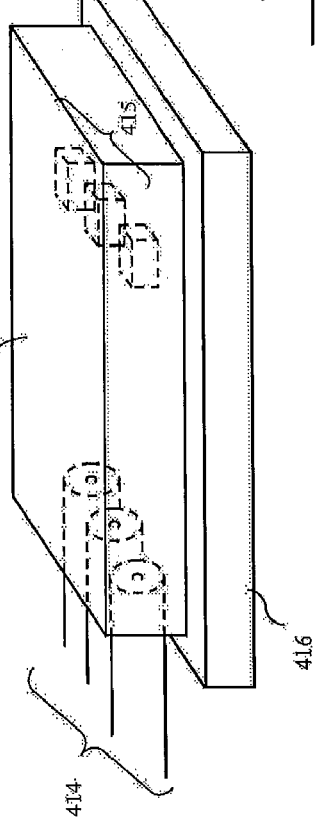
FIG. 25(d) is a completion drawing of the optical module of the fourteenth embodiment of the present invention, which is equipped with the light source array and optical fiber array.

Since ultraviolet rays which have a distribution in such light intensity are irradiated to the sheet-like polysilane (before curing) 454, as shown in FIG. 25(d), a sheet-like waveguide type graded index lens array 460 which is equipped with a plurality of parallel graded index type cores 458 which each have a refractive index distribution which is maximum on an optical axis from each light source of the light source array 415 to each optical fiber of the optical fiber array 414, and decreases according to distance from the optical axis parabolically, and a clad 459 having a fixed refractive index around it, and which is made of polysilane is formed in a portion of the gap 453.

And, since ultraviolet rays at an amount equivalent to the portion used as the clad 459 are irradiated on portions other than the gap 453 of the sheet-like polysilane (before curing) 454, a fixed section 461 which is made of polysilane and has the same components as the clad 459 near respective edge faces of each light source of the light source array 415 and each optical fiber of the optical fiber array 414 is formed. Since the sheet-like polysilane (before curing) 454 is hardened by the UV irradiation 455, positions of the light source array 415, waveguide type graded index lens array 460, and optical fiber array 414 are fixed by the fixed sections 461, and the optical module of the fourteenth embodiment is completed.

In addition, the light source array 415 corresponds to an example of the first optical component of the present invention which has a plurality of light emitting sections. In addition, the optical fiber array 414 corresponds to an example of the second optical component of the present invention which has a plurality of light receiving sections. Furthermore, the transparent substrate 416 corresponds to an example of the substrate of the present invention. In addition, the first step, second step, and third step correspond to an example of the arranging step, coating step, and polysilane curing step of the present invention, respectively.

As explained above, by using the manufacturing method of the optical module of the fourteenth embodiment, it is possible to produce easily an optical module array equipped with a waveguide type graded index lens array which couples each optical fiber of an optical fiber array with each light source of the light source array which has a plurality of light sources in desired optical characteristics respectively.

Embodiment 15

FIG. 26 is a diagram showing production steps of an optical module of a fifteenth embodiment of the present invention, which is an inline type optical part. FIG. 26(a) shows a first step, FIG. 26(b) shows a second step, FIG. 26(c) shows a third step, FIGS. 26(d) and 26(e) show a fourth step, FIGS. 26(f) and 26(g) show a fifth step, and FIG. 26(h) shows a sixth step, respectively.

A manufacturing method of the optical module of the fifteenth embodiment will be explained using FIG. 26.

Figure 26A:
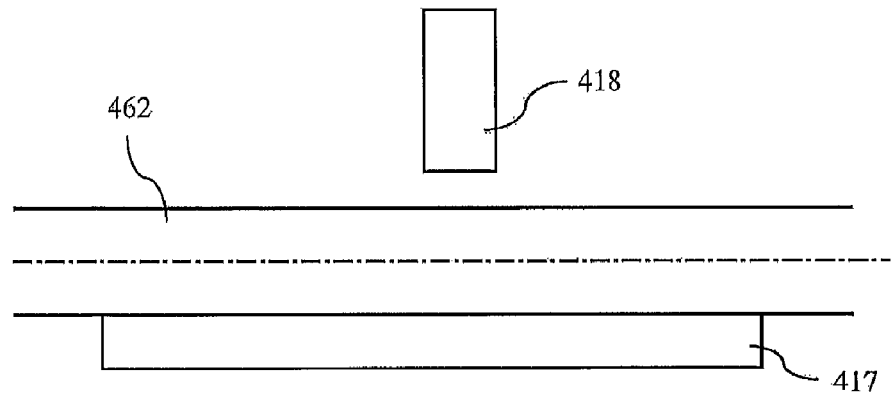
FIG. 26(a) is a diagram of a first step of production steps of an inline optical isolator module of a fifteenth embodiment of the present invention.

First, at the first step, as shown in FIG. 26(a), an optical fiber 462 is arranged on a transparent substrate 417.

Figure 26B:
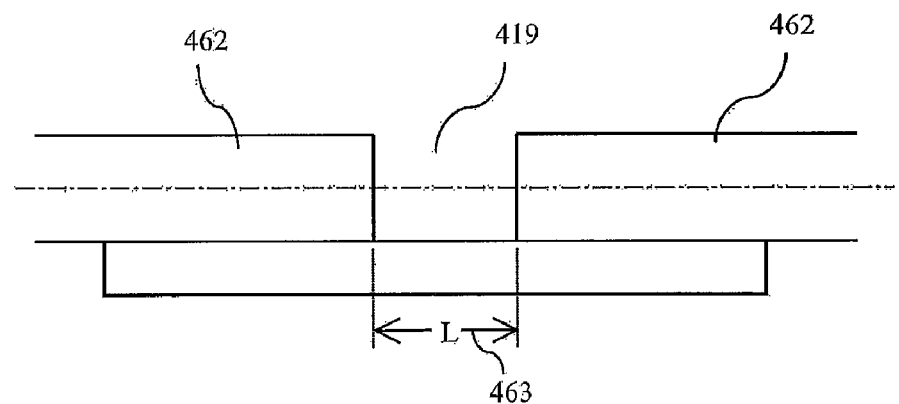
FIG. 26(b) is a diagram of a second step of production steps of the inline optical isolator module of the fifteenth embodiment of the present invention.

Then, at the second step, as shown in FIG. 26(b), a first cut section 419 is made to be formed in the optical fiber 462 with a first cutting blade 418 so that a space between two cut surfaces of the optical fiber 462 after cutting may become a gap 463 which is a predetermined interval L.

Figure 26C:
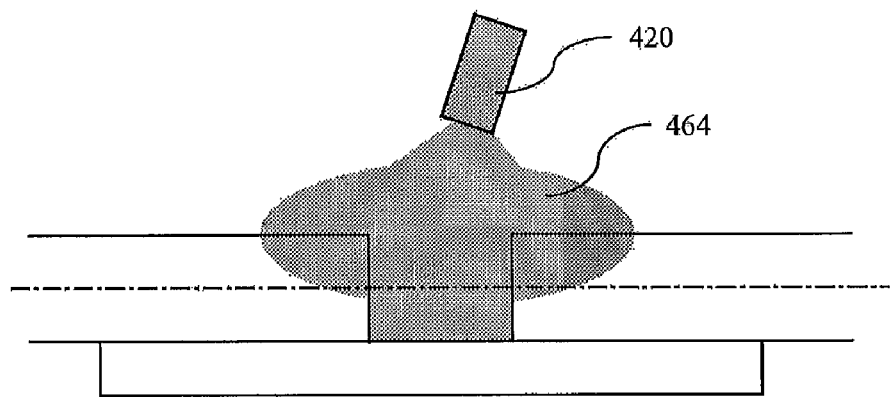
FIG. 26(c) is a diagram of a third step of production steps of the inline optical isolator module of the fifteenth embodiment of the present invention.

Next, at the third step, as shown in FIG. 26(c), polysilane is coated on a portion of the gap 463 from a filling nozzle 420 so as to include two cut counter-face surfaces of the cut optical fiber 462, and the sheet-like polysilane (before curing) 464 is made to be formed on the transparent substrate 417.

Figure 26D:
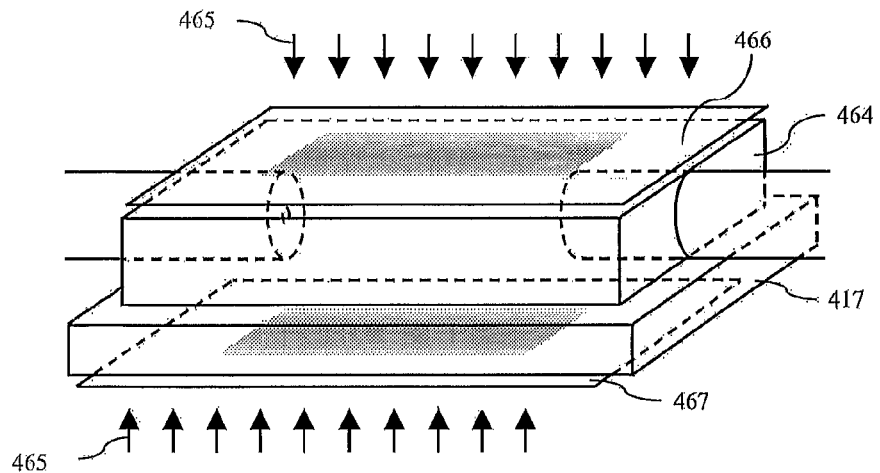
FIG. 26(d) is a diagram of a fourth step of production steps of the inline optical isolator module of the fifteenth embodiment of the present invention.

Next, at the fourth step, as shown in FIG. 26(d), after a graded U transmittance upper mask 466 is arranged on a top face on the transparent substrate 417 on which the sheet-like polysilane (before curing) 464 is coated, and a graded UV transmittance lower mask 467 is arranged on a bottom face, respectively, UV (ultraviolet rays) irradiation 465 with a uniform light intensity is performed from both faces of outer sides of the graded UV transmittance upper mask 466 and the graded UV transmittance lower mask 467.

The graded UV transmittance upper mask 466 and the graded UV transmittance lower mask 467 each have a graded ultraviolet ray transmittance. Each of those graded ultraviolet ray transmittances is minimum in a linear portion which faces an optical axis between the two cut surfaces of the optical fiber 462, and is distributed so that it may increase parabolically to predetermined distance according to distance from the linear portion. And, in portions of each mask other than the portion in which an ultraviolet ray transmittance increases to this predetermined distance, the same ultraviolet ray transmittance as an outermost part of the portion which the ultraviolet ray transmittance increases is distributed uniformly.

Since the graded UV transmittance upper mask 466 and the graded UV transmittance lower mask 467 have such graded ultraviolet ray transmittance, by performing the UV (ultraviolet rays) irradiation 465 with a uniform light intensity, the portion of the gap 463 of the sheet-like polysilane (before curing) 464 is radiated by ultraviolet rays in the amount which is minimum on an optical axis in a perpendicular direction to the optical axis between the two cut surfaces of the optical fiber 462, and increases according to distance from the optical axis parabolically. And, the amount of ultraviolet rays equivalent to a maximum amount of ultraviolet rays irradiated on the gap 463 is irradiated on the portions of the sheet-like polysilane (before curing) 464 other than it.

Figure 26E:
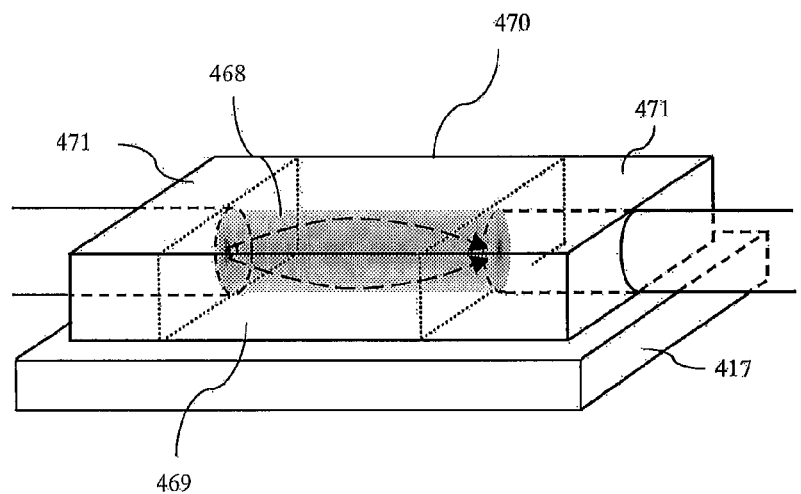
FIG. 26(e) is a diagram of a fourth step of production steps of the inline optical isolator module of the fifteenth embodiment of the present invention.

Since ultraviolet rays which have a distribution in such a light intensity are irradiated to the sheet-like polysilane (before curing) 464, as shown in FIG. 26(e), a sheet-like waveguide type graded index lens 470 which is equipped with a graded index type core 468 which has a refractive index distribution which is maximum on an optical axis between the two cut surfaces of the optical fiber 462, and decrease according to distance from the optical axis parabolically, and a clad 469 having a fixed refractive index around it, and which is made of polysilane is formed in a portion of the gap 463.

Then, since ultraviolet rays at an amount equivalent to the portion used as the clad 469 are irradiated on portions other than the gap 463 of the sheet-like polysilane (before curing) 464, a fixed section 471 which is made of polysilane and has the same components as the clad 469 is formed. Since the sheet-like polysilane (before curing) 464 is cured by the UV irradiation 465, the position of two cut optical fibers and the waveguide type graded index lens 470 are fixed by the fixed sections 471.

Figure 26F:
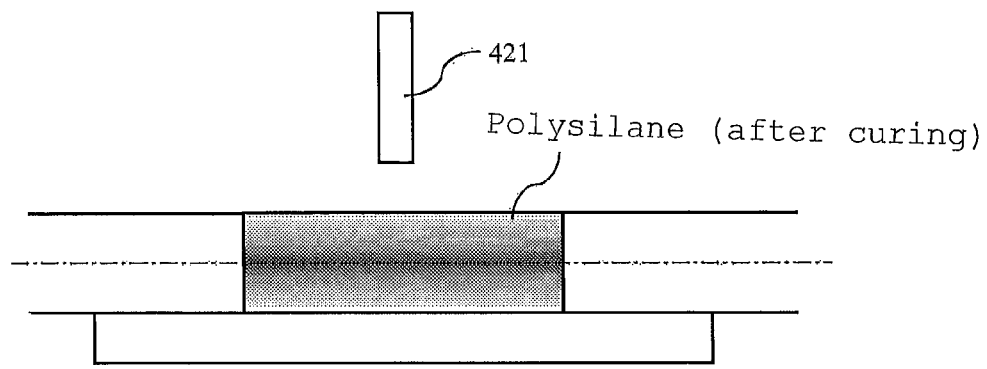
FIG. 26(f) is a diagram of a fifth step of production steps of the inline optical isolator module of the fifteenth embodiment of the present invention.
Figure 26G:
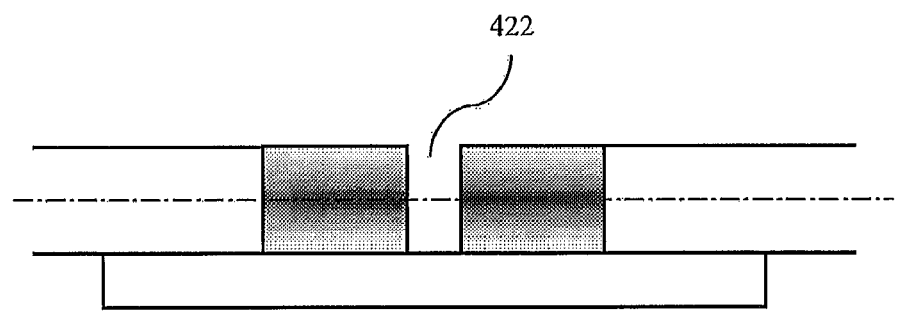
FIG. 26(g) is a diagram of a fifth step of production steps of the inline optical isolator module of the fifteenth embodiment of the present invention.

Next, at the fifth step, as shown in FIGS. 26(f) and 26(g), a second cut section 422 is made to be formed with a second cutting blade 421 so that after cutting the waveguide type graded index lens 470 the interval between two cut surfaces is equal to the length of an optical path of an optical isolator 423 to be inserted.

Figure 26H:
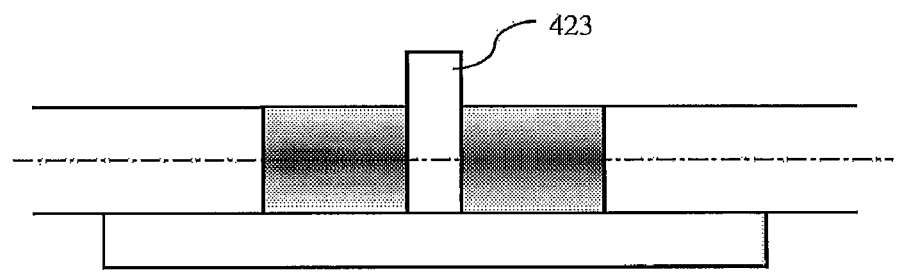
FIG. 26(h) is a diagram of a sixth step of production steps of the inline optical isolator module of the fifteenth embodiment of the present invention.

Finally, at the sixth step, as shown in FIG. 26(h), the optical isolator 423 is inserted in the second cut section 422, and the optical module of the fifteenth embodiment is completed.

The portion of the polysilane (after curing) of the completed optical module of this fifteenth embodiment shown in FIG. 26(h) is adjusted in such a refractive index distribution that light emitted from an edge of one optical fiber 462 may enter into the optical isolator 423 with being collimated, and the collimated light emitted from the optical isolator 423 may be imaged on and entered into an edge of another optical fiber 462. It is possible to make the portion of the polysilane (after curing) of the completed optical module, which is shown in FIG. 26(h), such a refractive index distribution by adjusting the graded ultraviolet ray transmittances of the graded UV transmittance upper mask 466 and the graded UV transmittance lower mask 467.

In addition, in the second step shown in FIG. 26(b), one side of the two facing optical fibers of the cut optical fiber 462 corresponds to an example of the first optical component of the present invention, and another optical fiber corresponds to an example of the second optical component of the present invention. In addition, the transparent substrate 417 corresponds to an example of the substrate of the present invention.

In addition, the optical isolator 423 corresponds to an example of the third optical component of the present invention.

Furthermore, the first step and second step correspond to an example of the arranging step of the present invention. In addition, the third step, fourth step, fifth step, and sixth step correspond to an example of the coating step, polysilane curing step, cutting step, and third optical component mounting step of the present invention, respectively.

Thus, by using the manufacturing method of the optical module of the fifteenth embodiment, since it is possible also about the optical module of an in-line type optical component easily to produce a WG-GRIN lens having an aperture nearly equal to a core diameter of an optical fiber, and to fix an optical component, it is possible to miniaturize the in-line type optical module, and to reduce man-hour of assembly.

In addition, even if the third optical component of the fifteenth embodiment is not only an optical isolator, but also a transmission type functional device, for example, a polarizer, a wave plate, a filter, a photonic crystal, or the like, it is possible to produce an optical module similarly using the manufacturing method of the fifteenth embodiment.

Moreover, when making a plurality of optical fibers into a shape of an array in parallel, packing the plurality of optical fibers as mentioned above, and performing cutting, an in-line type optical module array is also easily producible.

Embodiment 16

FIG. 27 is a diagram showing production steps of the optical module of the sixteenth embodiment of the present invention, which includes an optical device for SMF. FIGS. 27(a) to 27(d) show a first step to a fourth step, respectively. Each of such drawings is a top view seen from the above.

A manufacturing method of the optical module of the sixteenth embodiment will be explained using FIG. 27.

Figure 27A:
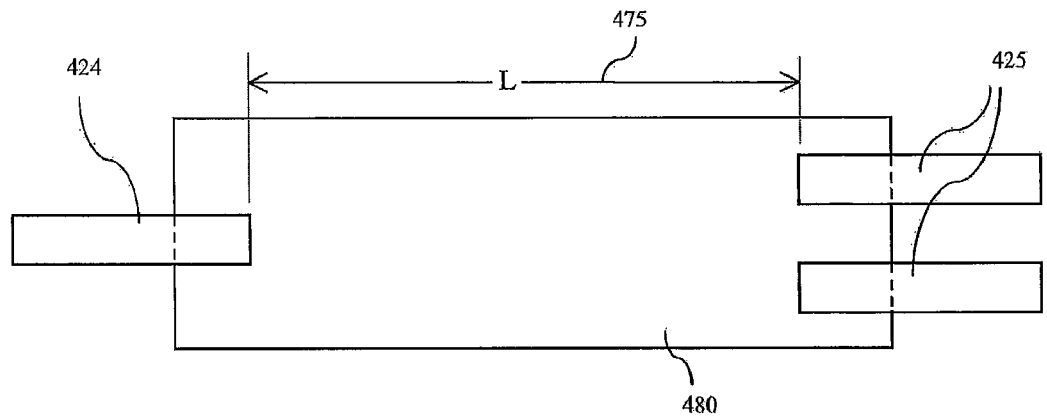
FIG. 27(a) is a diagram of a first step of production steps of an optical module of a sixteenth embodiment of the present invention, which includes an optical device for SMF.

First, at the first step, as shown in FIG. 27(a), an input side multimode fiber 424 and an output side multimode fiber array 425 are arranged on a transparent substrate 480 with keeping a predetermined gap 475.

Figure 27B:
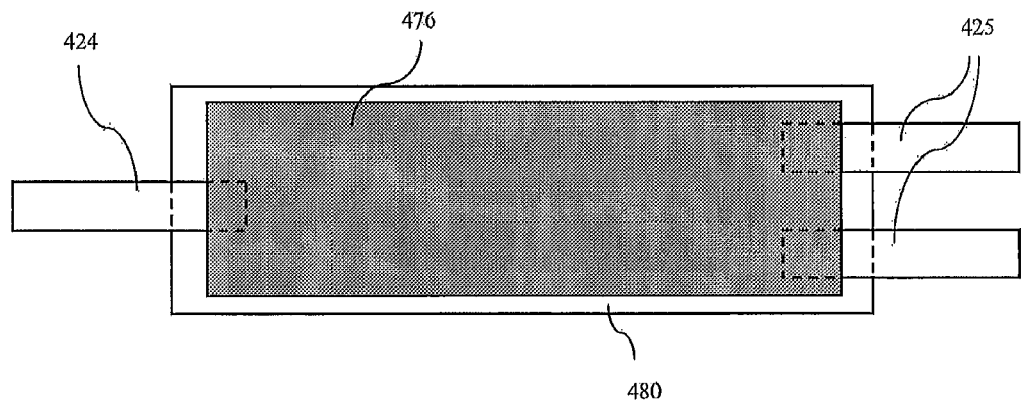
FIG. 27(b) is a diagram of a second step of production steps of the optical module of the sixteenth embodiment of the present invention, which includes an optical device for SMF.

Next, at the second step, as shown in FIG. 27(b), polysilane is coated on a portion of the gap 475 so as to include respective counter-face surfaces of the input side multimode fiber 424 and output side multimode fiber array 425, and sheet-like polysilane (before curing) 476 is made to be formed on the transparent substrate 480.

Figure 27C:
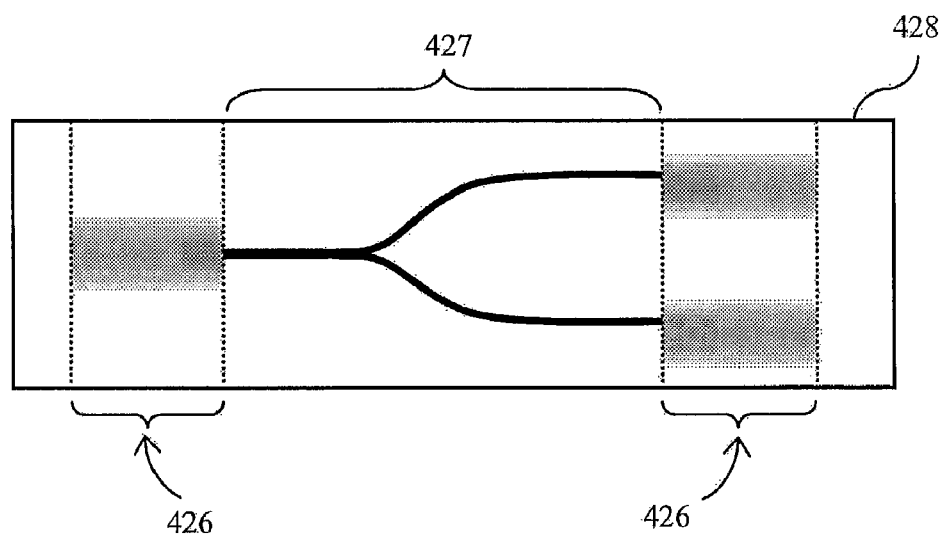
FIG. 27(c) is a diagram of a third step of production steps of the optical module of the sixteenth embodiment of the present invention, which includes an optical device for SMF.

Next, at the third step, as shown in FIG. 27(c), two compound mask plates 428 used when irradiating ultraviolet rays on the sheet-like polysilane (before curing) 476 made to be formed on the transparent substrate 480 are prepared. The compound mask plate 428 has waveguide type graded index lens patterns 426 divided into two places, and a graded ultraviolet ray transmittance pattern of a Y branching pattern 427 for single mode fibers (SMF), arranged so as to connect two places of waveguide type graded index lens patterns 426, between them. Black portions of the Y branching pattern 427 for SMF shown in FIG. 27(c) are portions which ultraviolet rays do not permeate.

Figure 27D:
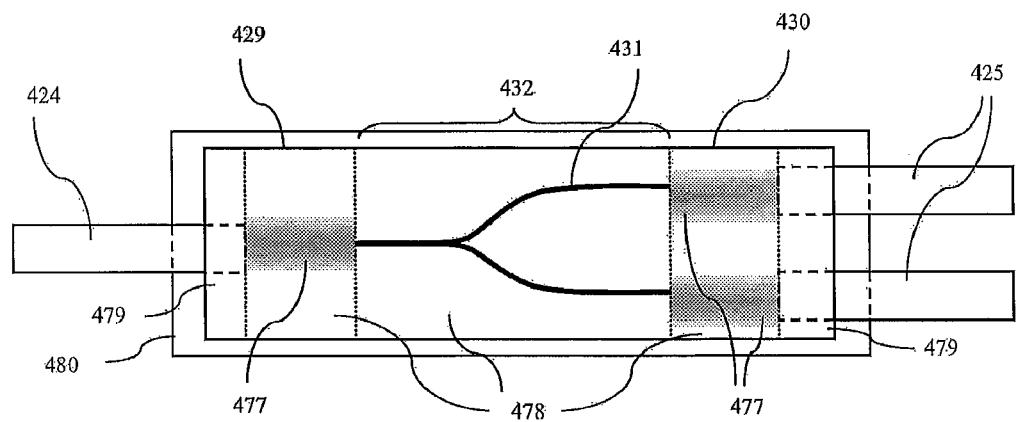
FIG. 27(d) is a diagram of a fourth step of production steps of the optical module of the sixteenth embodiment of the present invention, which includes an optical device for SMF.
Figure 28:
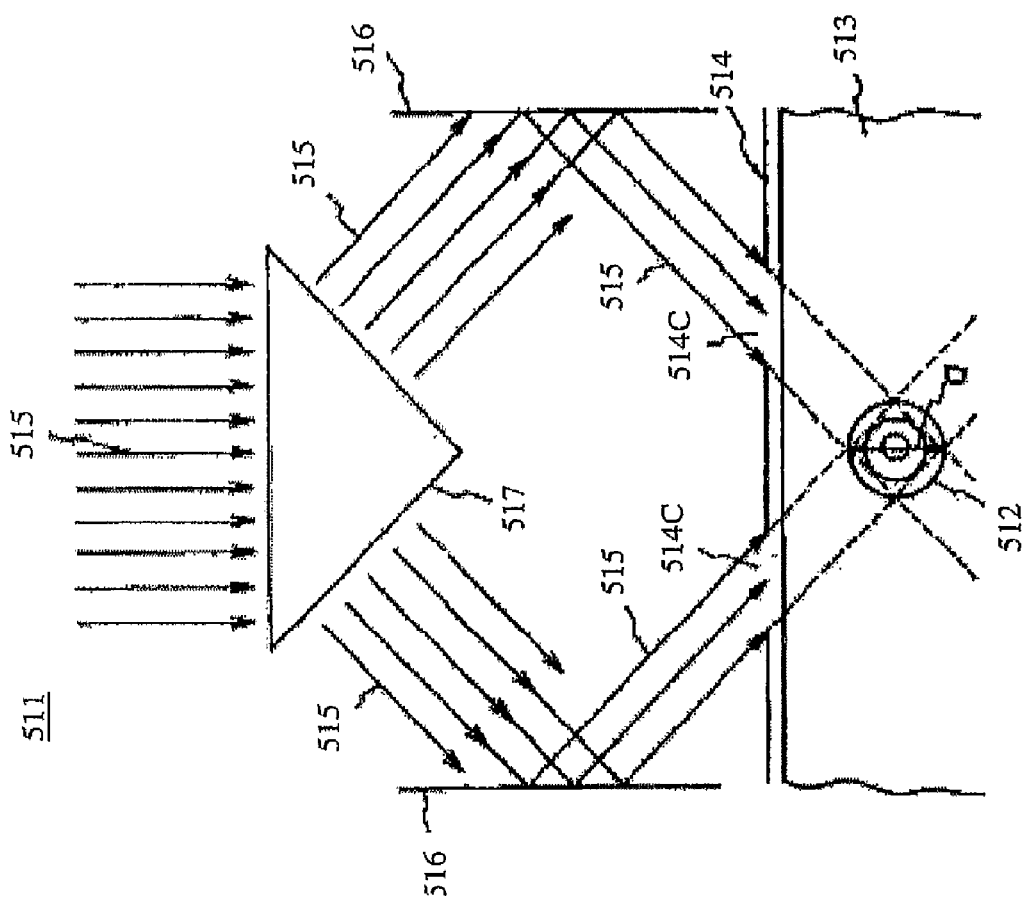
FIG. 28 is a structural diagram of a conventional production apparatus of an optical waveguide.
Figure 29:
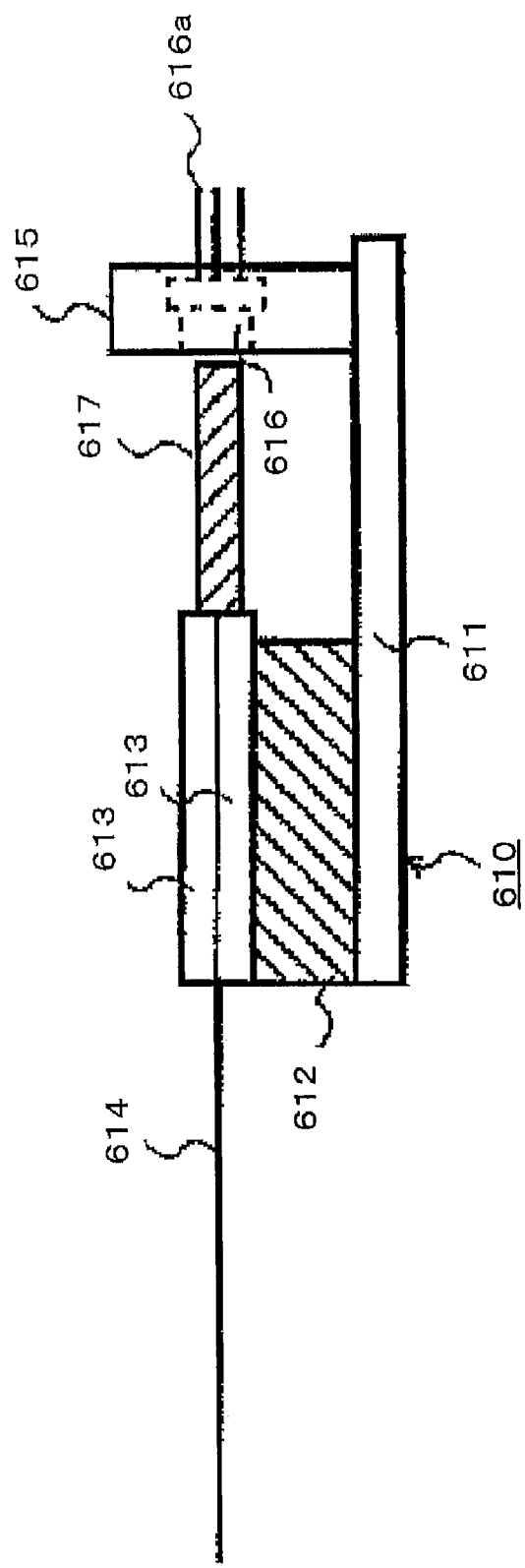
FIG. 29 is a side view of a conventional optical module.

Then, at the fourth step, as shown in FIG. 27(d), the compound mask plates 428 shown in FIG. 27(c) are arranged on the both sides of a top face side and a bottom face side of the transparent substrate 480, in which the sheet-like polysilane (before curing) 476 shown in FIG. 27(b) is made to be formed, respectively, and ultraviolet rays with uniform light intensities are irradiated from outsides of the two compound mask plates 428.

Ultraviolet rays are irradiated through the waveguide type graded index lens patterns 426 on portions which are close to edge faces of respective MMF of the input side multimode fiber 424 and output side multimode fiber array 425 and face polysilane portions used as WG-GRIN lenses. Hence, ultraviolet rays with an amount, which is minimum on optical axes and does not decrease according to distances from the optical axes, are perpendicularly irradiated to the optical axes of respective MMF. And, the input side waveguide type graded index lens 429 and the output side waveguide type graded index lens array 430 which are equipped with a graded index type core 477 which has a refractive index distribution which is maximum on respective optical axes and decreases distances from the optical axes parabolically, and a clad 478 which has a fixed refractive index, respectively, are sheet-like, and are made of polysilane are formed.

In addition, since ultraviolet rays are irradiated on a Y branching portion 432 for SMF in the sheet-like polysilane (before curing) 476 where ultraviolet rays are irradiated through the Y branching pattern 427 for SMF lest ultraviolet rays should be passed through a portion along with a shape of Y branch for SMF in the Y branching pattern 427 for SMF, a Y branching core 431 for SMF which couples the input side waveguide type graded index lens 429 and the output side waveguide type graded index lens array 430, and a clad 478 around it are formed.

Furthermore, since portions of outsides of the two waveguide type graded index lens patterns 426 of the compound mask plates 428 are portions which face end sections of the input side multimode fiber 424 and the output side multimode fiber array 425, and whose ultraviolet ray transmittances are large, and hence, an amount of ultraviolet rays equivalent to an amount of ultraviolet rays irradiated on portions used as clads 478 are irradiated, fixed sections 479 made of polysilane having the same component as the clads 478 are formed, and the input side multimode fiber 424 and the output side multimode fiber array 425 are fixed.

Nevertheless, since an optical system of a large MMF with a core diameter of 50 μm or more and a Y branch for SMF with a core diameter of 10 μm or less converts a beam diameter of MMF into a beam diameter of SMF, both of the input side waveguide type graded index lens 429 and the output side waveguide type graded index lens array 430 have the length in about the 0.25n (n: integer) pitch.

Thus, since it is possible to lessen the optical system of performing beam conversion from MMF to SMF using the lens nearly equal to a diameter of an optical fiber, it is possible to achieve high-performance, miniaturization, and low-pricing of an optical device for MMF since it is possible to use an optical device for SMF which is low-cost and high-performance, and small (Y branch in this case) for MMF. In addition, it is possible to produce a Y branch for SMF and a waveguide type graded index lens, and to fix I/O MMF by one-time UV irradiation by drawing a pattern of Y branch for SMF and a pattern of waveguide type graded index lenses in the same mask.

In addition, the input side multimode fiber 424 corresponds to an example of the first optical component of the present invention, and the output side multimode fiber array 425 corresponds to an example of the second optical component of the present invention. Moreover, the transparent substrate 480 corresponds to an example of the substrate of the present invention. In addition, the input side waveguide type graded index lens 429 and the output side waveguide type graded index lens array 430 correspond to an example of the first GRIN lens and second GRIN lens array of the present invention, respectively.

Furthermore, the first step, second step, and fourth step correspond to an example of the arranging step, coating step, and polysilane curing step of the present invention, respectively.

In addition, an optical system of the sixteenth embodiment is applicable not only to the case of a Y branch but also a waveguide type functional device for SMF, for example, a coupler and branch, a coupler, a filter, a photonic crystal, or the like.

Moreover, the optical system of the sixteenth embodiment is applicable not only to the case of converting a MMF optical system into an SMF optical system, but also to the conversion of optical systems whose beam diameters differ. In the case of a photonic crystal, for example, since the diameter of a slab type combinable beam is smaller than SMF, it is applicable to the conversion between an SMF optical system and a photonic crystal optical system.

In addition, even when an optical module has the structure that the input and output of the optical module of the sixteenth embodiment shown in FIG. 27 are reversed, that is, the structure that the input side is made a multimode fiber array which has a plurality of light emitting sections and the output side is made a multimode fiber which has one light receiving section, and such structure that a portion of the Y branch 432 for SMF is made a coupling path, it is producible with the manufacturing method of the sixteenth embodiment.

It is apparent from the above explanation that both miniaturization and low-pricing of optical module can be realized using the manufacturing method of the optical module according to the invention in the thirteenth to sixteenth embodiments. It makes possible to produce a waveguide type graded index lens nearly equal to the aperture of optical fiber at low cost using oxidation reaction during the ultraviolet curing of sheet-like polysilane. It also makes possible simultaneously to produce a polysilane waveguide type graded index lenses and to fix the optical components which are coupled by the polysilane waveguide type graded index lenses by coating polysilane coated for production of sheet-like polysilane on the vicinity of the optical components including the edge faces, and by ultraviolet curing.

In addition, since polysilane is accompanied by an oxidation reaction, the optical module of the present invention has heat resistance of up to 250° C., and hence, it is possible to use it also in an environment, where the heat resistance of 100° C. or more is required, such as outdoor use or automotive use where an optical module using a conventional photopolymerization material was not able to be used.

The manufacturing method of a graded-index optical member of the present invention demonstrates an effect that it is possible to produce the graded-index optical member in a simple process by forming a core section by changing a refractive index by an oxidation reaction caused by UV irradiation and heating using a sheet-like base material whose main component is polysilane.

The graded-index optical member of the present invention demonstrates an effect that it is possible to make it have the heat resistance of 100° C. or more by forming a core section by changing a refractive index by an oxidation reaction caused by UV irradiation and heating using a sheet-like base material whose main component is polysilane.

The optical module of the present invention demonstrates an effect that it is possible to make an optical module in low cost which uses the graded-index optical member of the present invention which is produced in the simple process of forming a core section by changing a refractive index by an oxidation reaction caused by UV irradiation and heating using a sheet-like base material whose main component is polysilane.

The optical module of the present invention demonstrates an effect that it is possible to make a small optical module which uses the small graded-index optical member of the present invention which is produced in the process of forming a core section by changing a refractive index by an oxidation reaction caused by UV irradiation and heating using a sheet-like base material whose main component is polysilane.

The optical modules and the manufacturing methods of an optical module of the present invention demonstrate the effect of each producing a waveguide type graded index lens and being able to fix an optical component at the same time.

What is claimed is:

1. A graded-index optical member, comprising:
   a core section which has a maximum portion of a refractive index substantially at a center of a cross-section which is perpendicular to an optical axis, and a refractive index distribution in which said refractive index decreases in accordance with a distance in a direction of an X axis which is orthogonal with respect to said optical axis from said maximum portion and a distance in a direction of a Y axis which is orthogonal with respect to said optical axis and said X axis from said maximum portion; and
   a clad section which contacts at least partially with a periphery of said core section, a whose refractive index is substantially uniform, and in which polysilane is a main component,
   wherein said core section has a minimum portion of a concentration of a siloxane structure at said center of said cross-section, and said concentration of said siloxane structure increases in accordance with a distance in said direction of said X axis from said minimum portion and a distance in said direction of said Y axis from said minimum portion, and said graded-index optical member is sheet-like.

2. The graded-index optical member according to claim 1, wherein said core section has a concentration distribution of said siloxane structure, wherein said concentration does not decrease with distance from said maximum portion of the refractive index.

3. The graded-index optical member according to claim 2, wherein the concentration distribution of said siloxane structure of said core section is a distribution which increases with distance from said maximum portion of the refractive index substantially as a parabola centrosymmetrically.

4. The graded-index optical member according to claim 2, wherein the concentration distribution of said siloxane structure of said core section is a distribution which changes along a propagating direction of light.

5. The graded-index optical member according to claim 4, wherein a change of the concentration distribution of said siloxane structure which changes along a propagating direction of light is periodic.

6. The graded-index optical member according to claim 4, wherein the concentration distribution of said siloxane structure changing along said propagating direction of light is combination of a portion which varies in both directions of a film thickness direction and a width direction of said sheet-like polysilane, and a portion which varies only in said film thickness direction.

7. The graded-index optical member according to claim 1, wherein said optical axis in said core section is substantially a straight line, and a length of said core section is adjusted so that a focal point is located in a desired position on said optical axis.

8. The graded-index optical member according to claim 1, wherein a plurality of said core sections are provided.

9. The graded-index optical member according to claim 8, wherein at least one pair of the plurality of said core sections are coupled in part optically.

10. The graded-index optical member according to claim 8, wherein an optical axis in each of the plurality of said core sections is substantially a straight line; and
    wherein the plurality of said core sections are arranged in parallel without intersecting mutually.

11. The graded-index optical member according to claim 8, wherein an optical axis in each of the plurality of said core sections is substantially a straight line; and
    wherein the plurality of said core sections are arranged in a zigzag shape with adjacent core sections intersecting in part in their end sections.

12. The graded-index optical member according to claim 1, wherein a substrate transparent to at least ultraviolet rays is provided on at least one surface of both surfaces of top and bottom faces of said sheet-like polysilane.

13. The graded-index optical member according to claim 1, wherein said refractive index distribution of said core section decreases substantially along with a parabola in concentric ellipses according to distance from said maximum portion of the refractive index.

14. The graded-index optical member according to claim 1, wherein said refractive index distribution of said core section decreases substantially along with a parabola in concentric circles or concentric ellipses according to distance from said maximum portion of the refractive index, and a cross-section of at least one end section area of an input side and an output side has a shape whose area becomes small toward said end section.

15. The graded-index optical member according to claim 14, wherein said end section of said core section has a curved surface shape.

* * * * *

UNITED STATES PATENT AND TRADEMARK OFFICE
CERTIFICATE OF CORRECTION

PATENT NO. : 7,653,278 B2 Page 1 of 1
APPLICATION NO. : 11/569291
DATED : January 26, 2010
INVENTOR(S) : Hidenobu Hamada It is certified that error appears in the above-identified patent and that said Letters Patent is hereby corrected as shown below:

At Column 53, line 29, claim 1 of the Letters Patent, "section, a whose" should read
-- section, whose --

Signed and Sealed this

Twenty-seventh Day of April, 2010

David J. Kappos
*Director of the United States Patent and Trademark Office*